(12) United States Patent
Mizuhashi et al.

(10) Patent No.: US 10,345,931 B2
(45) Date of Patent: Jul. 9, 2019

(54) DISPLAY APPARATUS

(71) Applicant: Japan Display Inc., Tokyo (JP)

(72) Inventors: Hiroshi Mizuhashi, Tokyo (JP); Hayato Kurasawa, Tokyo (JP); Daichi Suzuki, Tokyo (JP); Fumitaka Gotoh, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/170,852

(22) Filed: Oct. 25, 2018

(65) Prior Publication Data

US 2019/0064948 A1     Feb. 28, 2019

Related U.S. Application Data

(63) Continuation of application No. 15/147,421, filed on May 5, 2016, now Pat. No. 10,139,927.

(30) Foreign Application Priority Data

May 29, 2015     (JP) ................................ 2015-109263

(51) Int. Cl.
  *G06F 3/041*     (2006.01)
  *G06F 3/046*     (2006.01)
  *G06F 3/0354*    (2013.01)
(52) U.S. Cl.
  CPC .......... *G06F 3/03545* (2013.01); *G06F 3/046* (2013.01); *G06F 3/0412* (2013.01); *G06F 3/0416* (2013.01)

(58) Field of Classification Search
  None
  See application file for complete search history.

(56) References Cited

U.S. PATENT DOCUMENTS

| 9,182,872 | B2 | 11/2015 | Sugiyama |
| 2007/0124515 | A1 | 5/2007 | Ishikawa et al. |
| 2007/0200487 | A1 | 8/2007 | Uno |

FOREIGN PATENT DOCUMENTS

| JP | H10-049301 A | 2/1998 |
| JP | 2005-352572 A | 12/2005 |
| JP | 2006-163745 A | 6/2006 |
| JP | 2007-257619 A | 10/2007 |
| JP | 2014-021937 | 2/2014 |
| JP | 2014164770 | 9/2014 |

OTHER PUBLICATIONS

Japanese Notificiation of Reasons for Refusal dated Sep. 4, 2018 in corresponding Japanese Application No. 2015-109263.

*Primary Examiner* — Nicholas J Lee
(74) *Attorney, Agent, or Firm* — K&L Gates LLP

(57) ABSTRACT

A display apparatus with a touch detection function capable of improving accuracy is provided. The display apparatus includes: a pixel array having a plurality of pixels arranged in a matrix form; and a plurality of signal wires arranged in the pixel array. Here, when an externally-detecting object is detected, a plurality of coils having areas overlapping with each other are formed of a plurality of signal wires (drive electrodes) among the plurality of signal wires, and a magnetic field generated in the plurality of respective coils are superimposed in an overlapped area by supplying a drive signal to the plurality of coils.

13 Claims, 34 Drawing Sheets

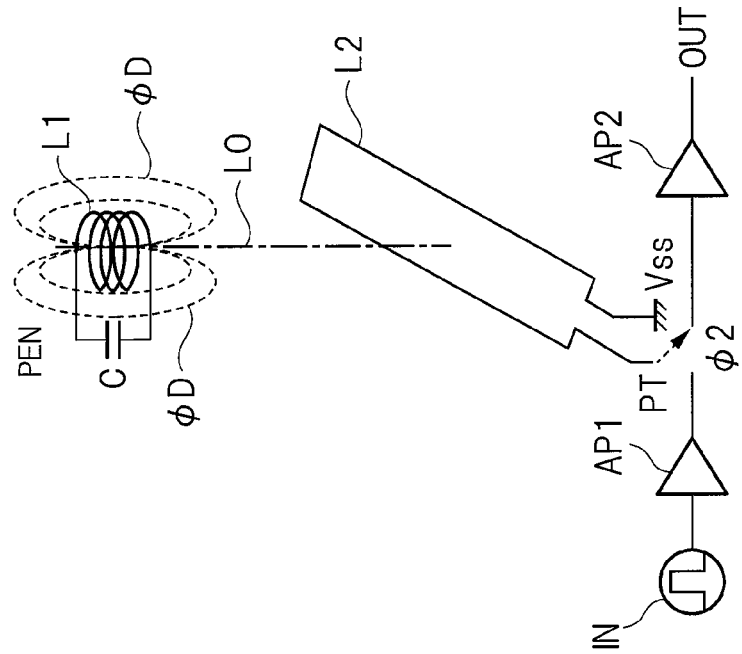
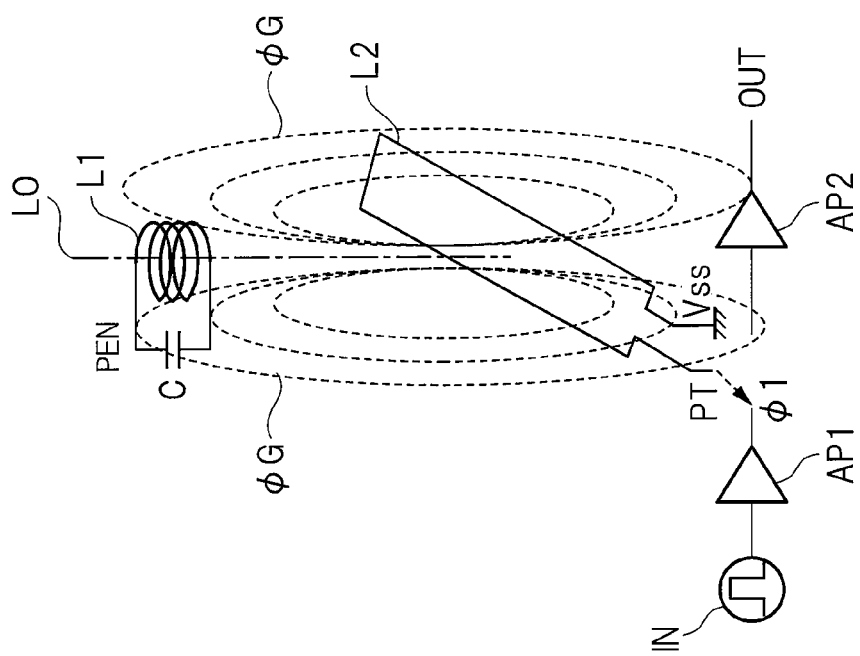
FIG. 2A
FIG. 2B

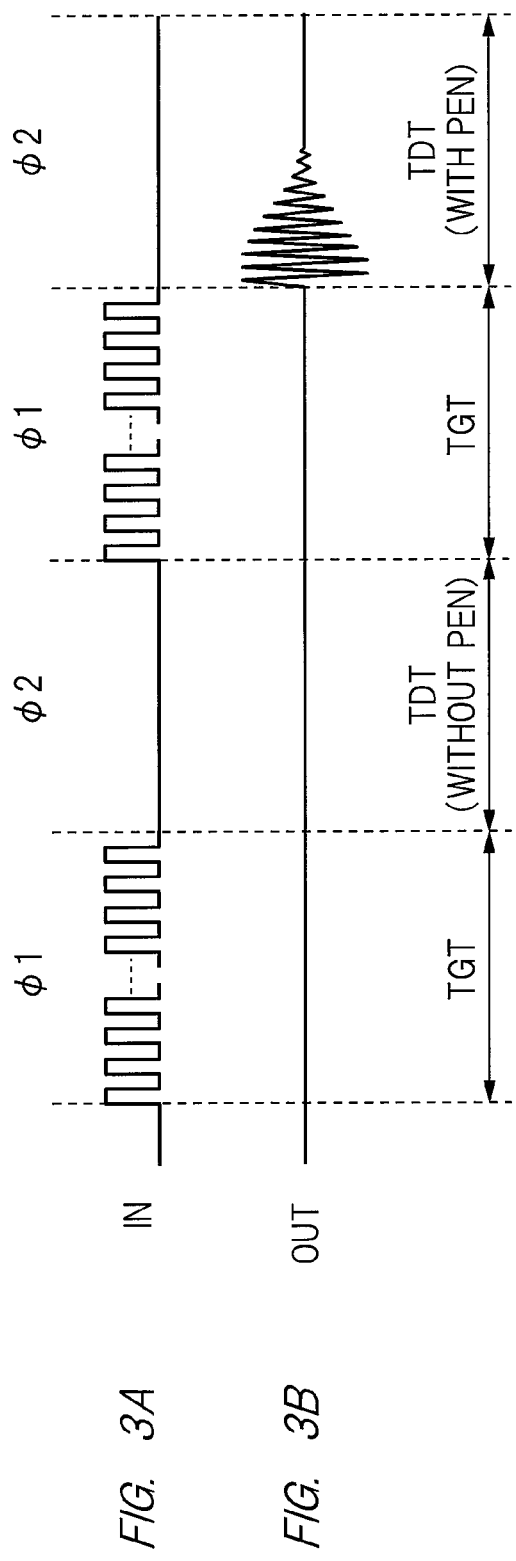

DISPLAY APPARATUS

CROSS REFERENCES TO RELATED APPLICATIONS

The present application is a continuation of U.S. patent application Ser. No. 15/147,421, filed on May 5, 2016, which application claims priority from Japanese Patent Application No. 2015-109263 filed on May 29, 2015, the content of which is hereby incorporated by reference into this application.

BACKGROUND

The present application claims priority from Japanese Patent Application No. 2015-109263 filed on May 29, 2015, the content of which is hereby incorporated by reference into this application.

In recent years, a touch detection device which is so called touch panel capable of detecting an externally-approaching object has attracted attention. A touch panel is mounted on a display apparatus such as a liquid crystal display apparatus or integrated with a liquid crystal display apparatus so as to be provided as a display apparatus with a touch detection function.

As the externally-approaching object, a touch panel enabled to use, for example, a pen is known. By enabling the touch panel to use a pen, for example, a small area can be assigned or hand-written characters can be input. Various techniques to detect the touch by a pen are known. As one of the various techniques, an electromagnetic induction system is known. In the electromagnetic induction system, high accuracy and high handwriting pressure detection accuracy can be achieved, and a hovering detection function in a state in which an externally-approaching object is separated from the touch panel surface can be also achieved, and therefore, the system is a leading technique as the technique to detect the touch by a pen. The touch detection technique using the electromagnetic induction system is described in, for example, Japanese Patent Application Laid-Open Publication No. H10-49301 (Patent Document 1), Japanese Patent Application Laid-Open Publication No. 2005-352572 (Patent Document 2), and Japanese Patent Application Laid-Open Publication No. 2006-163745 (Patent Document 3).

SUMMARY

As the electromagnetic induction system, a system in which a coil and a battery are mounted on a pen so as to generate a magnetic field in the pen and in which magnetic field energy is detected on a touch panel is known. In this case, the touch panel needs a sensor plate to receive the magnetic field energy. Also, a system is known, the system in which a coil and a capacitative element are mounted on a pen so as to generate a magnetic field in a touch panel and in which the magnetic field energy is charged in the capacitative element mounted on the pen and is detected on the touch panel. This system needs a sensor plate which generates the magnetic field in the touch panel and by which the magnetic field energy from the pen is received.

In both of these electromagnetic induction systems, it is required to add the sensor plate in order to achieve the display apparatus with the touch detection function, leading to increase in a price (production cost).

The present inventor has studied integration of the sensor plate and the display apparatus in order to suppress the increase in the price. The sensor plate includes a plurality of coils in order to detect and/or generate the magnetic field. When the display apparatus with the touch detection function is provided by mounting the sensor plate on the display apparatus, the coil can be formed of, for example, a normal metallic wire. On the other hand, when the coil is formed of a signal wire in the display apparatus for the integration, a sheet resistance of the signal wire forming the coil is, for example, about one or two digits higher than a sheet resistance of the normal metallic wire. Thus, a current flowing through the coil becomes small, and the generated magnetic field energy becomes small, and therefore, there is a concern about decrease in the accuracy of the touch detection.

The Patent Documents 1 to 3 describe the touch detection device using the electromagnetic induction system. However, a technique in consideration of the sheet resistance of the signal wire in the display apparatus is neither described nor recognized therein.

An object of the present invention is to provide a display apparatus with a touch detection function capable of improving accuracy.

A display apparatus according to an aspect of the present invention includes a pixel array having a plurality of pixels arranged in a matrix form and a plurality of signal wires arranged in the pixel array. Here, when the externally-approaching object is detected, a plurality of coils having areas overlapping with each other are formed of a plurality of signal wires of the plurality of signal wires, and a driving signal is supplied to the plurality of coils, so that the magnetic fields generated in the plurality of respective coils are superimposed in the overlapped area.

The magnetic fields are superimposed in an area where the coils overlap each other, and thus, the magnetic fields can be enhanced. Thus, even if the inductance of each coil is decreased by reducing the number of windings around each coil, the magnetic field can be enhanced in the overlapped area. Meanwhile, by reducing the number of windings around the coil, a length of a signal wire to be a coil winding wire can be shortened, so that the impedance of the coil can be decreased. Accordingly, a value of a current flowing through the coil can be increased, so that the magnetic field generated in the overlapped area can be enhanced. Because the generated magnetic field can be enhanced, the accuracy of the touch detection can be improved.

Additional features and advantages are described herein, and will be apparent from the following Detailed Description and the figures.

BRIEF DESCRIPTION OF THE FIGURES

FIGS. 2A and 2B is an explanatory diagram showing a principle of an electromagnetic induction system;

FIGS. 3A and 3B is a waveform diagram showing the principle of the electromagnetic induction system;

DETAILED DESCRIPTION

Figure 1:
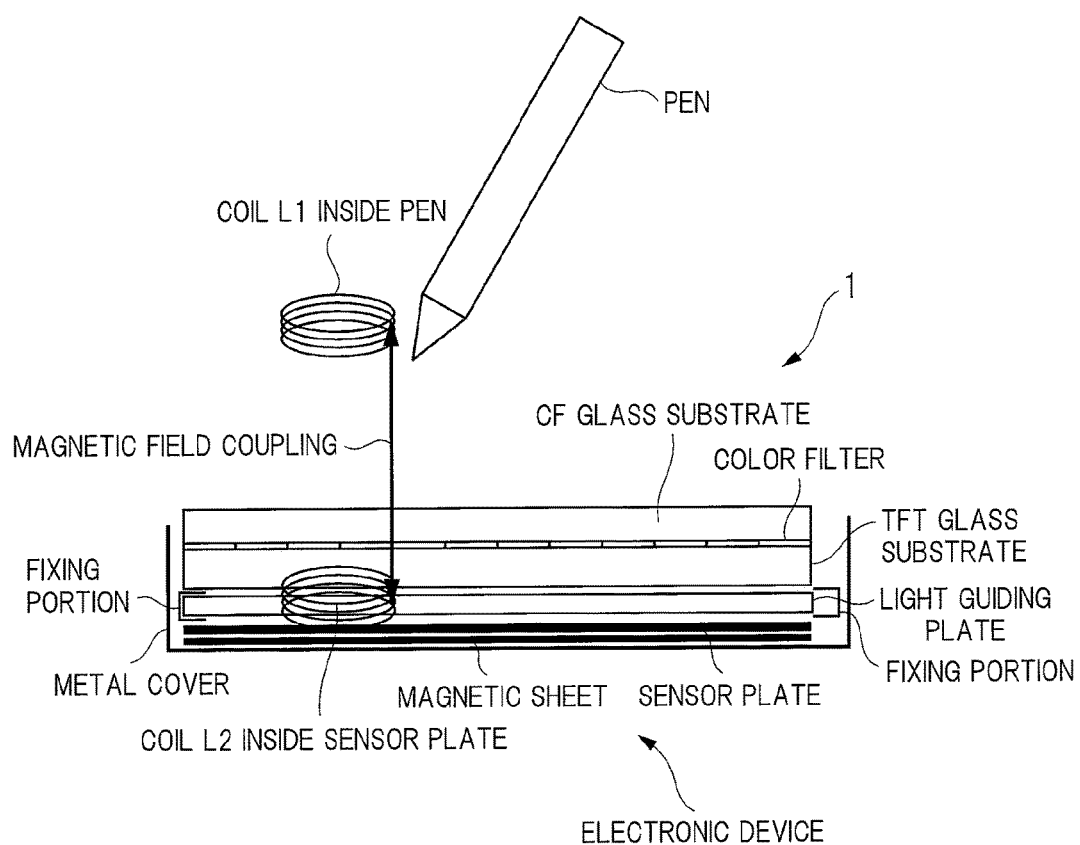
FIG. 1 is an explanatory diagram showing a relation between a pen and an electronic device having a liquid crystal display apparatus with a touch detection function.

Embodiments of the present application will be described below in detail with reference to the drawings.

The following is explanation for each embodiment of the present invention with reference to drawings. Note that disclosure is merely one example, and appropriate change with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not restrict the interpretation of the present invention.

In the present specification and each drawing, similar elements to those described earlier for the already-described drawings are denoted by the same reference characters, and detailed description for them is appropriately omitted in some cases.

The following is the explanation of a liquid crystal display apparatus with a touch detection function as a display apparatus with a touch detection function. However, the present invention is not limited to such an example and can also be applied to an OLED display apparatus with a touch detection function. While two methods have been described as examples of the electromagnetic induction system, a case of application of the latter method will be described here. In the latter method, there is no need to mount a battery on a pen, and thus, the pen can be downsized, and/or, the flexibility of a shape of the pen can be improved.

First Embodiment

<Basic Principle of the Electromagnetic Induction System>

First, the basic principle of the electromagnetic induction system will be described. FIG. 1 is an explanatory diagram schematically showing the relation between a pen and an electronic device having a liquid crystal display apparatus with a touch detection function. FIGS. 2 and 3 are explanatory diagrams each schematically showing the basic principle of the electromagnetic induction system.

In FIG. 1, the electronic device includes a liquid crystal display apparatus 1 housed in a metallic cover, a light guiding plate, a sensor plate, and a magnetic sheet. In the example shown in this drawing, the sensor plate is mounted between the liquid crystal display apparatus 1 and the metallic cover. While the sensor plate is provided with a plurality of coils, FIG. 1 schematically shows one of these coils as a sensor plate internal coil (hereinafter, also simply called a coil) L2.

A coil and a capacitative element are embedded in the pen corresponding to an externally-approaching object. Although the capacitative element is omitted, FIG. 1 schematically shows the coil embedded in the pen as a pen internal coil (hereinafter, may also simply called a coil) L1. The coil L1 and the coil L2 are coupled to each other by a magnetic field.

Note that a TFT glass substrate, a color filter, and a CF glass substrate included in the liquid crystal display apparatus 1 are shown in FIG. 1 in order to schematically show the structure of the liquid crystal display apparatus 1. A TFT substrate is formed so as to include the TFT glass substrate and TFT not shown, and a color filter substrate is formed so as to include the CF glass substrate and the color filter. A liquid crystal layer not shown is sandwiched between the TFT substrate and the color filter substrate. The light guiding plate is fixed by a fixing portion so as to be sandwiched between the liquid crystal display apparatus 1 and the sensor plate.

The pen approaches (including contact with) the electronic device, so that the coil L1 approaches the coil L2. Accordingly, magnetic coupling between the coil L1 and the coil L2 occurs, and the approach of the pen is detected.

The detection will be described with reference to FIGS. 2 and 3. FIG. 2A shows a state in which the coil L2 generates a magnetic field and FIG. 2B shows a state in which the coil L1 generates a magnetic field.

In FIG. 2, the coil L2 and a pen internal capacitative element (hereinafter, may also simply called a capacitative element) "C" are connected in parallel to each other to configure a resonance circuit. A single-winding coil is shown as an example of the coil L1 and has a pair of terminals. When a touch is detected (in the touch detection), one terminal PT of the coil L1 is connected to output of a transmitting amplifier AP1 for a predetermined time, and, after the predetermined time, is connected to input of a receiving amplifier AP2 for a predetermined time. The other terminal of the sensor plate internal coil L1 is connected to a ground voltage Vss in touch detection.

FIG. 3 is a waveform chart showing the operation in touch detection. The horizontal axis of FIG. 3 represents the time, FIG. 3A shows a waveform of the output of the transmitting amplifier AP1, and FIG. 3B shows a waveform of the output of the receiving amplifier AP2.

When one terminal PT of the coil L2 is connected to the output of the transmitting amplifier AP1, a transmission signal IN changing periodically is supplied to the input of the transmitting amplifier AP1. Accordingly, the transmitting amplifier AP1 supplies a drive signal □1 changing periodically in accordance with changes of the transmission signal IN to one terminal of the coil L2 for a predetermined time (magnetic field generation period) TGT as shown in FIG. 3A. Accordingly, the coil L2 generates a magnetic field. The line of magnetic force at this time is shown as □G in FIG. 2A.

The line of magnetic force □G is generated so as to center the winding wire of the coil L2, and thus, the magnetic field on the inner side of the coil L2 is enhanced. When the coil L1 approaches the coil L2 and a center axis L0 of the coil L1 is inside the coil L2 as shown in, for example, FIG. 2A, the line of magnetic force of the coil L2 reaches the coil L1. That is, the coil L1 is arranged inside a magnetic field generated in the coil L2, so that the coil L1 and the coil L2 are magnetically coupled. The coil L2 generates a magnetic field changing periodically in accordance with changes of the drive signal □1. Thus, an induced voltage is generated in the coil L1 by the action of mutual induction between the coil L1 and the coil L2. The capacitative element C is charged by the induced voltage generated by the coil L1.

After the predetermined time, the one terminal PT of the coil L2 is connected to the input of the receiving amplifier AP2 for a predetermined time (a magnetic field detection period or a current detection period) TDT. In the magnetic field detection period TDT, if the capacitative element C has been charged in the previous magnetic field generation period TGT, the coil L1 generates a magnetic field by the charge charged in the capacitative element C. FIG. 2B shows the line of magnetic force of the coil L1 generated by the charge charged in the capacitative element C as □D.

If the pen internal coil L1 approaches the sensor plate internal coil L2 in the touch detection, that is, in the magnetic field generation period TGT and the magnetic field detection period TDT, the capacitative element C is charged in the magnetic field generation period TGT, and the line of magnetic force □D of the coil L1 reaches the coil L2 in the magnetic field detection period TDT. The resonance circuit is configured by the coil L1 and the capacitative element C, and thus, a magnetic field generated by the coil L1 changes in accordance with the time constant of the resonance circuit. By the changes of the magnetic field generated by the coil L1, an induced voltage is generated in the coil L2. By the induced voltage, a signal changes at the one terminal PT of the coil L2. The change of the signal is input into the receiving amplifier AP2 as a detection signal ロ2 in the magnetic field detection period TDT, is amplified, and is output as a sensor signal OUT from the receiving amplifier AP2.

On the other hand, if the pen internal coil L1 does not approach the sensor plate internal coil L2 in touch detection, the capacitive element C is not charged or the amount of charge to be charged decreases in the magnetic field generation period TGT. As a result, the line of magnetic force ロD of the magnetic field generated by the coil L1 does not reach the coil L2 in the magnetic field detection period TDT. Thus, the detection signal ロ2 at the one terminal PT of the coil L2 does not change in the magnetic field detection period TDT.

FIG. 3 shows both of a state in which the pen internal coil L1 approaches the sensor plate internal coil L2 and a state in which the pen internal coil L1 does not approach the sensor plate internal coil L2. That is, the state in which the pen internal coil L1 does not approach the sensor plate internal coil L2 is shown on the left side of FIG. 3, and the state in which the pen internal coil L1 approaches the sensor plate internal coil L2 is shown on the right side thereof. Thus, in FIG. 3B, the detection signal ロ2 does not change in the magnetic field detection period TDT shown on the left side, and the detection signal ロ2 changes in the magnetic field detection period TDT shown on the right side. The touch by the pen can be detected by determining the case of change of the detection signal ロ2 to be a case with the pen, and determining the case of no change of the detection signal ロ2 to be a case without the pen.

While FIG. 3 shows the determinations of the cases with and without the pen, the value of the detection signal ロ2 changes depending on the distance between the coil L1 and the coil L2, and thus, the distance between the pen and the sensor plate or a pen pressure of the pen can be also determined.

<Integrated Structure of the Liquid Crystal Display Apparatus and the Sensor Plate>

Figure 4:
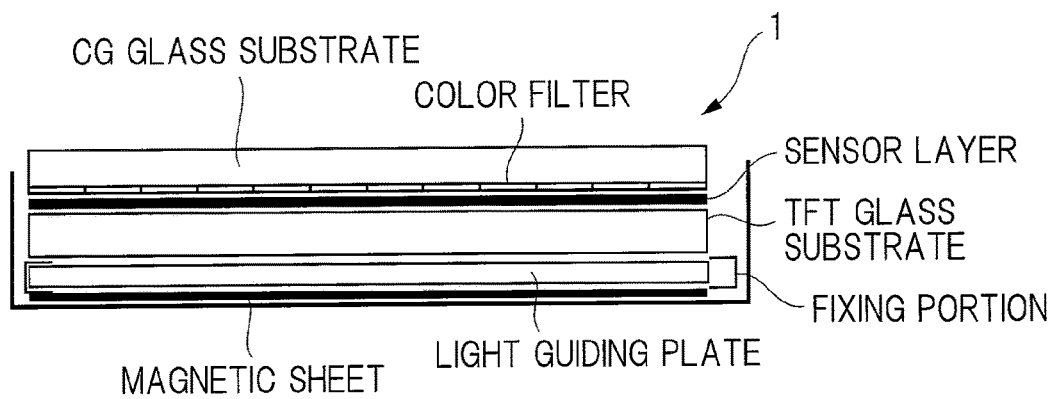
FIG. 4 is a cross-sectional view showing the cross section of a liquid crystal display apparatus.

The present inventors have considered that, if the liquid crystal display apparatus 1 and the sensor plate are prepared separately as shown in FIG. 1, an electronic device becomes expensive because the sensor plate is expensive. Thus, the present inventors have considered forming the sensor plate by a layer of the liquid crystal display apparatus 1 to integrate the liquid crystal display apparatus and the sensor plate. FIG. 4 is a cross-sectional view showing a schematic cross section of the liquid crystal display apparatus 1 in which the sensor plate is integrated as a sensor layer. FIG. 4 is similar to FIG. 1, and thus, differences will mainly be described. In FIG. 1, a sensor plate is prepared separately from the liquid crystal display apparatus 1 so that the sensor plate is provided between a light guiding plate and a magnetic sheet. In FIG. 4, by contrast, a sensor layer is formed on a TFT glass substrate. Accordingly, the sensor layer corresponding to a sensor plate is provided in the liquid crystal display apparatus 1, and thus, increase in a price can be suppressed.

Figure 5A:
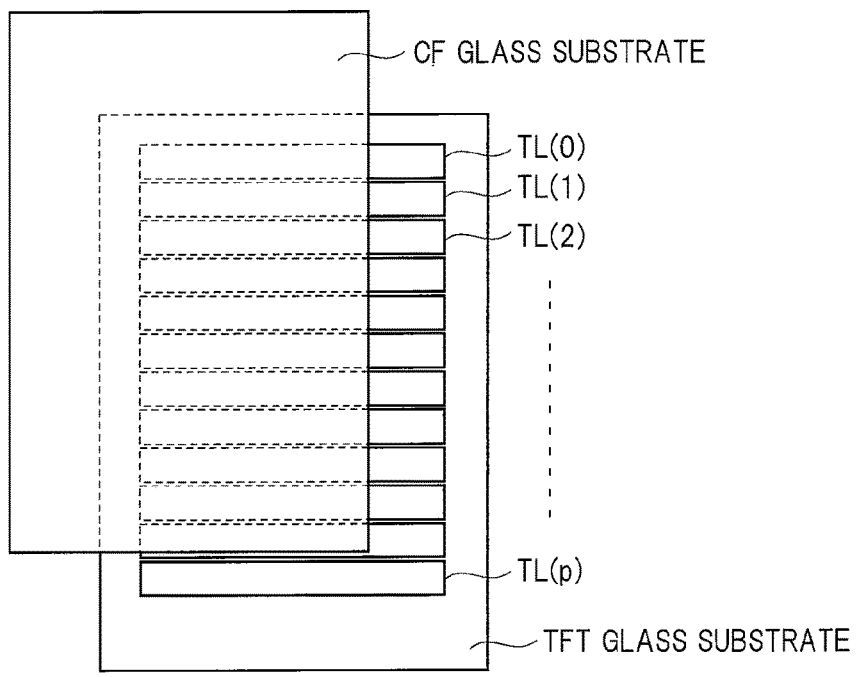
FIGS. 5A and 5B are a plan view and a cross-sectional view schematically showing a configuration of a liquid crystal display apparatus according to a first embodiment, respectively.
Figure 5B:
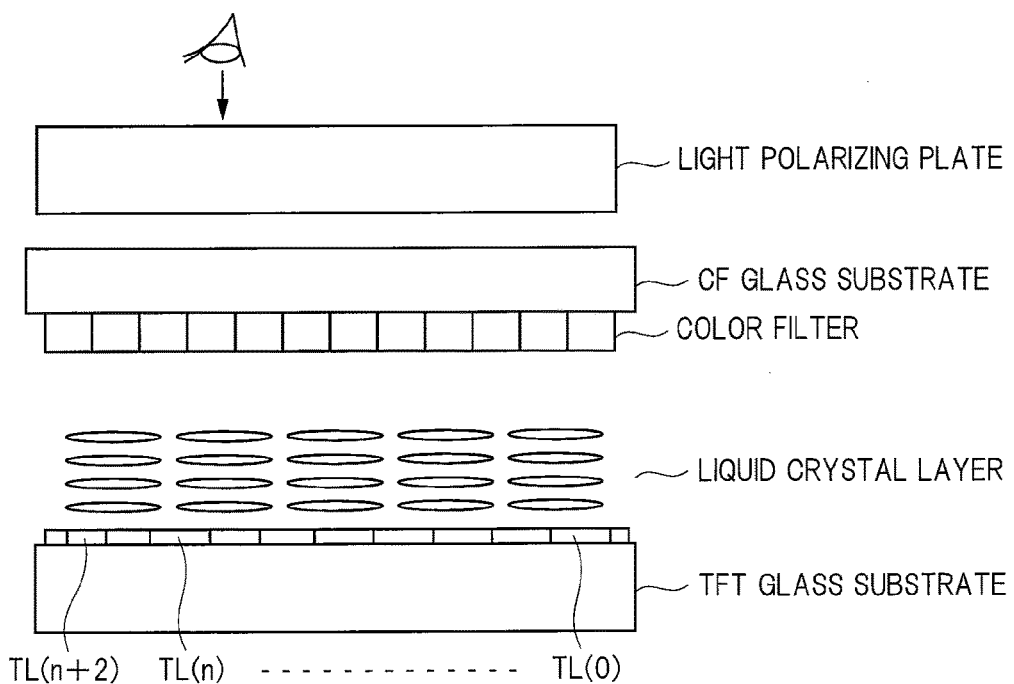

FIG. 5 is a diagram schematically showing the structure of the liquid crystal display apparatus 1. FIG. 5A schematically shows a plane of the liquid crystal display apparatus 1, and FIG. 5B schematically shows a cross section of the liquid crystal display apparatus 1. In FIGS. 5A and 5B, TL(0) to TL(P) indicate drive electrodes formed on a TFT glass substrate. In FIG. 5A, the drive electrodes TL(0) to TL(p) extend in a horizontal direction (row direction) and are arranged in parallel in a vertical direction (column direction). That is, each of the drive electrodes TL(0) to TL(p) is formed so as to be parallel to each other in an extending direction. As shown in FIG. 5B, a liquid crystal layer is provided on an upper side of the drive electrodes TL(0) to TL(P), and a color filter and a CF glass substrate are further formed on an upper side of the liquid crystal layer. In addition, a light polarizing plate is formed on an upper side of the CF glass substrate. In FIG. 5, a case of view from above is described as the term "upper side" as shown in FIG. 5B in order to make the description easier. However, of course, the "upper side" changes to a "lower side" or a "lateral side" depending on the direction of the visual view.

To each of the drive electrodes TL(0) to TL(p), a drive signal for display (display drive signal) is supplied in display. Thus, when only the display is considered, the drive electrodes TL(0) to TL(P) may be electrically connected to each other. In other words, the drive electrodes TL(0) to TL(p) may be one drive electrode. In the first embodiment, however, a drive electrode is used as a coil winding wire in the touch detection. Thus, in the first embodiment, the drive electrodes TL(0) to TL(p) are electrically separated from each other. For example, a common display drive signal is supplied to the mutually separated drive electrodes TL(0) to TL(p) in display, and predetermined drive electrodes are electrically connected to each other to form a coil in touch detection.

That is, in the first embodiment, a layer of signal wires forming the drive electrodes TL(0) to TL(P) is used as a sensor layer. A display drive signal is supplied to the drive electrodes TL(0) to TL(p) in display. Therefore, the drive electrodes TL(0) to TL(p) are used in common in display and in touch detection (used for both of display and touch detection). Thus, in the first embodiment, there is no need to add a layer to form a coil winding wire, and besides, the increase in the price can be suppressed. Because the drive electrodes TL(0) to TL(p) also function as a common electrode for display, note that each of the drive electrodes TL(0) to TL(p) can be regarded as a common electrode. Thus, in this specification, the drive electrodes TL(0) to TL(p) may also be called common electrodes.

<Study by the Present Inventors>

Figure 34:
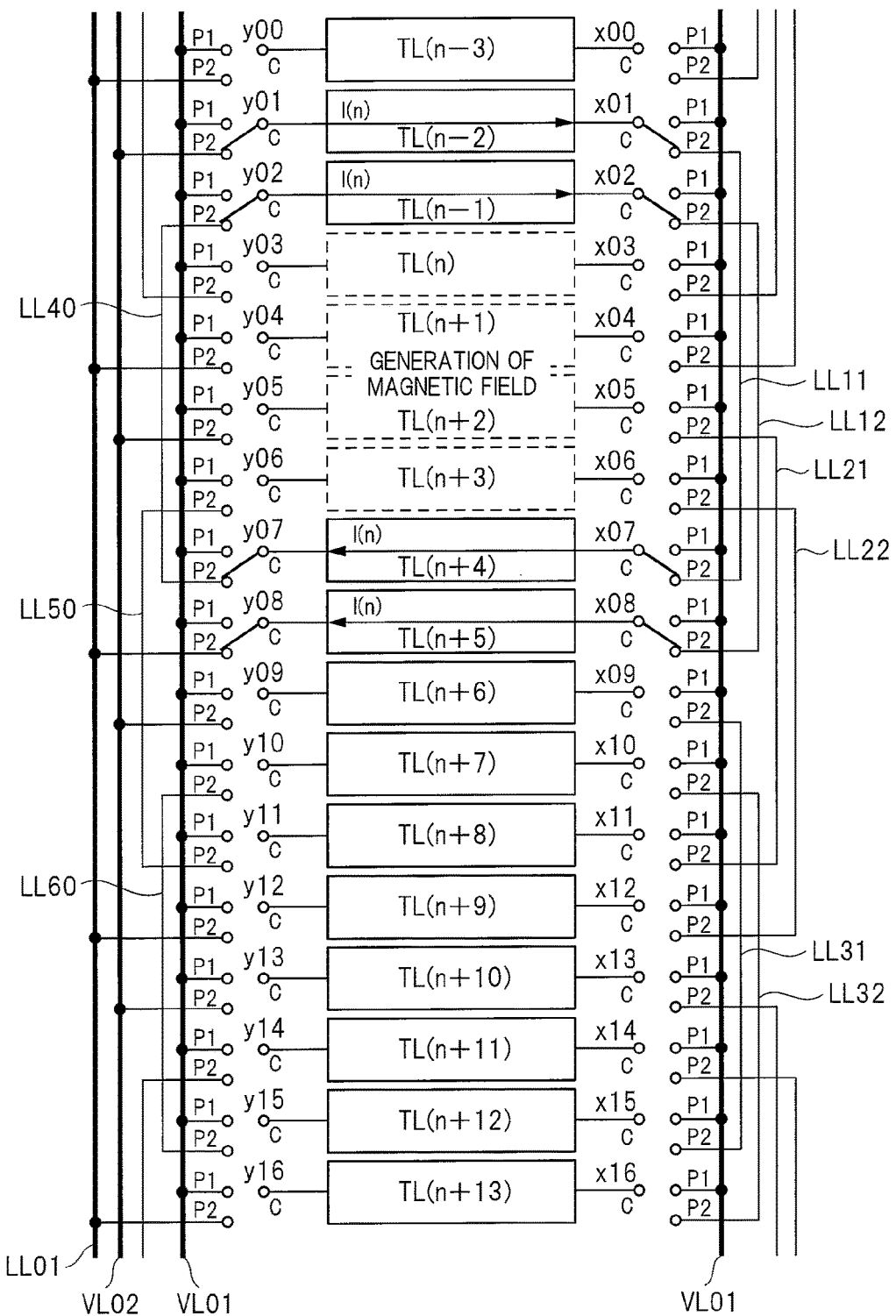
FIG. 34 is a block diagram showing a configuration of a liquid crystal display apparatus studied by the present inventors.
Figure 35:
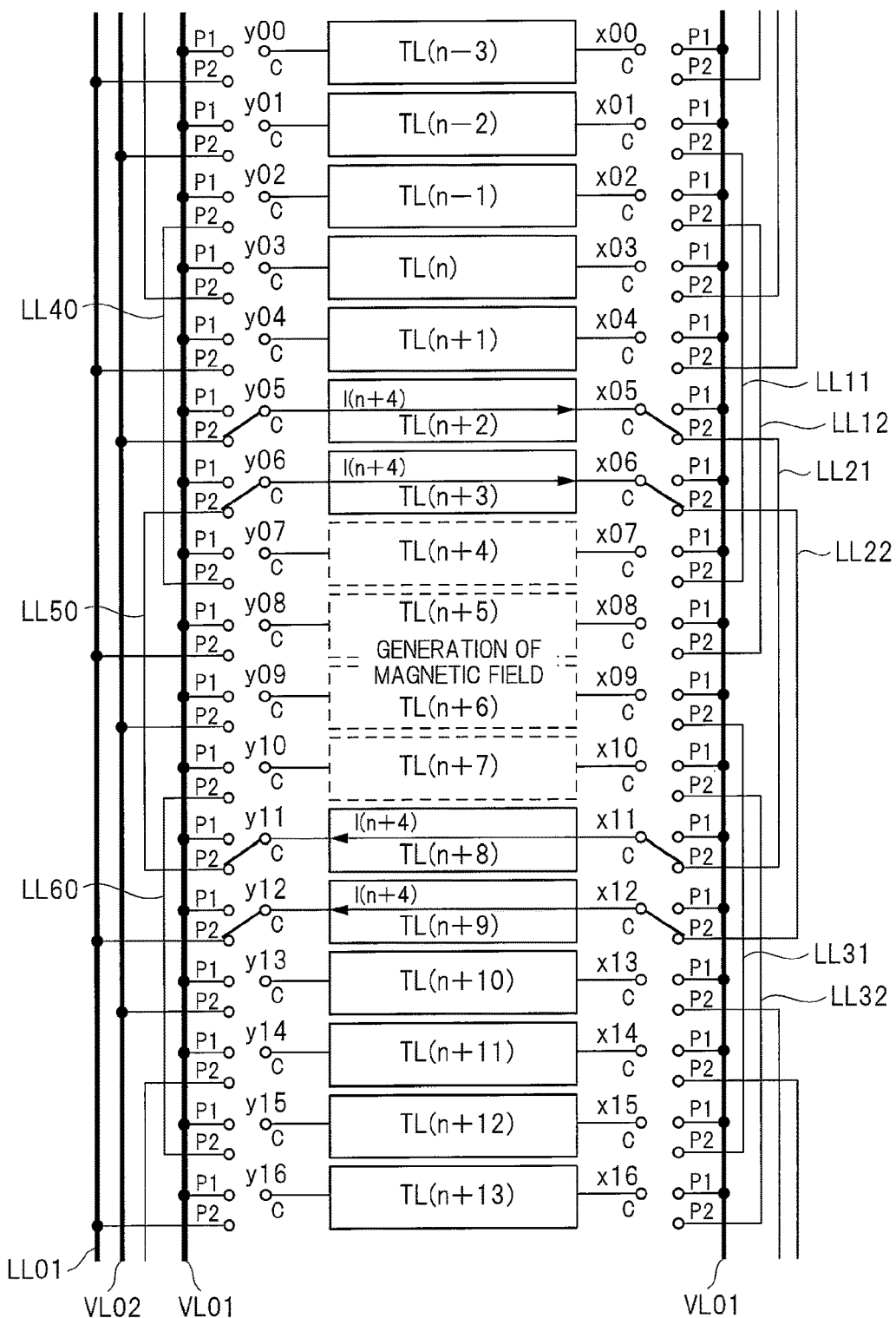
FIG. 35 is a block diagram showing a configuration of the liquid crystal display apparatus studied by the present inventors.
Figure 36:
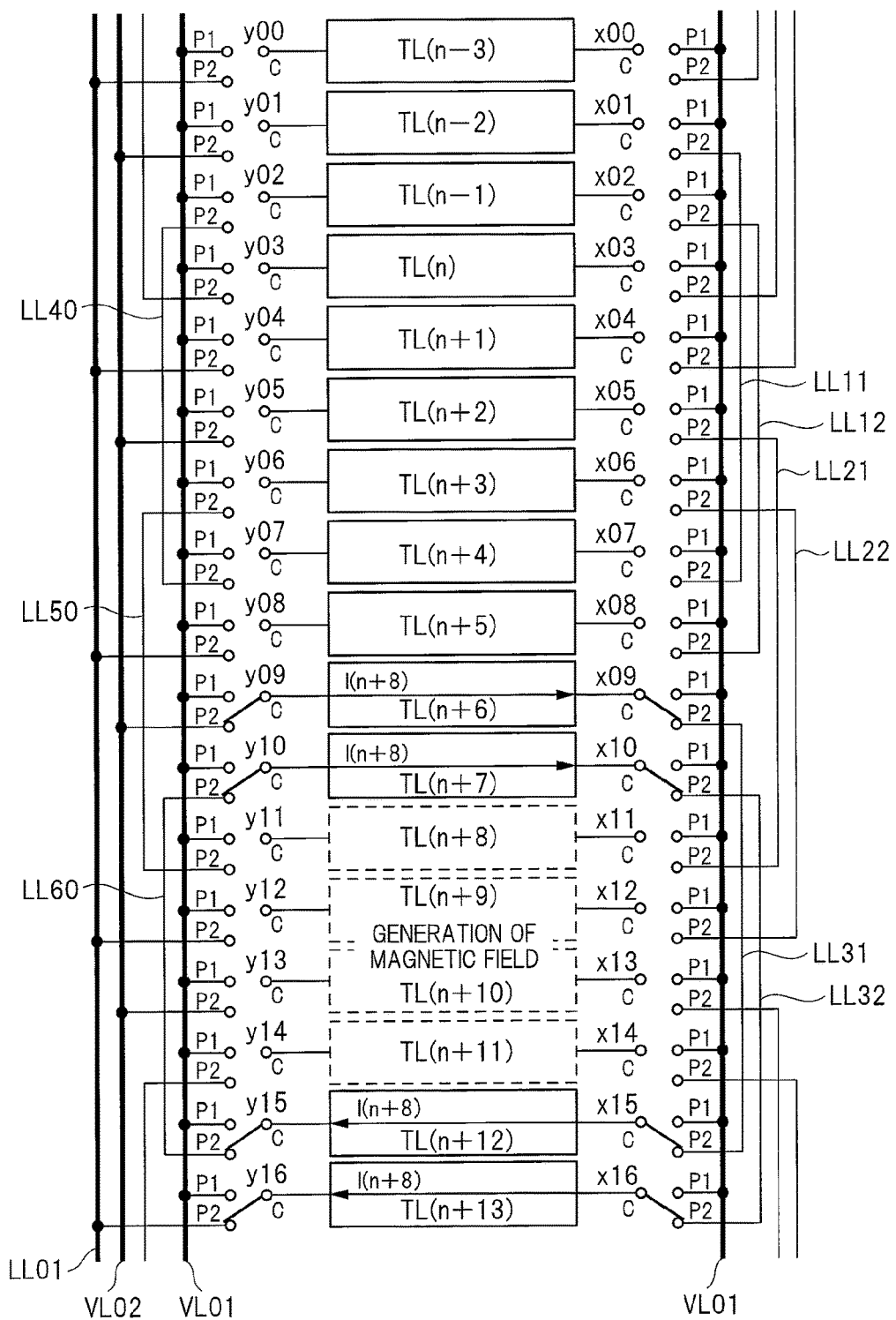
FIG. 36 is a block diagram showing a configuration of the liquid crystal display apparatus studied by the present inventors.

Next, problems caused when a coil is formed by using signal wires inside the liquid crystal display apparatus 1 such as the drive electrodes TL(0) to TL(p) will be described based on results of the study by the present inventors. FIGS. 34 to 36 are block diagrams each showing the configuration of the liquid crystal display apparatus 1 studied by the present inventors. These diagrams show states in touch detection.

In FIG. 34, TL(n−3) to TL(n+13) indicate drive electrodes. In this drawing, VL01 indicates a voltage wire, and a display drive signal is supplied to the drive electrodes TL(n−3) to TL(n+13) via the voltage wire VL01 in display. Also in FIG. 34, VL02 indicates a voltage wire, and, for example, the ground voltage Vss is supplied to the voltage wire VL02 in touch detection. Further in FIG. 34, LL01 indicates a signal wire, and a coil clock signal whose voltage changes periodically is supplied to the signal wire LL01 in touch detection.

In FIG. 34, LL11, LL12, LL21, LL22, LL31, LL32, LL40, LL50, and LL60 indicate signal wires, and x00 to x16 and y00 to y16 indicate switches. Each of the switches x00 to x16 and y00 to y16 includes a common terminal "c" and three terminals (a first terminal "p1", a second terminal "p2", and a third terminal). In order to avoid complexity of the drawing, the third terminal is omitted in FIG. 34. The third terminal of each of the switches x00 to x16 and y00 to y16 is connected to no signal wire, and is in a floating state. The first terminal p1 of each of the switches x00 to x16 is connected to the voltage wire VL01, and the second terminals p2 thereof are connected to the signal wires LL11, LL12, LL21, LL22, LL32, LL32, respectively. The first terminal p1 of each of the switches y00 to y16 is connected to the voltage wire VL01, and the second terminals p2 thereof are connected to the corresponding signal wires LL40, LL50, LL60, the voltage wire VL02, and the signal wire LL01, respectively. In each of these switches x00 to x16 and y00 to y16, the common terminal "c" is selectively connected to the first terminal p1, the second terminal p2, or the third terminal based on a switch control signal not shown.

First, in explanation of a case of display, the switches x00 to x16 and y00 to y16 are controlled based on a switch control signal such that the common terminal "c" of each of them is connected to the first terminal p1. Accordingly, the end of each of the drive electrodes TL(n–3) to TL(n+13) is connected to the voltage wire VL01 via the switches x00 to x16 and y00 to y16. As a result, the desired display drive signal is supplied to the end of each of the drive electrodes TL(n–3) to TL(n+13) via the voltage wire VL01 in display, so that a desired display is possible.

A switch connected to a drive electrode functioned as a coil winding wire among the switches x00 to x16 and y00 to y16 is controlled so that the common terminal "c" is connected to the second terminal p2 in touch detection, and a switch connected to a drive electrode not functioned as the coil winding wire is controlled so that the common terminal c is connected to the third terminal. As explained in FIG. 2, the magnetic field is enhanced inside the coil. Thus, the switches x00 to x16 and y00 to y16 are controlled so that drive electrodes arranged to sandwich an area that generates a magnetic field therebetween configure a coil winding wire.

FIG. 34 shows a case in which an area corresponding to drive electrodes TL(n) to TL(n+3) is assigned as an area where a strong magnetic field is generated. Thus, the switches x01, x02, x07, and x08 and the switches y01, y02, y07, and y08 are selected so that the drive electrodes TL(n–2), TL(n–1), TL(n+4), and TL(n+5) arranged so as to sandwich these drive electrodes TL(n) to TL(n+3) become a coil winding wire. In the selected switches x01, x02, x07, x08, y01, y02, y07, y08, the common terminal c is connected to the second terminal p2. On the other hand, in each of switches that are not selected, the common terminal c is connected to the third terminal.

The third terminal is in a floating state. Therefore, even if the common terminal c is connected to the third terminal, the third terminal is in a high-impedance state. Thus, FIG. 34 shows the common terminal c of the switch not selected to be in a floating state. If, for example, the switches x00, y00 are exemplified, these switches are not selected, and thus, the common terminal c is connected no signal wire and is shown as in a floating state in FIG. 34.

In the switches x01 and x07, the common terminal c is connected to the second terminal p2, so that one end of the drive electrode TL(n–2) is connected to the signal wire L11 via the switch x01, and the signal wire L11 is connected to one end of the drive electrode TL(n+4) via the switch x07. Similarly in the switches x02 and x08, the common terminal c is connected to the second terminal p2, so that one end of the drive electrode TL(n–1) is connected to the signal wire L12 via the switch x02, and the signal wire L12 is connected to one end of the drive electrode TL(n+5) via the switch x08.

In the switches y02 and y07, the common terminal c is connected to the second terminal p2, so that the other end of the drive electrode TL(n–1) is connected to the signal wire LL40 via the switch y02, and the signal wire LL40 is connected to the other end of the drive electrode TL(n+4) via the switch y07. Further in the switch y01, the common terminal c is connected to the second terminal p2, so that the other end of the drive electrode TL(n–2) is connected to the voltage wire VL02 via the switch y01. Also in the switch y08, the common terminal c is connected to the second terminal p2, so that the other end of the drive electrode TL(n+5) is connected to the signal wire LL01 via the switch y08.

Accordingly, the drive electrodes TL(n–2), TL(n–1), TL(n+4), TL(n+5) and the signal wires LL11, LL12, LL40 are connected in series between the signal wire LL01 and the voltage wire VL02. In this case, the drive electrodes TL(n–2), TL(n–1), TL(n+4), TL(n+5) are arranged in parallel with each other, and thus, function as a coil winding wire. By supplying the ground voltage Vss to the voltage wire VL02 and supplying a coil clock signal whose voltage changes periodically to the signal wire LL01, voltages are supplied to both ends of the coil so that, for example, a current shown as an arrow I(n) in FIG. 34 flows. Accordingly, a magnetic field is generated by a coil having the drive electrodes TL(n–2), TL(n–1), TL(n+4), TL(n+5) as a winding wire.

If a pen approaches an area (corresponding to the drive electrodes TL(n) to TL(n+3)) inside the coil, the pen internal capacitive element C is charged in the magnetic field generation period TGT. In the magnetic field detection period TDT, an induced voltage is generated in the coil having the drive electrodes TL(n–2), TL(n–1), TL(n+4), TL(n+5) as the winding wire by a magnetic field generated by the pen internal coil, so that a signal in the signal wire LL01 changes. The change is detected as a detection signal. On the other hand, if the pen does not approach the area, the capacitive element C is not charged in the magnetic field generation period TGT. As a result, in the magnetic field detection period TDT, the signal in the signal wire LL01 does not change. Therefore, the touch by the pen can be detected by determining the signal change in the signal wire LL01.

FIG. 35 shows a state in which, after it is detected whether or not the pen has approached the area inside the coil (corresponding to the drive electrodes TL(n) to TL(n+3)) described with reference to FIG. 34, it is detected whether or not the pen approaches a close area.

The configuration shown in FIG. 35 is the same as the configuration in FIG. 34. The difference from FIG. 34 is that the area inside the coil, that is, the area where a magnetic field is generated is different. That is, the switches x00 to x16 and y00 to y16 are controlled so that a magnetic field is generated in an area (drive electrodes TL(n+4) to TL(n+7)) close to the area (drive electrodes TL(n) to TL(n+3)). In explanation with reference to FIG. 35, the switches x05, x06, x11, x12 and the switches y05, y06, y11, and y12 connected to the drive electrodes TL(n+2), TL(n+3), TL(n+8), TL(n+9) arranged so as to sandwich the drive electrodes TL(n+4) to TL(n+7) are controlled to be selected so that the common terminal c in these selected switches is connected to the second terminal p2.

On the other hand, remaining non-selected switches are controlled so that the common terminal c is connected to the third terminal. Accordingly, in the touch detection, the drive electrodes TL(n+2), TL(n+3), TL(n+8), TL(n+9) and the signal wires LL21, LL22, LL50 are connected in series between the signal wire LL01 and the voltage wire VL02 via the selected switches x05, x06, x11, x12 and y05, y06, y11, and y12. That is, a coil having the drive electrodes TL(n+2), TL(n+3), TL(n+8), TL(n+9) as a winding wire is formed.

As similar to the description with reference to FIG. 34, by supplying a coil clock signal to the coil having the drive electrodes TL(n+2), TL(n+3), TL(n+8), TL(n+9) as a winding wire via the signal wire LL01 and supplying the ground voltage Vss to the voltage wire VL02, a magnetic field is generated in the area inside the coil (corresponding to the drive electrodes TL(n+4) to TL(n+7)). By detecting a signal change in the signal wire LL01 in the magnetic field detection period TDT after the magnetic field is generated, it can be detected whether or not a pen approaches the area inside the coil (corresponding to the drive electrodes TL(n+4) to TL(n+7)). Note that FIG. 35 shows a current flowing through the coil in the magnetic field generation period TGT as an arrow "I(n+4)".

FIG. 36 shows a state in which, after it is detected whether or not the pen has approached the area inside the coil (corresponding to the drive electrodes TL(n+4) to TL(n+7)) described with reference to FIG. 35, it is detected whether or not the pen approaches a close area.

The configuration shown in FIG. 36 is also the same as the configuration in FIG. 35. The difference from FIG. 35 is that the area inside the coil, that is, the area where a magnetic field is generated is different. That is, the switches x00 to x16 and y00 to y16 are controlled so that a magnetic field is generated in an area (drive electrodes TL(n+8) to TL(n+11)) close to the area (drive electrodes TL(n+4) to TL(n+7)). In the description with reference to FIG. 36, control is exercised such that the switches x09, x10, x15, x16 and the switches y09, y10, y15, and y16 connected to the drive electrodes TL(n+6), TL(n+7), TL(n+12), TL(n+13) arranged so as to sandwich the drive electrodes TL(n+8) to TL(n+11) are controlled to be selected so that the common terminal c in these selected switches is connected to the second terminal p2.

On the other hand, remaining non-selected switches are controlled so that the common terminal c is connected to the third terminal. Accordingly, in the touch detection, the drive electrodes TL(n+6), TL(n+7), TL(n+12), TL(n+13) and the signal wires LL31, LL32, LL60 are connected in series between the signal wire LL01 and the voltage wire VL02 via the selected switches x09, x10, x15, x16 and y09, y10, y15, and y16. That is, a coil having the drive electrodes TL(n+6), TL(n+7), TL(n+12), TL(n+13) as a winding wire is formed.

As similar to the description with reference to FIG. 34, by supplying a coil clock signal to the coil having the drive electrodes TL(n+6), TL(n+7), TL(n+12), TL(n+13) as a winding wire via the signal wire LL01 and supplying the ground voltage Vss to the voltage wire VL02, a magnetic field is generated in the area inside the coil (corresponding to the drive electrodes TL(n+8) to TL(n+11)). By detecting a signal change in the signal wire LL01 in the subsequent magnetic field detection period TDT, it can be detected whether or not a pen approaches the area inside the coil (corresponding to the drive electrodes TL(n+8) to TL(n+11)). Note that FIG. 36 shows a current flowing through the coil in the magnetic field generation period TGT as an arrow I(n+8).

As described with reference to FIGS. 34 to 36, a coil can be formed in touch detection by using the drive electrodes TL(0) to TL(p). FIGS. 34 to 36 show a case in which the number of windings of the formed coil is two as an example. However, by further increasing the number of windings, the inductance of coil can be increased more, so that the generated magnetic field can be more enhanced. However, the drive electrode is formed of, for example, a transparent electrode. The sheet resistance of a transparent electrode is much larger than that of a regular metallic wire. Thus, if the number of windings of coil is increased, the impedance of the coil, that is, the impedance of the coil connected between the signal wire LL01 and the voltage wire VL02 increases, and therefore, a current flowing through the coil becomes small. If the current flowing through the coil is small in the magnetic field generation period TGT, the generated magnetic field becomes weak. As a result, degradation of the accuracy of detection is concerned.

Note that it can be considered that the sheet resistance of the drive electrode is decreased by electrically connecting a plurality of auxiliary electrodes (second electrodes) having a lower sheet resistance than the transparent electrode (first electrode) to the transparent electrode. However, even in such a case, the sheet resistance of the drive electrode formed of the first electrode and the plurality of second electrodes is still higher than that of a regular metallic wire, and therefore, it is difficult to generate a strong magnetic field.

By the above-described study of the present inventors, it has been understood that a coil can be formed in touch detection by using signal wires (drive electrodes) provided in the liquid crystal display apparatus 1. However, because a signal wire formed of a transparent electrode such as a transparent electrode has a high sheet resistance, the present inventors have reached such a problem that the ignorable coil impedance in a general metallic wire cannot be ignored if the coil inductance is enhanced to be able to generate a strong magnetic field.

<Overview of the Liquid Crystal Display Apparatus>

Figure 6:
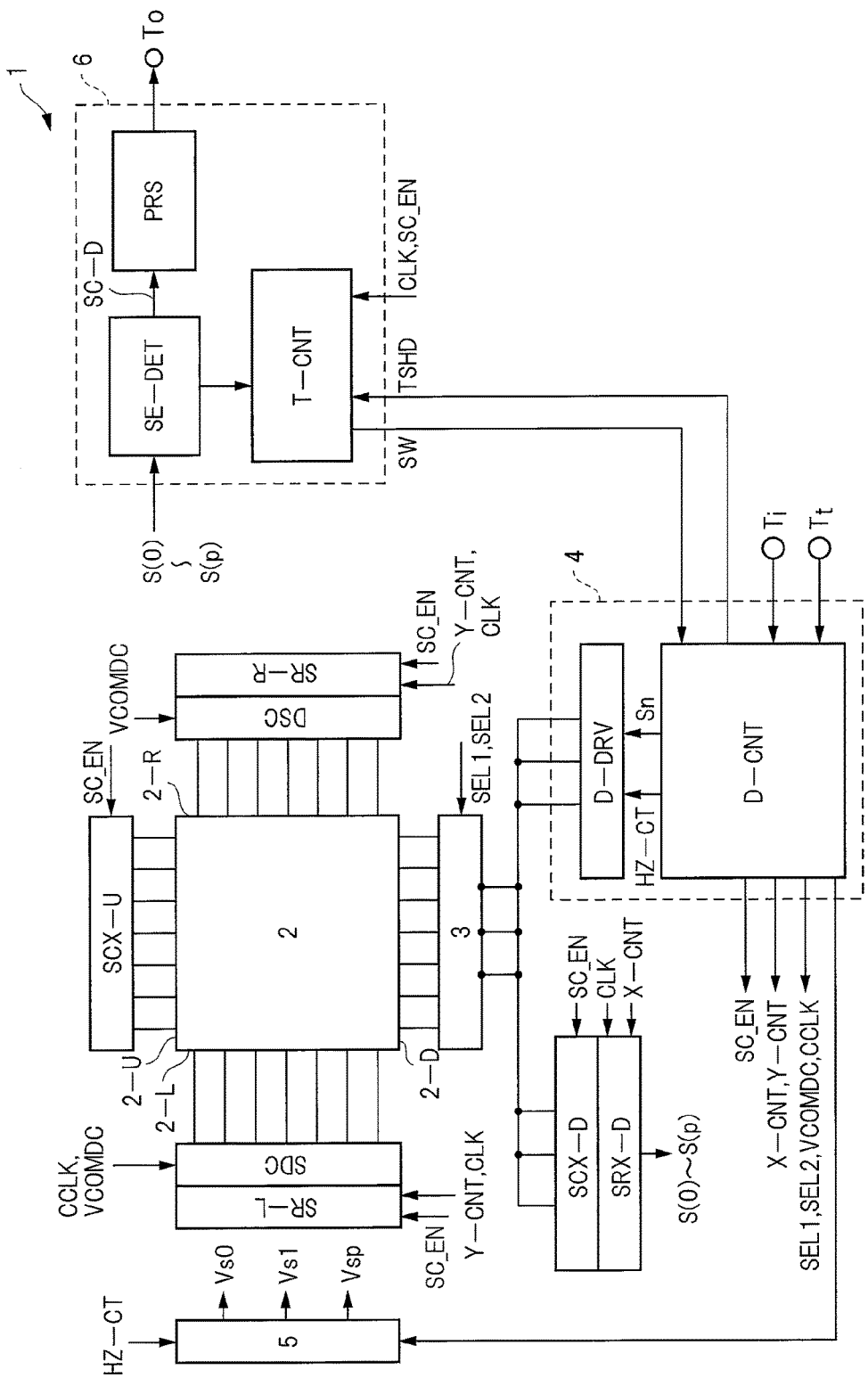
FIG. 6 is a block diagram showing a configuration of the liquid crystal display apparatus according to the first embodiment.

FIG. 6 is a block diagram showing the configuration of the liquid crystal display apparatus 1 according to the first embodiment. In FIG. 6, the liquid crystal display apparatus 1 includes a display panel (liquid crystal panel) 2, a display control device 4, a gate driver 5, and a touch control device 6. The liquid crystal display apparatus 1 also includes selection control circuits SR-L, SR-R, SRX-D, a switching circuit DSC, a selection drive circuit SDC, and switching adjustment circuits SCX-U, SCX-D. Since these devices and circuits included in the liquid crystal display apparatus 1 will be described in detail later, an overview thereof will be described here.

The display panel 2 has a pixel array LCD described later with reference to FIG. 10 in which a plurality of pixels are arranged in a matrix form. In the pixel array LCD, a plurality of signal lines, a plurality of drive electrodes, and a plurality of scanning lines are arranged. Here, the signal line is arranged in each column of the pixel array LCD, the drive electrode is arranged in a row of the pixel array LCD, and the plurality of scanning lines are arranged in each row of the pixel array LCD. That is, in this drawing, the signal wires extend in a vertical direction (column direction) and are arranged in parallel in a horizontal direction (row direction). The drive electrodes extend in the horizontal direction and are arranged in parallel in the vertical direction. Further, the scanning lines extend in the horizontal direction and are arranged in parallel in the vertical direction. In this case, a pixel is arranged in a portion where a signal line and a scanning line intersect. In a period of display (display period), pixels are selected by signal lines and scanning lines, the voltage of the signal line and the voltage (display drive signal) of the drive electrode at that time are applied to the selected pixels, and the selected pixels produce a display in accordance with a voltage difference between the signal line and the drive electrode.

The display control device 4 includes a control circuit D-CNT and a signal line driver D-DRV. The control circuit D-CNT receives a timing signal supplied to an external terminal Tt and image information supplied to an input terminal Ti, forms an image signal Sn in accordance with the image information supplied to the input terminal Ti, and supplies the image signal Sn to the signal line driver D-DRV. The signal line driver D-DRV supplies the supplied image signal Sn to a signal line selector 3 in a display period in a time-division mode. The control circuit D-CNT also receives a timing signal supplied to the external terminal Tt and a control signal SW from the touch control device 6 to form various control signals. As the control signals formed by the control circuit D-CNT, there are selection signals SEL1, SEL2 supplied to the signal line selector 3, a synchronizing signal TSHD, a clock signal CLK, a magnetic-field enable signal SC_EN, a display drive signal VCOMDC, control signals X-CNT, Y-CNT related to touch detection, a coil clock signal CCLK, a high-impedance control signal HZ-CT, and others.

Among signals formed by the control circuit D-CNT, the magnetic-field enable signal SC_EN is an enable signal indicating that touch detection (magnetic field touch detection) is performed. The synchronizing signal TSHD is a synchronizing signal that identifies a period (display period) in which the display panel 2 produces a display and a period (touch detection period) in which touch detection is performed, and the display drive signal VCOMDC is a drive signal supplied to the drive electrodes in a display period.

In a display period, the signal line driver D-DRV supplies the image signal Sn to the signal line selector 3 in accordance with the selection signals SEL1, SEL2 in time-division mode. The signal line selector 3 is connected to the plurality of signal lines arranged in the display panel 2, and supplies the supplied image signal to appropriate signal lines in accordance with the selection signals SEL1, SEL2 in a display period. The gate driver 5 forms scanning line signals Vs0 to Vsp in accordance with a timing signal from the control circuit D-CNT in a display period, and supplies the scanning line signals Vs0 to Vsp to the scanning lines in the display panel 2. In a display period, pixels connected to scanning lines to which a high-level scanning line signal is supplied are selected, and the display is performed when the selected pixels perform the display in accordance with the image signal supplied to the signal line at that time.

Although not specifically limited, the high-impedance control signal HZ-CT is supplied from the control circuit D-CNT to the signal line driver D-DRV and the gate driver 5. The output of the signal line driver D-DRV and the gate driver 5 is put into a high-impedance state by the high-impedance control signal HZ-CT in a touch detection period, although not specifically limited.

The touch control device 6 includes a magnetic field detection circuit SE-DET that receives sense signals S(0) to S(p), a processing circuit PRS that extracts coordinates of the touched position by performing processing on a detection signal SC-D from the magnetic field detection circuit SE-DET, and a control circuit T-CNT. The control circuit T-CNT receives the synchronizing signal TSHD, the clock signal CLK, and the magnetic-field enable signal SC_EN from the display control device 4, and controls the touch control device 6 so as to operate in synchronization with the display control device 4.

That is, when the synchronizing signal TSHD and the magnetic-field enable signal SC_EN indicate touch detection, the control circuit T-CNT performs control so that the magnetic field detection circuit SE-DET and the processing circuit PRS operate. The control circuit T-CNT also receives a detection signal from the magnetic field detection circuit SE-DET, forms the control signal SW, and supplies the control signal SW to the control circuit D-CNT. The processing circuit PRS outputs extracted coordinates from the external terminal To as the coordinate information.

The display panel 2 has sides 2-U, 2-D parallel to the row of the pixel array LCD and sides 2-R, 2-L parallel to the column of the pixel array LCD. Here, the side 2-U and the side 2-D are sides opposite to each other, and the plurality of drive electrodes and the plurality of scanning lines in the pixel array LCD are arranged so as to be sandwiched therebetween. Also, the side 2-R and the side 2-L are sides opposite to each other, and the plurality of signal lines in the pixel array LCD are arranged so as to be sandwiched therebetween.

The switching circuit DSC is arranged along the side 2-R of the display panel 2, and the selection drive circuit SDC is arranged along the side 2-L of the display panel 2. The switching circuit DSC is connected to the plurality of drive electrodes arranged in the display panel 2 on the side 2-R side of the display panel 2, and the selection drive circuit SDC is connected to the plurality of drive electrodes arranged in the display panel 2 on the side 2-L side of the display panel 2. That is, the switching circuit DSC and the selection drive circuit SDC are connected to drive electrodes arranged in the display panel 2 outside the display panel 2.

The selection control circuit SR-R is arranged along the side 2-R of the display panel 2 although not specifically limited, and the switching circuit DSC arranged along the same side 2-R operates in accordance with instructions from the corresponding selection control circuit SR-R. The selection control circuit SR-L is arranged along the side 2-L of the display panel 2 although not specifically limited, and the selection drive circuit SDC arranged along the same side 2-L operates in accordance with instructions from the corresponding selection control circuit SR-L.

The selection control circuit SR-R assigns a plurality of drive electrodes, each of which becomes a coil winding wire, to the switching circuit DSC so that a plurality of coils are formed for touch detection. The switching circuit DSC electrically connects the assigned drive electrodes, so that a plurality of coils are formed. In a display period, the selection control circuit SR-R controls the switching circuit DSC so as to supply the display drive signal VCOMDC to drive electrodes. The selection control circuit SR-L assigns a plurality of drive electrodes to be coil winding wires of a plurality of coils in touch detection for the selection drive circuit SDC. The selection drive circuit SDC supplies a drive signal for magnetic field (magnetic-field drive signal) to the plurality of assigned drive electrodes. In a display period, the selection control circuit SR-L controls the selection drive circuit SDC so as to supply the display drive signal VCOMDC to drive electrodes.

That is, when the touch detection is instructed by the magnetic-field enable signal SC_EN, the selection control circuits SR-R, SR-L assign a plurality of drive electrodes arranged so as to sandwich an area where the touch is to be detected from the drive electrodes TL(0) to TL(p). The switching circuit DSC electrically connects the plurality of assigned drive electrodes, and the selection drive circuit SDC supplies a magnetic-field drive signal to the plurality of assigned drive electrodes. As the magnetic-field drive signal at this time, the selection drive circuit SDC supplies the coil clock signal CCLK whose voltage changes periodically. Here, the selection control circuits SR-R, SR-L assign drive electrodes so that an area where the touch is to be detected is arranged inside a plurality of coils. That is, the selection control circuits SR-R, SR-L assign a plurality of drive electrodes from the drive electrodes TL(0) to TL(p) such that an area overlapped with a plurality of coils includes an area where the touch is to be detected.

Accordingly, magnetic fields generated by a plurality of coils superpose in an area where the touch is to be detected in the magnetic field generation period TGT in a touch detection period, so that a strong magnetic field is generated. In a display period, a display drive signal is supplied from both ends of the drive electrode to the drive electrode, and thus, the voltage of the drive electrode can be stabilized.

The switching adjustment circuit SCX-U is arranged along the side 2-U of the display panel 2, and the switching adjustment circuit SCX-U is connected to a plurality of signal lines arranged in the display panel 2 on the side 2-U side. That is, the switching adjustment circuit SCX-U is connected to a plurality of signal lines outside the display panel 2. The switching adjustment circuit SCX-D is connected to the plurality of signal lines arranged in the display panel 2 via the signal line selector 3 arranged along the side 2-D of the display panel 2.

When the touch detection is assigned by the magnetic-field enable signal SC_EN in a touch detection period, the switching adjustment circuits SCX-U, SCX-D electrically connect signal lines arranged in the display panel 2 to form a plurality of coils having signal lines as winding wires. In a touch detection period, the selection control circuit SRX-D selects a coil formed of signal lines arranged so as to sandwich an area where the touch is to be detected, from the plurality of coils formed of signal lines. A signal change in the selected coil in the magnetic field detection period TDT in a touch detection period is output and supplied to the magnetic field detection circuit SE-DET as the sense signals S(0) to S(p).

In the electromagnetic induction system described using FIGS. 2 and 3, the coil used to generate a magnetic field and the coil used to detect a magnetic field are the same as each other. However, in the first embodiment, the coil used to generate a magnetic field and the coil used to detect a magnetic field are different from each other. That is, a magnetic field is generated by a coil formed of drive electrodes in the magnetic field generation period TGT, and a magnetic field is detected by a coil formed of signal lines in the magnetic field detection period TDT. Also in this case, the basic principle of the electromagnetic induction system is the same as the basic principle described with reference to FIGS. 2 and 3. That is, in the magnetic field generation period TGT, the pen internal coil L1 (FIG. 2) generates an induced voltage based on a magnetic field generated by the coil formed of the drive electrodes to charge the capacitative element C (FIG. 2). In the magnetic field detection period TDT, an induced voltage is generated in the coil formed of signal lines based on a magnetic field generated by the pen internal coil L1, and a sense signal (hereinafter, also called a detection signal) representing a signal change in the signal line or a result of touch detection is generated.

When a coil having the signal lines as winding wires is formed by the switching adjustment circuits SCX-U, SCX-D, the signal line selector 3 electrically connects signal lines and the switching adjustment circuit SCX-D.

In a touch detection period, the magnetic field detection circuit SE-DET in the touch control device 6 is operated by the magnetic-field enable signal SC_EN. The magnetic field detection circuit SE-DET amplifies and converts the sense signals S(0) to S(p) into digital signals, and supplies the digital signals to the processing circuit PRS as the detection signal SC-D. Based on the supplied detection signal SC-D, the processing circuit PRS extracts coordinates of the position touched by a pen and outputs the coordinates to an external terminal To as position information.

For the magnetic field detection period TDT, such description that a coil is selected by the selection control circuit SRX-D has been made. However, the selection control circuit SRX-D may supply a signal change in each of coils formed of signal lines as the sense signals S(0) to S(p) to the magnetic field detection circuit SE-DET without selecting a coil. In this case, each of the sense signals S(0) to S(p) can be amplified temporally in parallel by the magnetic field detection circuit SE-DET, so that a speed of a detection operation can be increased.

An overview of operations of the switching circuit DSC, the selection drive circuit SDC, the switching adjustment circuits SCX-U, SCX-D, and the selection control circuits SR-R, SR-L, SRX-D in a touch detection period has been described. In a display period, they are operated as follows.

That is, in a display period, the switching circuit DSC and the selection drive circuit SDC supply a display drive signal to a plurality of drive electrodes. Also, the switching adjustment circuits SCX-U, SCX-D electrically isolate signal lines. Accordingly, in a display period, the image signal Sn from the signal line driver D-DRV is supplied to appropriate signal lines by the signal line selector 3. Because the display drive signal is supplied to the drive electrodes, the scanning line is set to a high level and thus, a voltage difference between an image signal supplied to the signal line and the display drive signal supplied to the drive electrode is applied to the selected pixels, so that a display in accordance with the image signal is produced.

In the first embodiment, the drive electrode serves as a coil winding wire that generates a magnetic field and also as a signal wire that transfers a display drive electrode. Also, the signal line serves as a coil winding wire that detects a magnetic field and also as a signal wire that transfers an image signal. Accordingly, the liquid crystal display apparatus 1 with a touch detection function can be provided while suppressing the increase in the manufacturing cost.

In the first embodiment, a display drive signal or a magnetic-field drive signal is supplied to the drive electrode by the switching circuit DSC, the selection drive circuit SDC, and the selection control circuits SR-R, SR-L. Thus, an electrode drive circuit can be considered to be configured of the switching circuit DSC, the selection drive circuit SDC, and the selection control circuits SR-R, SR-L.

Similarly, an image signal or a sense signal is transferred by the switching adjustment circuits SCX-U, SCX-D and the selection control circuit SRX-D. Thus, a signal line drive circuit can be considered to be configured of the switching adjustment circuits SCX-U, SCX-D and the selection control circuit SRX-D. In this case, the signal line drive circuit can be considered to be configured of a switching circuit including a first switching circuit SCX-U arranged along the side 2-U of the display panel 2 and second switching circuit SCX-D arranged along the side 2-D side of the display panel 2 and the selection control circuit SRX-D.

<Module Configuration of the Liquid Crystal Display Apparatus 1>

Figure 7:
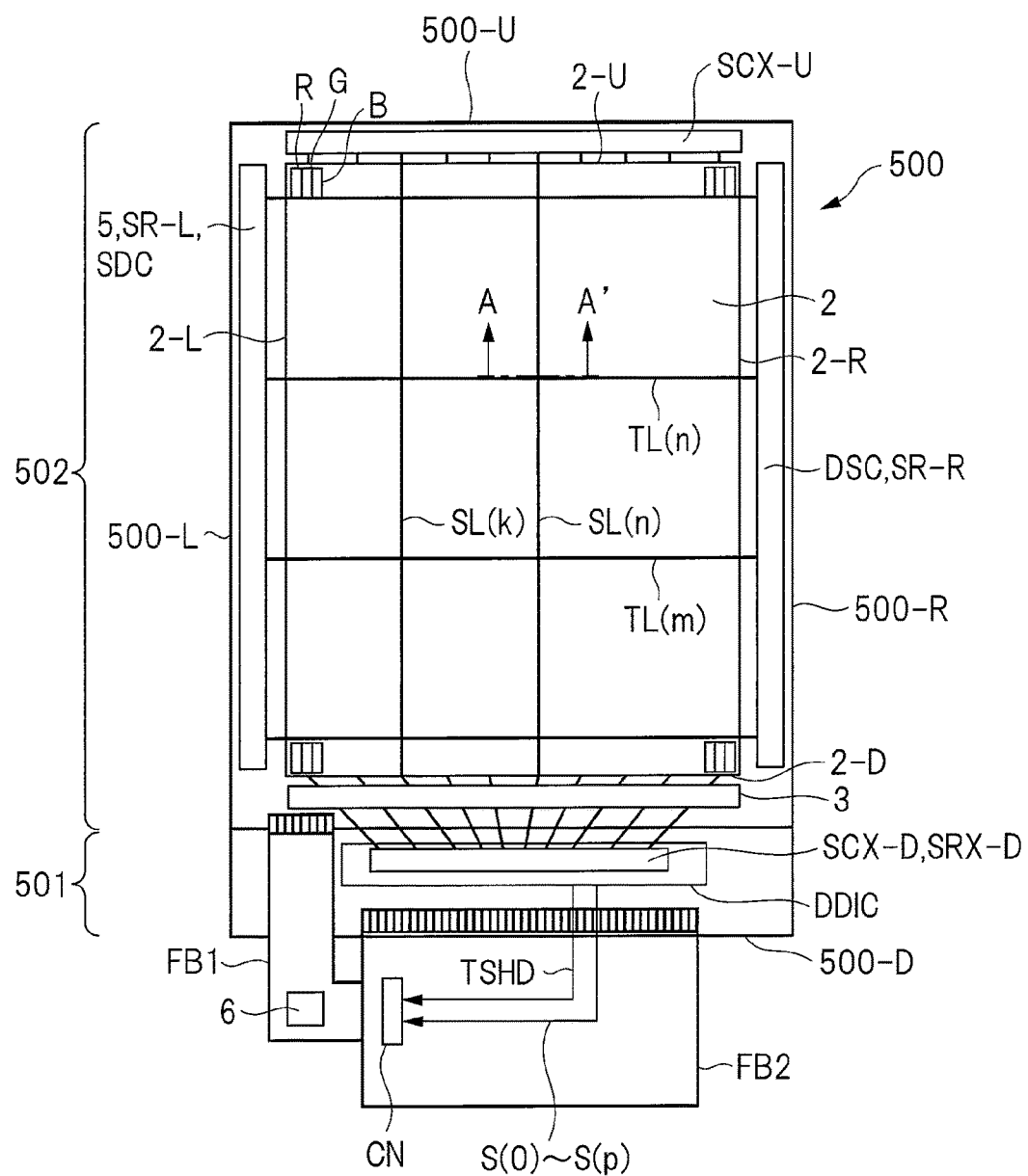
FIG. 7 is a plan view showing a configuration of a module mounted with the liquid crystal display apparatus according to the first embodiment.

FIG. 7 is a schematic plan view showing an overall configuration of a module 500 mounted with the liquid crystal display apparatus 1. Although schematically shown, FIG. 7 shows practical arrangement. In this drawing, reference character 501 indicates an area of the TFT glass substrate shown in FIGS. 4 and 5, and reference character 502 indicates an area having the TFT glass substrate and the CF glass substrate shown in FIGS. 4 and 5. In the module 500, the TFT glass substrate is integrated. That is, the TFT glass substrate is common between the area 501 and the area 502, and the CF glass substrate or others are further formed on the upper surface of the TFT glass substrate in the area 502 as shown in FIGS. 4 and 5.

In FIG. 7, reference character 500-U indicates a short side of the module 500, and reference character 500-D indicates a side of the module 500 which is a short side opposite to the short side 500-U. Also, reference character 500-L indicates a long side of the module 500, and reference character 500-R indicates a side of the module 500 which is a long side opposite to the long side 500-L.

The gate driver 5, the selection drive circuit SDC, and the selection control circuit SR-L shown in FIG. 6 are arranged in an area between the side 2-L of the display panel 2 and the long side 500-L of the module 500 in the area 502. Also, the switching circuit DSC and the selection control circuit SR-R shown in FIG. 6 are arranged in an area between the side 2-R of the display panel 2 and the long side 500-R of the module 500. The switching adjustment circuit SCX-U shown in FIG. 6 is arranged in an area between the side 2-U of the display panel 2 and the short side 500-U of the module 500.

Also, the signal line selector 3, the switching adjustment circuit SCX-D, the selection control circuit SRX-D, and the semiconductor device for drive DDIC shown in FIG. 6 are arranged in an area between the side 2-D of the display panel 2 and the short side 500-D of the module 500.

In the first embodiment, the signal line driver D-DRV and the control circuit D-CNT shown in FIG. 6 are embedded in one semiconductor device. In the present specification, one semiconductor device is shown as the semiconductor device for drive DDIC. Also, the touch control device 6 shown in FIG. 6 is further embedded in one semiconductor device. In the present specification, In order to distinguish from the semiconductor device for drive DDIC, the semiconductor device in which the touch control device 6 is embedded is called the semiconductor device for touch 6. Naturally, each of the semiconductor device for drive DDIC and the semiconductor device for touch 6 may be configured of a plurality of semiconductor devices. Also, for example, in the semiconductor device for drive DDIC, the switching adjustment circuit SCX-D and the selection control circuit SRX-D may be embedded.

In the first embodiment, the switching adjustment circuit SCX-D and the selection control circuit SRX-D are arranged in the area 501 and configured of wires and components formed in the TFT glass substrate of the area 501. As the components, a switching component is cited, and the switching component is, for example, a thin film transistor (hereinafter, called a TFT transistor). Also, the semiconductor device for drive DDIC is mounted on the TFT glass substrate so as to cover the switching adjustment circuit SCX-D and the selection control circuit SRX-D when seen in plane view. Accordingly, increase in a size of a lower frame of the display panel 2 can be suppressed.

Also, components configuring the switching circuit DSC, the selection drive circuit SDC, the switching adjustment circuit SCX-U, and the selection control circuits SR-R, SR-L are formed on the TFT glass substrate in the area 502.

In FIG. 7, reference characters FB1 and FB2 indicate flexible cables. Although not specifically limited, the semiconductor device for touch 6 is mounted on the flexible cable FB1, and a connector CN is mounted on the flexible cable FB2. The sense signals S(0) to S(p) described with reference to FIG. 6 are supplied from the selection control circuit SRX-D to the semiconductor device for touch 6 via the connector CN. Further, via the connector CN, signals are transmitted and received between the semiconductor device for touch 6 and the semiconductor device for drive DDIC. In FIG. 7, the synchronizing signal TSHD is shown as an example of signals that are transmitted and received.

As described above, the display panel 2 includes, a pixel array in which a plurality of pixels are arranged in a matrix form, and the pixel array includes the plurality of drive electrodes TL(0) to TL(p) and scanning lines GL(0) to GL(p) arranged along the row of the array and a plurality of signal lines SL(0) to SL(p) arranged along the column of the array. FIG. 7 shows two drive electrodes TL(n), TL(m) and two signal wires SL(k), SL(n) as an example. Note that the scanning lines are omitted in FIG. 7. Pixels are arranged in intersecting portions between the signal lines SL(0) to SL(p) and the scanning lines or the drive electrodes TL(0) to TL(p). Reference characters R, G, and B explicitly shown on four sides of the display panel 2 shown in FIG. 7 indicate pixels corresponding to three primary colors.

Figure 8:
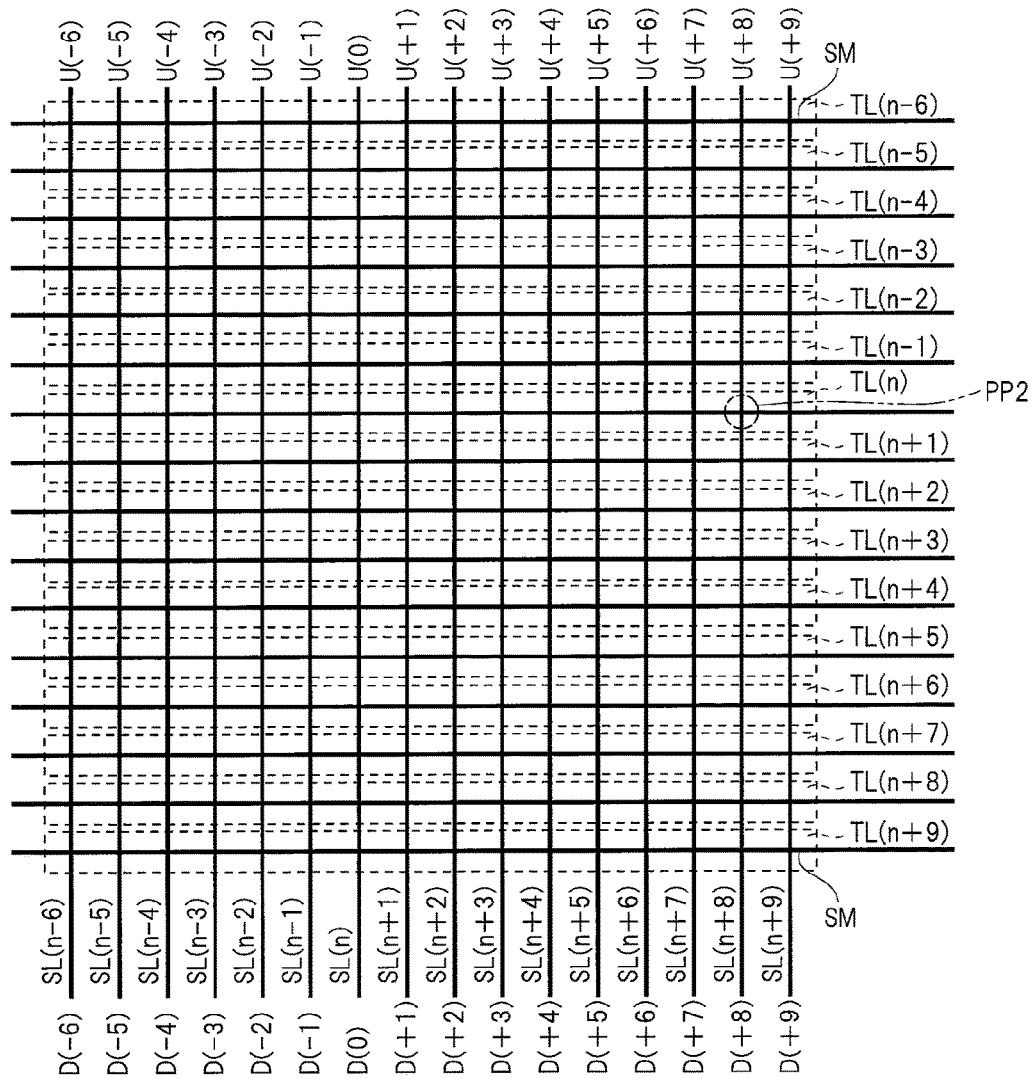
FIG. 8 is a plan view showing a configuration of a display panel of the liquid crystal display apparatus according to the first embodiment.

FIG. 8 is a plan view showing the relation between the drive electrodes and signal lines included in the display panel 2. The display panel 2 includes the drive electrodes TL(0) to TL(p) and the signal lines SL(0) to SL(p). In FIG. 8, some of these drive electrodes and signal lines are shown as the drive electrodes TL(n−6) to TL(n+9) and the signal lines SL(n−6) to SL(n+9). In FIG. 8, note that the scanning lines are omitted.

In explanation of the drive electrode made by exemplifying the drive electrodes TL(n−6) to TL(n+9) shown in FIG. 8, each drive electrode includes a first electrode and a plurality of second electrodes connected to the first electrode. Here, the first electrode is, for example, a transparent electrode, and the second electrode is an electrode having a sheet resistance lower than that of the first electrode. In FIG. 8, one second electrode of the plurality of second electrodes included in each drive electrode is shown as an auxiliary electrode SM. In order to avoid the complexity of the drawing, in FIG. 8, the reference character SM is attached to only auxiliary electrodes included in the drive electrodes TL(n−6), TL(n+9).

As similar to the first electrode (transparent electrode) configuring the drive electrode, the auxiliary electrode SM extends in the row direction of the array and is electronically connected to the first electrode. Accordingly, a combined resistance (impedance) of the drive electrode including the first electrode and the auxiliary electrode (second electrode) can be reduced. In the present specification, the first electrode (transparent electrode) and the second electrode (auxiliary electrode SM) connected to the first electrode are combined and called the drive electrode unless otherwise specified.

In FIG. 8, note that reference characters U(−6) to U(+9) and D(−6) to D(+9) are reference characters to indicate connection to the switching adjustment circuits SCX-U, SCX-D described below.

<Structure of the Display Panel>

Figure 9:
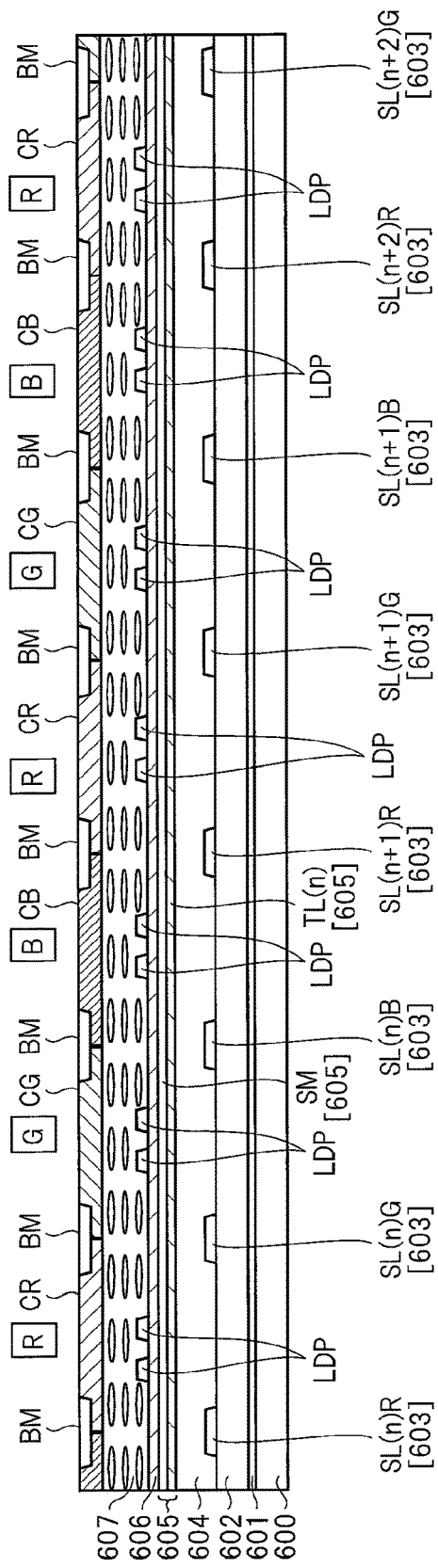
FIG. 9 is a cross-sectional view showing the cross section of the liquid crystal display apparatus according to the first embodiment.

FIG. 9 is a cross-sectional view showing the configuration of the display panel 2 included in the liquid crystal display apparatus 1 according to the first embodiment. From the viewpoint of display, the area (first area) of the display panel 2 is an active area where a display is produced. On the other hand, an area (second area) outside the display panel 2 is an area where no display is produced, and can be considered to be a non-active area or a peripheral area. In explanation with reference to FIG. 7 as an example, the active area is an area surrounded by the sides 2-U, 2-D, 2-R, 2-L of the display panel 2.

FIG. 9 shows an A-A' cross section of the display panel 2 shown in FIG. 7. In the first embodiment, in order to produce a color display, one color pixel is displayed by using three pixels corresponding to three primary colors of R (red), G (green), and B (blue). That is, one color pixel can be considered to be formed of three sub-pixels. In this case, in the display period, signal lines that transfer a color image signal are formed of three signal lines. In order to show a concrete structure of the display panel 2, FIG. 9 shows an example of producing the color display.

Before the explanation of FIG. 9, reference characters of the signal lines used in FIG. 9 will be described. Each of the signal lines SL(0) to SL(p) indicates a signal line that transfers a color image signal in a display period. Each signal line includes three signal lines that transfer an image signal to three sub-pixels. In FIG. 9, the three signal lines are distinguished from one another by attaching an alphabetical character of the corresponding sub-pixel to the end of the reference character of the signal line. When the signal line SL(n) is exemplified, the signal line SL(n) includes signal lines SL(n)R, SL(n)G, SL(n)B. Here, the alphabetical character "R" attached to the end of the reference character SL(n) indicates a signal line that transfers an image signal to a sub-pixel corresponding to red (R) of the three primary colors, the alphabetical character "G" attached to the end of the reference character SL(n) indicates a signal line that transfers an image signal to a sub-pixel corresponding to green (G) of the three primary colors, and the alphabetical character "B" attached to the end of the reference character SL(n) indicates a signal line that transfers an image signal to a sub-pixel corresponding to blue (B) of the three primary colors.

In FIG. 9, reference character 600 indicates a TFT glass substrate. On the TFT glass substrate 600, a first wiring layer (metallic wire layer) 601 is formed. The scanning line GL(n) is configured of a wire formed in the first wiring layer 601. An insulating layer 602 is formed on the first wiring layer 601, and a second wiring layer (metallic wire layer) 603 is formed on the insulating layer 602. Signal lines SL(n)R, SL(n)G, SL(n)B, signal lines SL(n+1)R, SL(n+1)G, SL(n+1)B, and signal lines SL(n+2)R, SL(n+2)G are configured of a wire formed in the second wiring layer 603. In this drawing, in order to show the fact that these signal lines are configured of the second wiring layer 603, reference character 603 indicating the second wiring layer is attached to the end of the signal line in parenthesis [ ]. For example, the signal line SL(n)G is indicated as SL(n)G[603].

An insulating layer 604 is formed on the second wiring layer 603, and a third wiring layer (metallic wire layer) 605 is formed on the insulating layer 604. The drive electrode TL(n) and the auxiliary electrode SM are configured of a wire formed in the third wiring layer 605. Here, the drive electrode TL(n) is a transparent electrode (first electrode). The auxiliary electrode SM (secondary electrode) has a resistance value lower than that of the drive electrode TL(n) and is formed so as to be electrically connected to the drive electrode TL(n). The resistance value of the drive electrode TL(n) which is a transparent electrode is relatively high. However, by electrically connecting the auxiliary electrode SM to the drive electrode TL(n), the combined resistance can be reduced. Also here, a reference character [605] attached to the reference characters of the drive electrode and the auxiliary electrode indicates that they are configured of the third wiring layer 605.

An insulating layer 606 is formed on the third wiring layer 605, and a pixel electrode LDP is formed on the top surface of the insulating layer 606. In FIG. 9, each of CR, CB, and CG is a color filter. A liquid crystal layer 607 is sandwiched between the color filters CR(red), CG(green), CB(blue) and the insulating layer 606. Here, the pixel electrode LDP is provided at an intersection between a scanning line and a signal line, and the color filter CR, CG, or CB corresponding to each of the pixel electrodes LDP is provided above each pixel electrode LDP. A black matrix BM is provided between the color filters CR, CG, CB.

Although omitted in FIG. 9, a CF glass substrate is formed on the color filters CR, CG, CB as shown in FIGS. 4 and 5. Further, on the CF glass substrate, a light polarizing plate is arranged as shown in FIG. 5.

<Pixel Array>

Next, the circuit configuration of the display panel 2 will be described. FIG. 10 is a circuit diagram showing a circuit configuration of the display panel 2 shown in FIG. 7. Also in FIG. 10, a signal line is shown in the same form as in FIG. 9. In this drawing, each of a plurality of SPix indicated by an alternate long and short dash line shows one liquid crystal display element (sub-pixel). The sub-pixel SPix is arranged in a matrix form in the display panel 2 to configure a liquid crystal element array (pixel array) LCD. The pixel array LCD includes a plurality of the scanning lines GL(0) to GL(p) arranged in each row and extending in the row direction and signal lines SL(0)R, SL(0)G, SL(0)B to SL(p)R, SL(p)G, SL(p)B arranged in each column and extending in the column direction. The pixel array LCD also includes the drive electrodes TL(0) to TL(p) arranged in each row and extending in the row direction.

Figure 10:
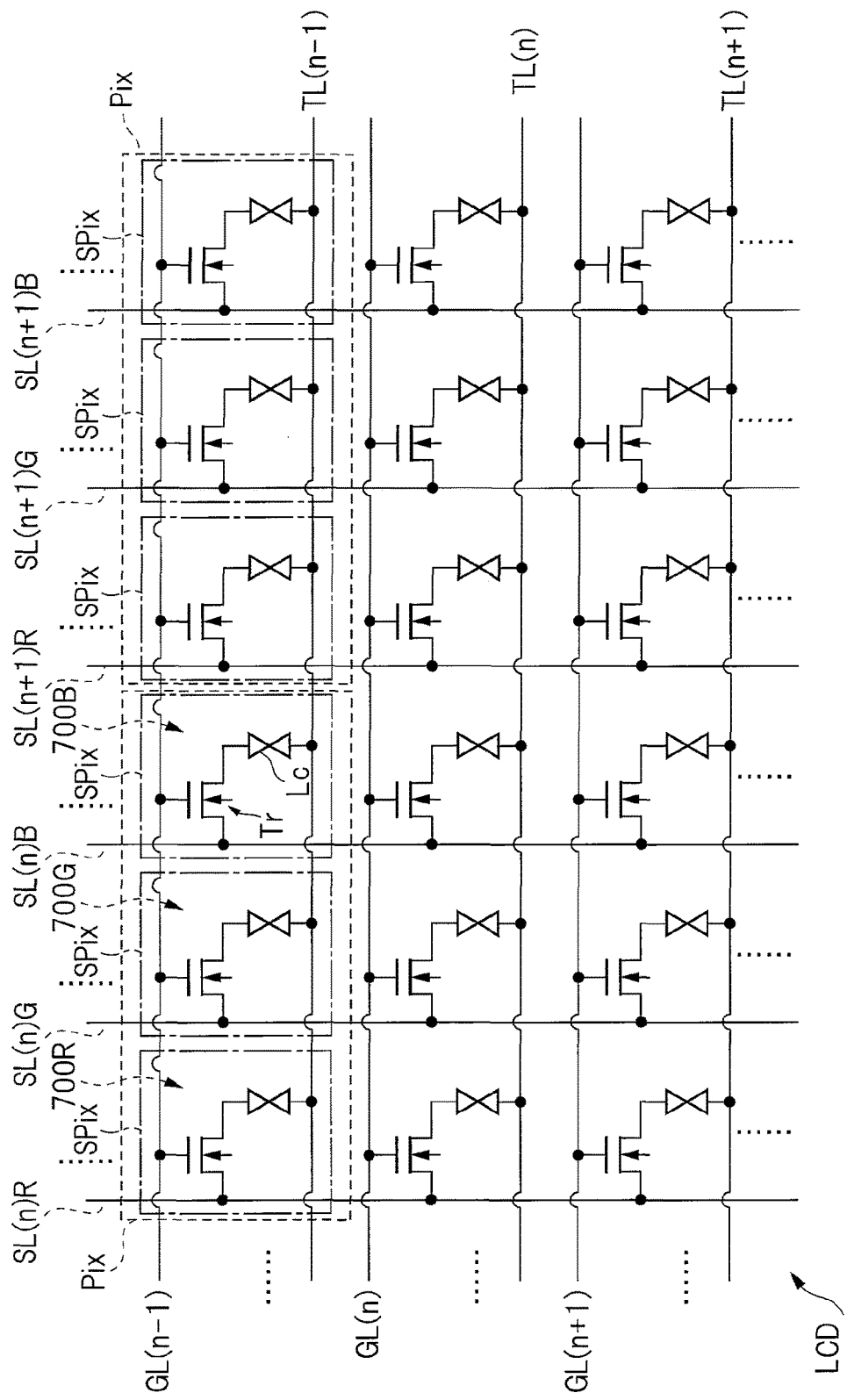
FIG. 10 is a circuit diagram showing the configuration of the display panel of the liquid crystal display apparatus according to the first embodiment.

FIG. 10 shows only pixel array portions related to the scanning lines GL(n−1) to GL(n+1), the signal lines SL(n)R, SL(n)G, SL(n)B to SL(n+1)R, SL(n+1)G, SL(n+1)B, and to the drive electrodes TL(n−1) to TL(n+1). In order to facilitate the description, FIG. 10 shows the drive electrodes TL(n−1) to TL(n+1) so as to be arranged in respective rows. However, one drive electrode may be arranged in a plurality of rows.

Each sub-pixel SPix arranged at an intersection of a row and a column of the pixel array LCD includes a TFT transistor Tr formed on the TFT glass substrate 600 and a liquid crystal element LC whose one terminal is connected to the source of the TFT transistor Tr. In the pixel array LCD, gates of the TFT transistors Tr of the plurality of sub-pixels SPix arranged in the same row are connected to the scanning line arranged in the same row, and drains of the TFT transistors Tr of the plurality of sub-pixels SPix arranged in the same column are connected to the signal line arranged in the same column. In other words, the plurality of sub-pixels SPix is arranged in a matrix form, a scanning line is arranged in each row, and the plurality of sub-pixels SPix arranged in the corresponding row is connected to the scanning line. Also, a signal line is arranged in each column, and the pixels SPix arranged in the corresponding column are connected to the signal line. The other ends of the liquid crystal elements LC of the plurality of sub-pixels SPix arranged in the same row are connected to the drive electrode arranged in the row.

In the description of the example shown in FIG. 10, in this drawing, the gate of the TFT transistor Tr of each of the plurality of sub-pixels SPix arranged in the top row is connected to the scanning line GL(n−1) arranged in the top row. In this drawing, the drain of the TFT transistor Tr of each of the plurality of sub-pixels SPix arranged in the leftmost column is connected to the signal line SL(n)R arranged in the leftmost column. Further, in FIG. 10, the other end of the liquid crystal element LC of each of the plurality of sub-pixels SPix arranged in the top row is connected to the drive electrode TL(n−1) arranged in the top row.

As described above, one sub-pixel SPix corresponds to one of the three primary colors. Thus, the three primary colors of R, G, and B are formed of three sub-pixels SPix. In FIG. 10, one color pixel Pix is formed of three sub-pixels SPix arranged consecutively in the same row, and colors are expressed by the pixel Pix. That is, in FIG. 10, the sub-pixel SPix indicated as a reference character 700R becomes a sub-pixel SPix(R) of R (red), the sub-pixel SPix indicated as a reference character 700G becomes a sub-pixel SPix(G) of G (green), and the sub-pixel SPix indicated as a reference character 700B becomes a sub-pixel SPix(B) of B (blue). Thus, the sub-pixel SPix(R) indicated by the reference character 700R is provided with a red color filter CR as a color filter, the sub-pixel SPix(G) indicated by the 700G is provided with a green color filter CG as a color filter, and the sub-pixel SPix(B) indicated by the 700B is provided with a blue color filter CB as a color filter.

An image signal corresponding to R of a signal representing one pixel is supplied to the signal line SL(n)R from the signal line selector 3, an image signal corresponding to G is supplied from the signal line selector 3 to the signal line SL(n)G, and an image signal corresponding to B is supplied from the signal line selector 3 to the signal line SL(n)B.

Although not specifically limited, the TFT transistor Tr in each sub-pixel SPix is, an N-channel TFT transistor. To the scanning lines GL(0) to GL(p), for example, pulse-state scanning line signals whose levels are successively set to a higher level in this order of the scanning lines are supplied from the gate driver 5 (FIGS. 6 and 7). That is, in the pixel array LCD, the voltages of scanning lines are successively set to a higher level from the scanning line GL(0) arranged in the top row toward the scanning line GL(p) arranged in the bottom row. Accordingly, in the pixel array LCD, the TFT transistors Tr in the sub-pixels SPix are successively conducted from the sub-pixel SPix arranged in the top row toward the sub-pixel SPix arranged in the bottom row.

By the state in which the TFT transistor Tr is conducted, the image signal supplied to the signal line at that time is supplied to the liquid crystal element LC via the conduction-state TFT transistor. The electric field of the liquid crystal element LC changes depending on a differential voltage between the voltage of a display drive signal supplied to the drive electrodes TL(0) to TL(p) and the voltage of a supplied image signal, so that the modulation of light passing through the liquid crystal element LC thereof changes. Accordingly, a color image in accordance with an image signal supplied to the signal lines SL(0)R, SL(0)G, SL(n)B to SL(p)R, SL(p)G, SL(p)B in synchronization with scanning line signals supplied to the scanning lines GL(0) to GL(p) is displayed in the display panel 2.

Each of the plurality of sub-pixels SPix can be considered to have a selection terminal and a pair of terminals. In this case, the gate of the TFT transistor Tr configuring the sub-pixel SPix is the selection terminal of the sub-pixel SPix, the drain of the TFT transistor Tr is one terminal of the pair of terminals, and the other end of the liquid crystal element LC is the other terminal of the sub-pixel SPix.

Here, the correspondence between the arrangement of the display panel 2 shown in FIGS. 6 and 7 and the circuit diagram shown in FIG. 10 will be described as follows.

The pixel array LCD has a pair of sides substantially parallel to the row of the array thereof and has a pair of sides substantially parallel to the column of the array thereof. The paired sides that are parallel to the row of the pixel array LCD are a first side and a second side corresponding to the short sides 2-U, 2-D of the display panel 2 shown in FIGS. 6 and 7, and the paired sides that are parallel to the column of the pixel array LCD are a third side and a fourth side corresponding to the long sides 2-L, 2-R of the display panel 2.

In the pixel array LCD, as shown in FIG. 7, the signal line selector 3, the switching adjustment circuit SCX-D, the selection control circuit SRX-D, and the semiconductor device for drive DDIC are arranged along the second side of the pair of sides parallel to the row, that is, the one short side 2-D of the display panel 2. In the pixel array LCD, in the second side (short side 2-D of the liquid crystal panel 2), an image signal from the semiconductor device for drive DDIC is supplied to the signal lines SL(0)R, SL(0)G, SL(0)B to SL(p)R, SL(p)G, SL(p)B via the signal line selector 3.

Also, as shown in FIG. 7, the switching adjustment circuit SCX-U is arranged along the first side of the pixel array LCD, that is, the other side (short side 2-U) of the display panel 2.

In the pixel array LCD, the gate driver 5, the selection control circuit SR-L, and the selection drive circuit SDC are arranged along the third side of the pair of sides (third and fourth sides) parallel to the column, that is, the long side 2-L of the display panel 2. In the pixel array LCD, a scanning line signal from the gate driver 5 is supplied to the scanning lines GL(0) to GL(p) on the third side. In FIG. 7, the gate driver 5 is arranged along the long side 2-L of the display panel 2. However, the gate driver 5 may be divided into two units and be arranged along the long side 2-L (third side of the pixel array LCD) and the long side 2-R (fourth side of the pixel array LCD). Also in the pixel array LCD, a display drive signal is supplied from the selection drive circuit SDC to drive electrodes on the third side in a display period, and a magnetic-field drive signal is supplied from the selection drive circuit SDC to a plurality of assigned drive electrodes on the third side in the magnetic field generation period TGT in a touch detection period.

As shown in FIG. 7, the switching circuit DSC and the selection control circuit SR-R are arranged along the fourth side of the pixel array LCD, that is, the long side 2-R of the display panel 2. In a display period, a display drive signal from the switching circuit DSC is supplied to the common electrode on the fourth side. In a touch detection period, a plurality of drive electrodes are electrically connected on the fourth side.

The pixel array LCD caused when a color display is produced in the display panel 2 has been concretely described, and the pixel array LCD may be considered to be configured of a plurality of color pixels Pix (pixel), each of which is configured of three sub-pixels SPix. When considered as described above, the plurality of pixels Pix are arranged in a matrix form to configure the pixel array LCD. The corresponding scanning lines GL(0) to GL(p) and the corresponding drive electrodes TL(0) to TL(p) are arranged in the respective rows of the pixel array LCD configured of pixels Pix, and the signal lines SL(0) to SL(p) are arranged in the respective columns thereof.

In this case, three sub-pixels SPix are considered to be one pixel Pix, and the pixel Pix is considered to have a configuration similar to that of the sub-pixel SPix. The respective selection terminals of pixels Pix arranged in a matrix form in the pixel array LCD are connected to the scanning line GL(0) to GL(p) arranged in the same row as the pixel Pix, one respective terminals of pixels Pix are connected to the signal line SL(0) to SL(p) arranged in the same column, and the other respective terminals of pixels Pix are connected to the drive electrode TL(0) to TL(p) arranged in the same column. Naturally, one drive electrode may correspond to a plurality of rows of the pixel array LCD. In such a case, the other terminal of the pixel Pix arranged in the plurality of rows is connected to the common drive electrode.

Also when the pixel array LCD is considered to be configured of the plurality of pixels Pix as described above, the correspondence between the arrangement of the display panel 2 shown in FIGS. 6 and 7 and the circuit diagram shown in FIG. 10 is the same as described above.

A case in which the number of sub-pixels SPix configuring one color pixel Pix is three has been described. However, the present embodiment is not limited to such an example. For example, one color pixel may be formed of sub-pixels of, in addition to R, G, B described above, any one color or a plurality of colors of white (W) and yellow (Y) and also complementary colors of R, G, B (cyan (C), magenta (M), and yellow (Y)).

<Electrode Drive Circuit>

Next, an electrode drive circuit (the selection control circuits SR-R, SR-L, the switching circuit DSC, and the selection drive circuit SDC) in the liquid crystal display apparatus 1 according to the first embodiment will be described using FIGS. 11 to 15.

<<Operation Overview of the Electrode Drive Circuit>>

In order to facilitate the understanding of the electrode drive circuit, an operation overview will be first described. In the first embodiment, four drive electrodes are assigned from the plurality of drive electrodes TL(0) to TL(p) in the magnetic field generation period TGT. Each two of the four assigned drive electrodes becomes one bundle (pair), so that two bundles are formed. In each bundle, an end of one drive electrode and an end of the other drive electrode are mutually connected electrically. The drive electrodes are arranged in parallel with each other. Therefore, by electrically connecting ends thereof, a coil formed of drive electrodes as a wire winding in each bundle is formed. One coil is formed of one bundle, and thus, two coils are formed of four drive electrodes.

When four drive electrodes are assigned, drive electrodes are assigned so that inner sides of coils mutually overlap between the two formed coils. In other words, if the two bundles are denoted as a first bundle and a second bundle, drive electrodes are assigned so that an area (drive electrode) sandwiched between two drive electrodes configuring the first bundle and an area (drive electrode) sandwiched between two drive electrodes configuring the second bundle overlap.

To the two formed coils, the coil clock signals synchronized with each other are supplied substantially simultaneously as magnetic-field drive signals. Accordingly, in an overlapped area (area corresponding to drive electrodes), a magnetic field generated by the coil formed of drive electrodes of the first bundle and a magnetic field generated by the coil formed of drive electrodes of the second bundle are superimposed. Each of coils formed of the first bundle and the second bundle is a single-winding coil. Therefore, even if the sheet resistance of the drive electrode is relatively high, the formed coil is relatively short in length, and thus, increase in the impedance of the coil can be prevented, and therefore, decrease in a drive current flowing through the coil in synchronization with the coil clock signal can be prevented. As a result, while inhibiting a magnetic field generated per coil from weakening, the magnetic field in an overlapped area can be made stronger by superimposing magnetic fields.

Also in the first embodiment, an area corresponding to two drive electrodes close to each other is set as an area where coils mutually overlap. In the predetermined magnetic field generation period TGT, two coils are formed of four drive electrodes arranged so as to sandwich an area of two drive electrodes close to each other, and a magnetic field is generated in the area of two drive electrodes close to each other. In a next magnetic field generation period TGT, the two drive electrodes close to each other are assigned as drive electrodes configuring two bundles. In a next magnetic field generation period TGT, two coils are formed of two bundles including the assigned drive electrodes to generate a magnetic field. Accordingly, the drive electrodes corresponding to an overlapped area are used as a coil winding wire to generate a magnetic field in the next magnetic field generation period TGT. By successively assigning drive electrodes corresponding to an overlapped area to use as a coil winding wire in the next magnetic field generation period TGT as described above, whether the display panel 2 is touched or the touched position of the display panel 2 can be scanned.

By performing such a scan, an area (overlapped area) where the touch is to be detected and an area where the coil is shifted in this scan can be the same as each other in size, so that generation of an area where no magnetic field in this scan van be prevented, so that generation of an area where the accuracy of detection of the touch is degraded can be prevented. In description along the first embodiment, an overlapped area in a scan corresponds to two drive electrodes, and the coil is shifted (moved) in units of two bundles.

<<Configuration of the Electrode Drive Circuit>>

Figure 11:
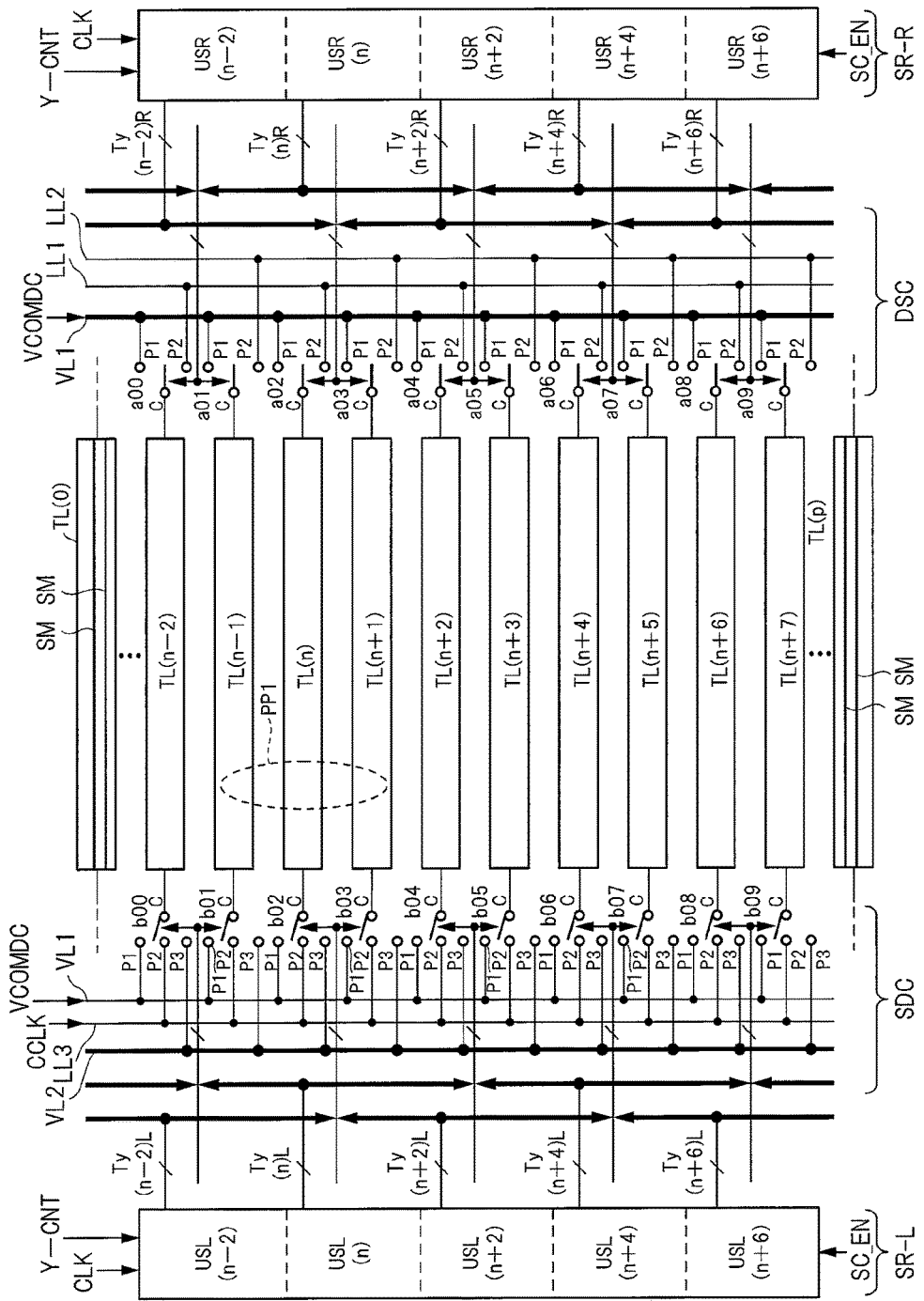
FIG. 11 is a block diagram showing the configuration of the liquid crystal display apparatus according to the first embodiment.

FIG. 11 is a block diagram showing the configuration of the liquid crystal display apparatus 1 according to the first embodiment. This drawing shows a configuration of the drive electrodes TL(0) to TL(p) and a portion of the electrode drive circuit (the selection control circuits SR-R, SR-L, the switching circuit DSC, and the selection drive circuit SDC) corresponding to the drive electrodes TL(n−2) to TL(n+7) of these drive electrodes. As described above, note that each drive electrode includes the first electrode (transparent electrode) and the second electrode (auxiliary electrode). In order to explicitly show this in FIG. 11, a solid line with the reference character of the auxiliary electrode SM is representatively shown in the drive electrodes TL(0), TL(p).

<<The Selection Control Circuit SR-R and the Switching Circuit DSC>>

Although not specifically limited, the selection control circuit SR-R in the first embodiment includes a shift register. The operation of touch detection of the shift register is instructed by the magnetic-field enable signal SC_EN, and performs a shift operation in synchronization with changes of the clock signal CLK by a state in which the control signal Y-CNT becomes, for example, a high level. The selection control circuit SR-R includes a plurality of unit selection circuits corresponding to each step of the shift register. When the operation of touch detection is assigned, a high-level selection signal corresponding to the logical value "1" is successively output from the plurality of unit selection circuits in synchronization with changes of the clock signal CLK. In the first embodiment, each of the plurality of unit selection circuits is in a one-to-one correspondence with an area where a strong magnetic field is generated. In the first embodiment, each area where a strong magnetic field is generated corresponds to two drive electrodes arranged close to each other. Thus, the selection control circuit SR-R includes the plurality of unit selection circuits each of which is in a one-to-one correspondence with two drive electrodes each.

In FIG. 11, the drive electrode TL(n) and the drive electrode TL(n+1) correspond to one area where a strong magnetic field is generated. Similarly, the drive electrode TL(n+2) and the drive electrode TL(n+3) correspond to one area where a strong magnetic field is generated, the drive electrode TL(n+4) and the drive electrode TL(n+5) correspond to one area where a strong magnetic field is generated, the drive electrode TL(n+6) and the drive electrode TL(n+7) correspond to one area where a strong magnetic field is generated, and the drive electrode TL(n−2) and the drive electrode TL(n−1) correspond to one area where a strong magnetic field is generated.

FIG. 11 shows, among the plurality of unit selection circuits configuring the selection control circuit SR-R, the unit selection circuits USR(n−2) to USR(n+6) corresponding to areas where a strong magnetic field is generated. That is, the unit selection circuit USR(n) corresponds to an area corresponding to the drive electrode TL(n) and the drive electrode TL(n+1). Similarly, the unit selection circuit USR (n+2) corresponds to an area corresponding to the drive electrode TL(n+2) and the drive electrode TL(n+3), and the unit selection circuit USR(n+4) corresponds to an area corresponding to the drive electrode TL(n+4) and the drive electrode TL(n+5). Also, the unit selection circuit USR(n+6) corresponds to an area corresponding to the drive electrode TL(n+6) and the drive electrode TL(n+7), and the unit selection circuit USR(n−2) corresponds to an area corresponding to the drive electrode TL(n−2) and the drive electrode TL(n−1).

In a touch detection period, the unit selection circuits USR(n−2), USR(n), USR(n+2), USR(n+4), USR(n+6) output selection signals Ty(n−2)R, Ty(n)R, Ty(n+2)R, Ty(n+4)R, Ty(n+6)R in synchronization with the clock signal CLK, respectively. The selection signals Ty(n−2)R to Ty(n+6)R from the unit selection circuits USR(n−2) to USR(n+6) are supplied to the switching circuit DSC.

The switching circuit DSC includes signal wires LL1, LL2, a voltage wire VL1, and first switches a00 to a09. Here, the signal wires LL1, LL2 are used as signal wires to electrically connect drive electrodes in a touch detection period. The display drive signal VCOMDC is supplied to the voltage wire VL1 in a display period. The value of the display drive signal VCOMDC is, for example, the ground voltage Vss.

Each of the first switches a00 to a09 includes a common terminal "c", a first terminal "p1", a second terminal "p2", and a third terminal, and the common terminal c is connected to any one of the first terminal p1, the second terminal p2, and the third terminal in accordance with the selection signals Ty(n−2)R to Ty(n+6)R from the unit selection circuits USR(n−2) to USR(n+6). The third terminal of each of the first switches a00 to a09 is connected to no signal wire, and is in a floating state. Thus, in FIG. 11, the third terminal of each of the first switches a00 to a09 is omitted.

The first terminal p1 of each of the first switches a00 to a09 is connected to the voltage wire VL1. The second terminal p2 of the first switches a00, a02, a04, a06, a08 is connected to the signal wire LL1, and the second terminal p2 of the first switches a01, a03, a05, a07, a09 is connected to the signal wire LL2.

The common terminal c of the first switch a00 is connected to one end of the corresponding drive electrode TL(n−2), the common terminal c of the first switch a01 is connected to one end of the corresponding drive electrode TL(n−1), the common terminal c of the first switch a02 is connected to one end of the corresponding drive electrode TL(n), the common terminal c of the first switch a03 is connected to one end of the corresponding drive electrode TL(n+1), and the common terminal c of the first switch a04 is connected to one end of the corresponding drive electrode TL(n+2). Similarly, the common terminal c of the first switch a05 is connected to one end of the corresponding drive electrode TL(n+3), the common terminal c of the first switch a06 is connected to one end of the corresponding drive electrode TL(n+4), the common terminal c of the first switch a07 is connected to one end of the corresponding drive electrode TL(n+5), the common terminal c of the first switch a08 is connected to one end of the corresponding drive electrode TL(n+6), and the common terminal c of the first switch a09 is connected to one end of the corresponding drive electrode TL(n+7).

The first switch a00 and the first switch a01 are controlled as a pair. That is, the first switches a01, a02 are controlled by the selection signal Ty(n)R from the unit selection circuit USR(n) and a selection signal Ty(n−4)R from a unit selection circuit USR(n−4) not shown. The first switches a02, a03 are set as a pair and are controlled by the selection signal Ty(n−2)R from the unit selection circuit USR(n−2) and the selection signal Ty(n+2)R from the unit selection circuit USR(n+2), and the first switches a04, a05 are set as a pair and are controlled by the selection signal Ty(n)R from the unit selection circuit USR(n) and the selection signal Ty(n+4)R from the unit selection circuit USR(n+4). Similarly, the first switches a06, a07 are set as a pair and are controlled by the selection signal Ty(n+2)R from the unit selection circuit USR(n+2) and the selection signal Ty(n+6)R from the unit selection circuit USR(n+6), and the first switches a08, a09 are set as a pair and are controlled by the selection signal Ty(n+4)R from the unit selection circuit USR(n+4) and the selection signal Ty(n+8)R from the unit selection circuit USR(n+8).

If a magnetic-field drive signal is supplied to a coil in the magnetic field generation period TGT, a strong magnetic field is generated inside the coil. Thus, the selection signal formed by the unit selection circuit corresponding to two drive electrodes is used as a selection signal that electrically connects drive electrodes arranged so as to sandwich the two drive electrodes therebetween. In the description while exemplifying the unit selection circuit USR(n) corresponding to the drive electrode TL(n) and the drive electrode TL(n+1), in the magnetic field generation period TGT, the selection signal Ty(n)R formed by the unit selection circuit USR(n) is used as a selection signal that electrically connects the drive electrodes TL(n−2), TL(n−1) and the drive electrodes TL(n+2), TL(n+3) arranged so as to sandwich the drive electrodes TL(n), TL(n+1) therebetween so that a strong magnetic field is generated in an area of the corresponding drive electrodes TL(n), TL(n+1).

In the first embodiment, as described in the overview above, four drive electrodes are assigned in the magnetic field generation period TGT, one bundle is formed of each two drive electrodes of the assigned drive electrodes to generate a magnetic field using two bundles as a unit. When a strong magnetic field is generated in an area of the drive electrodes TL(n), TL(n+1), the selection signal Ty(n)R formed by the unit selection circuit USR(n) assigns the drive electrodes TL(n−2), TL(n−1), TL(n+2), TL(n+3). The selection signal Ty(n)R controls the first switches a00, a01, a04, a05 so that one bundle (first bundle) is formed of the drive electrodes TL(n−2), TL(n+2) and one bundle (second bundle) is formed of the drive electrodes TL(n−1), TL(n+3).

That is, by the selection signal Ty(n)R, the common terminal c of each of the first switches a00, a01, a04, a05 is controlled to be connected to the second terminal p2.

Accordingly, the drive electrode TL(n−2) is connected to the signal wire LL1 via the first switch a00 and the drive electrode TL(n+2) is connected to the signal wire LL1 via the first switch a04. As a result, the drive electrodes TL(n−2), TL(n+2) are electrically connected to each other, and a coil CY(n) having these drive electrodes as a winding wire is formed. Similarly, the drive electrode TL(n−1) is connected to the signal wire LL2 via the first switch a01, and the drive electrode TL(n+3) is connected to the signal wire LL2 via the first switch a05. As a result, the drive electrodes TL(n−1), TL(n+3) are electrically connected to each other, and a coil CY(n+1) having these drive electrodes as a winding wire is formed.

In this case, the area of a magnetic field, that is, the area of the coil generated by the coil CY(n) is an area sandwiched between the drive electrode TL(n−2) and the drive electrode TL(n+2) and is an area corresponding to the drive electrodes TL(n−1) to TL(n+1). On the other hand, the area of a magnetic field, that is, the area of the coil generated by the coil CY(n+1) is an area sandwiched between the drive electrode TL(n−1) and the drive electrode TL(n+3) and is an area corresponding to the drive electrodes TL(n) to TL(n+2). Therefore, the area of the coil CY(n) and the area of the CY(n+1) overlap with each other in an area corresponding to the drive electrodes TL(n), TL(n+1).

When a strong magnetic field is generated in an area of the drive electrodes TL(n+2), TL(n+3), four drive electrodes TL(n), TL(n+1), TL(n+4), TL(n+5) are assigned by the selection signal Ty(n+2)R formed by the unit selection circuit USC(n+2) corresponding to the drive electrodes TL(n+2), TL(n+3), and the common terminal c of each of the first switches a02, a03, a06, a07 is connected to the second terminal p2. Accordingly, the drive electrodes TL(n), TL(n+4) are electrically connected to form a coil CY(n+2), and the drive electrodes TL(n+1), TL(n+5) are electrically connected to form a coil CY(n+3). In this case, an area where an area of the coil CY(n+2) and an area of the coil CY(n+3) overlap with each other is an area corresponding to the drive electrodes TL(n+2), TL(n+3).

Similarly, when a strong magnetic field is generated in an area of the drive electrodes TL(n+4), TL(n+5), four drive electrodes TL(n+2), TL(n+3), TL(n+6), TL(n+7) are assigned by the selection signal Ty(n+4)R formed by the unit selection circuit USC(n+4) corresponding to the drive electrodes TL(n+4), TL(n+5), and the common terminal c of each of the first switches a04, a05, a08, a09 is connected to the second terminal p2. Accordingly, the drive electrodes TL(n+2), TL(n+6) are electrically connected to form a coil CY(n+4), and the drive electrodes TL(n+3), TL(n+7) are electrically connected to form a coil CY(n+5). In this case, an area where an area of the coil CY(n+4) and an area of the coil CY(n+5) overlap with each other is an area corresponding to the drive electrodes TL(n+4), TL(n+5).

Other drive electrodes are similarly handled. That is, two coils are formed of drive electrodes assigned by a selection signal formed by a unit selection circuit. In this case, the two formed coils have an area where the coils overlap with each other. In the first embodiment, the unit selection circuit can be considered to assign an area where two formed coils overlap with each other.

In FIG. 11, in order to avoid the complexity of the drawing, each of the selection signals Ty(n−2)R, Ty(n)R, Ty(n+2)R, Ty(n+4)R, Ty(n+6)R is shown as one signal. However, each of the selection signals is formed of a plurality of selection signals. In the description of the selection signal Ty(n)R as an example, the selection signal Ty(n)R includes a display selection signal Ty(n)R-1 that selects whether to connect the common terminal c of the first switches a00, a01, a04, a05 to the first terminal p1 and a touch selection signal Ty(n)R-2 that selects whether to connect the common terminal c of the first switches a00, a01, a04, a05 to the second terminal p2 or the third terminal.

Similarly, each of the other selection signals Ty(n−2)R, Ty(n+2)R, Ty(n+4)R, Ty(n+6)R includes a display selection signal (reference character of −1 is attached to the reference character of the selection signal) and a touch selection signal (reference character of −2 is attached to the reference character of the selection signal). In further description of the selection signal Ty(n+2)R as an example, the selection signal Ty(n+2)R includes a display selection signal Ty(n+2)R-1 that selects whether to connect the common terminal c of the first switches a02, a03, a06, a07 to the first terminal p1 and a touch selection signal Ty(n+2)R-2 that selects whether to connect the common terminal c of the first switches a02, a03, a06, a07 to the second terminal p2 or the third terminal.

In touch detection, the control circuit D-CNT in the semiconductor device for drive DDIC sets the magnetic-field enable signal SC_EN to, for example, a high level, and the control signal Y-CNT to, for example, the high level. The clock signal CLK changes periodically, so that the touch selection signal output from the selection control circuit SR-R is, for example, successively set to the high level.

In description using FIG. 11 as an example, the touch selection signal Ty(n−2)R-2 output from the unit selection circuit USR(n−2) becomes at the high level first. At this time, the other touch selection signals Ty(n)R-2, Ty(n+2)R-2, Ty(n+4)R-2, Ty(n+6)R-2 are at a low level. When the clock signal CLK changes, the touch selection signal Ty(n)R-2 output from the unit selection circuit USR(n) changes to the high level, and the other touch selection signals Ty(n−2)R-2, Ty(n+2)R-2, Ty(n+4)R-2, Ty(n+6)R-2 are at the low level. Hereinafter, for each change of the clock signal CLK, the touch selection signals Ty(n+2)R-2, Ty(n+4)R-2, Ty(n+6)R-2 successively become at the high level in this order, and touch selection signals except for the touch selection signals becoming at the high level become at the low level.

By the state in which the magnetic-field enable signal SC_EN becomes at the low level, the unit selection circuits USR(n−2), USR(n), USR(n+2), USR(n+4), USR(n+6) set the touch selection signals Ty(n−2)R-2, Ty(n)R-2, Ty(n+2)R-2, Ty(n+4)R-2, Ty(n+6)R-2 to the low level, and changes each of the display selection signals Ty(n−2)R-1, Ty(n)R-1, Ty(n+2)R-1, Ty(n+4)R-1, Ty(n+6)R-1 from the low level to the high level.

In each of the first switches a00 to a09, the common terminal c is connected to the second terminal p2 by the supplied touch selection signal being set to the high level, and the common terminal c is connected to the third terminal by the touch selection signal being set to the low level. Also in each of the first switches a00 to a09, the common terminal c is connected to the first terminal p1 when the supplied display selection signal is at the high level, and the common terminal c and the first terminal p1 are set to be non-conduction when the display selection signal is at the low level.

The magnetic-field enable signal SC_EN is set to the low level in touch detection, and the touch selection signals Ty(n)R-2 to Ty(n+6)R-2 are successively set to the high level in this order. Accordingly, as described above, the coils CY(n), CY(n+1) are formed, and then, the coils CY(n+2), CY(n+3) are formed. After the formation of the coils CY(n+2), CY(n+3), the coils CY(n+4), CY(n+5) are formed. That is, the coils are successively formed in each two as a unit.

Figure 15:
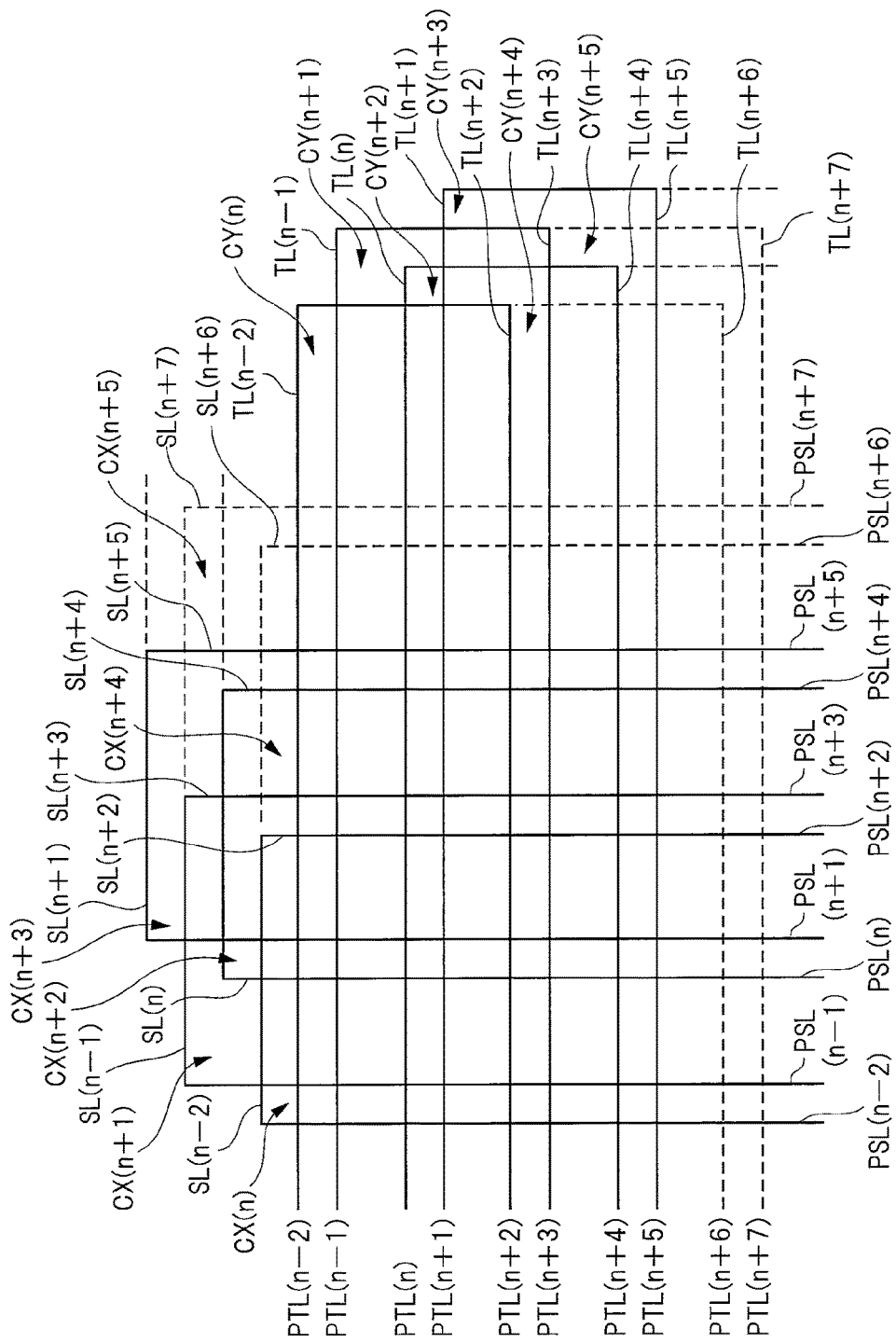
FIG. 15 is a plan view schematically showing a configuration of a coil formed in the liquid crystal display apparatus according to the first embodiment.

FIG. 15 is a plan view schematically showing the coils CY(n) to CY(n+6) formed in the magnetic field generation period TGT. FIG. 15 show all the coils CY(n) to CY(n+6), and the coils are successively formed in each two as a unit along with the elapse of time in the order of the coils CY(n) and CY(n+1), the coils CY(n+2) and CY(n+3), and the coils CY(n+4) and CY(n+5). In order to easily see the drawings, wires connecting the drive electrodes are separately shown. However, the signal wires LL1, LL2 shown in FIG. 11 are used as wires connecting the drive electrodes. In order to easily see the drawings, the drive electrodes TL(n+6), TL(n+7) and wires connecting these drive electrodes and the drive electrodes TL(n+2), TL(n+3) are shown by a broken line.

In FIG. 15, PTL(n−2) to PTL(n+7) indicate the other ends of the drive electrodes TL(n−2) to TL(n+7), respectively.

Also in FIG. 15, CX(n) to CX(n+5) indicate coils obtained when coils are formed by using the signal lines SL(n−2) to SL(n+7), instead of the drive electrodes TL(n−2) to TL(n+7). Also by using the signal lines instead of the drive electrodes, coils can successively be formed in each two as a unit along with the elapse of time in the order of the coils CX(n), CX(n+1), coils CX(n+2), CX(n+3), and coils CX(n+4), CX(n+5). In FIG. 15, note that PSL(n−2) to PSL(n+7) indicate ends of the signal lines SL(n−2) to SL(n+7), respectively.

While a case of touch detection has been described, the magnetic-field enable signal SC_EN is set to the low level in a display period, and thus, a display selection signal is set to the high level, and the common terminal c is connected to the first terminal p1 in each of the first switches a00 to a09. The display drive signal VCOMDC is supplied to the voltage wire VL1 in a display period, and thus, the display drive signal VCOMDC is supplied to one end of each of the drive electrodes TL(n−2) to TL(n+7) via the first switches a00 to a09.

In the first switch a02, for example, the connection between the common terminal c and the second terminal p2 or the third terminal is controlled by both of the touch selection signal Ty(n)R-2 and the touch selection signal Ty(n+2)R-2. However, it is only required to connect the common terminal c and the second terminal p2 so as to put a priority on the high level. This also applies to the other first switches.

<<The Selection Control Circuit SR-L and the Selection Drive Circuit SDC>>

Next, the selection control circuit SR-L and the selection drive circuit SDC will be described with reference to FIG. 11. The configuration of the selection control circuit SR-L is similar to that of the selection control circuit SR-R. That is, the selection control circuit SR-L includes a shift register so as to set the magnetic-field enable signal SC_EN to the high level, set the control signal Y-CNT to the high level, and set the clock signal CLK to be changed, so that the selection signals successively set to the high level are output. Also, the selection control circuit SR-L has a plurality of unit selection circuits corresponding to each step of the shift register. FIG. 11 shows the unit selection circuits USL(n−2), USL(n), USL(n+2), USL(n+4), USL(n+6) among the plurality of unit selection circuits.

As similar to the unit selection circuits configuring the selection control circuit SR-R, in the magnetic field generation period TGT, each of the plurality of unit selection circuits configuring the selection control circuit SR-L is in a one-to-one correspondence with an area where a strong magnetic field is generated. In the description of the unit selection circuits shown in FIG. 11 as an example, the unit selection circuit USL(n−2) corresponds to an area of the drive electrodes TL(n−2), TL(n−1), the unit selection circuit USL(n) corresponds to an area of the drive electrodes TL(n), TL(n+1), and the unit selection circuit USL(n+2) corresponds to an area of the drive electrodes TL(n+2), TL(n+3). Similarly, the unit selection circuit USL(n+4) corresponds to an area of the drive electrodes TL(n+4), TL(n+5) and the unit selection circuit USL(n+6) corresponds to an area of the drive electrodes TL(n+6), TL(n+7). When a magnetic field is generated in a corresponding area in the magnetic field generation period TGT, the unit selection circuits USL(n−2), USL(n), USL(n+2), USL(n+4), USL(n+6) form and output the selection signals Ty(n−2)L, Ty(n)L, TY(n+2)L, Ty(n+4)L, Ty(n+6)L, respectively.

The selection drive circuit SDC includes a signal wire LL3, voltage wires VL1, VL2, and second switches b00 to b09. To the signal wire LL3, the coil clock signal CCLK is supplied from the control circuit D-CNT (FIG. 6) in touch detection. The coil clock signal CCLK is a clock signal changing in a predetermined period. The display drive signal VCOMDC is supplied to the voltage wire VL1 in a display period. To the voltage wire VL2, a predetermined voltage such as the ground voltage Vss is supplied in touch detection.

Each of the second switches b00 to b09 includes a common terminal c, a first terminal p1, a second terminal p2, a third terminal p3, and a fourth terminal, and the common terminal c is connected to the first terminal p1, the second terminal p2, the third terminal p3, or the fourth terminal depending on the supplied selection signal. The fourth terminal of each of the second switches b00 to b09 is connected to no signal wire as similar to the third terminal of the first switch, and is in a floating state. Thus, the fourth terminal in each of the second switches b00 to b09 is omitted. The first terminal p1 of each of the second switches b00 to b09 is connected to the voltage wire VL1, the second terminal p2 is connected to the signal wire LL3, and the third terminal p3 is connected to the voltage wire VL2.

The common terminal c of the second switch b00 is connected to the other end PTL(n−2) of the corresponding drive electrode TL(n−2), the common terminal c of the second switch b01 is connected to the other end PTL(n−1) of the drive electrode TL(n−1), the common terminal c of the second switch b02 is connected to the other end PTL(n) of the drive electrode TL(n), and the common terminal c of the second switch b03 is connected to the other end PTL(n+1) of the drive electrode TL(n+1). Also, the common terminal c of the second switch b04 is connected to the other end PTL(n+2) of the drive electrode TL(n+2), the common terminal c of the second switch b05 is connected to the other end PTL(n+3) of the drive electrode TL(n+3), the common terminal c of the second switch b06 is connected to the other end PTL(n+4) of the drive electrode TL(n+4), and the common terminal c of the second switch b07 is connected to the other end PTL(n+5) of the drive electrode TL(n+5). Similarly, the common terminal c of the second switch b08 is connected to the other end PTL(n+6) of the drive electrode TL(n+6), and the common terminal c of the second switch b09 is connected to the other end PTL(n+7) of the drive electrode TL(n+7).

By the selection signal Ty(n)L from the unit selection circuit USL(n) and a selection signal Ty(n−4)L from a unit selection circuit USL(n−4) not shown, it is determined to which terminal of the first terminal p1, the second terminal p2, the third terminal p3, and the fourth terminal the common terminal c in each of the second switches b00, b01 is connected. Also, by the selection signal Ty(n−2)L from the unit selection circuit USL(n−2) and the selection signal Ty(n+2)L from the unit selection circuit USL(n+2), it is determined to which terminal of the first terminal p1, the second terminal p2, the third terminal p3, and the fourth terminal the common terminal c in each of the second switches b02, b03 is connected. By the selection signal Ty(n)L from the unit selection circuit USL(n) and the selection signal Ty(n+4)L from the unit selection circuit USL(n+4), it is determined to which terminal of the first terminal p1, the second terminal p2, the third terminal p3, and the fourth terminal the common terminal c in each of the second switches b04, b05 is connected.

By the selection signal Ty(n+2)L from the unit selection circuit USL(n+2) and the selection signal Ty(n+6)L from the unit selection circuit USL(n+6), it is determined to which terminal of the first terminal p1, the second terminal p2, the third terminal p3, and the fourth terminal the common terminal c in each of the second switches b06, b07 is connected. Similarly, by the selection signal Ty(n+4)L from the unit selection circuit USL(n+4) and the selection signal Ty(n+8)L from the unit selection circuit USL(n+8), it is determined to which terminal of the first terminal p1, the second terminal p2, the third terminal p3, and the fourth terminal the common terminal c in each of the second switches b08, b09 is connected.

In touch detection, the selection control circuit SR-L forms a selection signal that assigns four drive electrodes arranged so as to sandwich an area where a strong magnetic field is generated. In description of FIG. 11 as an example, when a strong magnetic field is generated in an area corresponding to the drive electrodes TL(n), TL(n+1), the unit selection circuit USL(n) corresponding to the area forms the selection signal Ty(n)L. By the formed selection signal Ty(n)L, the common terminal c in each of the second switches b00, b01 is connected to the second terminal p2, and the common terminal c in each of the second switches b04, b05 is connected to the third terminal p3. Accordingly, the coil clock signal CCLK is supplied to the end PTL(n−2) of the drive electrode TL(n−2) via the second switch b00 as a magnetic-field drive signal, and the coil clock signal CCLK is also supplied to the end PTL(n−2) of the drive electrode TL(n−2) via the second switch b01 as a magnetic-field drive signal. At this time, the ground voltage Vss is supplied to the end PTL(n+2) of the drive electrode TL(n+2) via the second switch b04, and the ground voltage Vss is also supplied to the end PTL(n+3) of the drive electrode TL(n+3) via the second switch b05.

The same coil clock signal CCLK is supplied to the drive electrodes TL(n−2), TL(n−1) as a magnetic-field drive signal, and thus, the magnetic-field drive signal supplied to the drive electrode TL(n−2) and the magnetic-field drive signal supplied to the drive electrode TL(n−1) are clock signals having substantially the same phase as each other. Also, the second switches b00, b01 are controlled by the same selection signal, and the second switches b04, b05 are controlled by the same selection signal. Thus, the magnetic-field drive signals having the same phase as each other are supplied to the end PTL(n−2) of the drive electrode TL(n−2) and the end PTL(n−1) of the drive electrode TL(n−1) at substantially the same timing. Also, the ground voltage Vss is supplied to the end PTL(n+2) of the drive electrode TL(n+2) and the end PTL(n+3) of the drive electrode TL(n+3) at substantially the same timing.

Because the coil CY(n) is formed of the drive electrode TL(n−2) and the drive electrode TL(n+2), the end PTL(n−2) of the drive electrode TL(n−2) and the end PTL(n+2) of the drive electrode TL(n+2) can be considered to be ends or terminals of the coil CY(n). Similarly, the end PTL(n−1) and the end PTL(n+3) can be considered to be ends or terminals of the coil CY(n+1). Hereinafter, the end PTL(n−2) to PTL(n+7) may be called ends or terminals of a coil.

The ground voltage Vss is supplied to the end PTL(n+2) of the coil CY(n), and a magnetic-field drive signal changing periodically is supplied to the end PTL(n−2) of the coil CY(n), and thus, the coil CY(n) generates a magnetic field changing in accordance with the magnetic-field drive signal. In this case, the magnetic field is strong in an area inside the coil CY(n), that is, an area of the drive electrodes TL(n−1) to TL(n+1). Similarly, the coil CY(n+1) also generates a magnetic field changing in accordance with the magnetic-field drive signal. In this case, the magnetic field is strong in an area inside the coil CY(n+1), that is, in an area of the drive electrodes TL(n) to TL(n+2).

The magnetic-field drive signals supplied to the coil CY(n) and the coil CY(n+1) are at substantially the same timing and have the same phase as each other, and thus, change of the magnetic field generated by the coil CY(n) and change of the magnetic field generated by the coil CY(n+1) are the same as each other. As a result, magnetic fields are superimposed to form a strong magnetic field in an area where the coil CY(n) and the coil CY(n+1) overlap, that is, an area corresponding to the drive electrodes TL(n), TL(n+1).

In the foregoing, a case of generation of a magnetic field in an area corresponding to the drive electrodes TL(n), TL(n+1) has been described. However, a case of generation of a magnetic field in other areas is similar thereto.

That is, when a magnetic field is generated in an area corresponding to the drive electrodes TL(n+2), TL(n+3), the common terminal c in the second switches b02, b03 is connected to the second terminal p2, and the common terminal c in the second switches b06, b07 is connected to the third terminal p3 by the selection signal Ty(n+2)L from the unit selection circuit USL(n+2). Accordingly, the coil clock signal CCLK is supplied to the ends PTL(n), PTL(n+1) of the drive electrodes TL(n), TL(n+1) at substantially the same timing as magnetic-field drive signals having the same phase, and the ground voltage Vss is supplied the ends PTL(n+4), PTL(n+5) of the drive electrodes TL(n+4), TL(n+5). As a result, the coil CY(n+1) and the coil CY(n+2) generate magnetic fields changing so as to be the same as each other in accordance with the supplied magnetic-field drive signal. An area where the coil CY(n+2) and the coil CY(n+3) overlap is an area corresponding to the drive electrodes TL(n+2), TL(n+3), and thus, magnetic fields generated by the coil CY(n+2) and the coil CY(n+3) are superimposed in this area to produce a strong magnetic field.

Similarly, when a magnetic field is generated in an area corresponding to the drive electrodes TL(n+4), TL(n+5), by the selection signal Ty(n+4)L from the unit selection circuit USL(n+4), the common terminal c in the second switches b04, b05 is connected to the second terminal p2, and the common terminal c in the second switches b08, b09 is connected to the third terminal p3. Accordingly, the coil clock signal CCLK is supplied to the ends PTL(n+2), PTL(n+3) of the drive electrodes TL(n+2), TL(n+3) at substantially the same timing as magnetic-field drive signals having the same phase, and the ground voltage Vss is supplied the ends PTL(n+6), PTL(n+7) of the drive electrodes TL(n+6), TL(n+7). As a result, the coil CY(n+4) and the coil CY(n+5) generate magnetic fields changing so as to be the same as each other in accordance with the supplied magnetic-field drive signal. An area where the coil CY(n+4) and the coil CY(n+5) overlap is an area corresponding to the drive electrodes TL(n+4), TL(n+5), and thus, magnetic fields generated by the coil CY(n+4) and the coil CY(n+5) are superimposed in this area to produce a strong magnetic field.

In order to avoid the complexity of the drawing, FIG. 11 shows the selection signals Ty(n−2)L to Ty(n+6)L as one signal. However, each of the selection signals includes a plurality of selection signals.

In the description of the selection signal Ty(n)L as an example, the selection signal Ty(n)L includes a display selection signal Ty(n)L-1 that selects whether to connect the common terminal c of the second switches b00, b01, b04, b05 to the first terminal p1, a first touch selection signal Ty(n)L-2 that selects whether to connect the common terminal c of the second switches b00, b01 to the second terminal p2 or the fourth terminal, and a second touch selection signal Ty(n)L-3 that selects whether to connect the common terminal c of the second switches b04, b05 to the third terminal p3 or the fourth terminal.

Similarly, each of the other selection signals Ty(n−2)L, Ty(n+2)L, Ty(n+4)L, Ty(n+6)L includes a display selection signal (reference character of −1 is attached to the reference character of the selection signal), a first touch selection signal (reference character of −2 is attached to the reference character of the selection signal), and a second touch selection signal (reference character of −3 is attached to the reference character of the selection signal).

For example, the selection signal Ty(n+2)L includes a display selection signal Ty(n+2)L-1 that selects whether to connect the common terminal c of the second switches b02, b03, b06, b07 to the first terminal p1, a first touch selection signal Ty(n+2)L-2 that selects whether to connect the common terminal c of the second switches b02, b03 to the second terminal p2 or the fourth terminal, and a second touch selection signal Ty(n+2)L-3 that selects whether to connect the common terminal c of the second switches b06, b07 to the third terminal p3 or the fourth terminal. The selection signal Ty(n+4)L includes a display selection signal Ty(n+4)L-1 that selects whether to connect the common terminal c of the second switches b04, b05, b08, b09 to the first terminal p1, a first touch selection signal Ty(n+4)L-2 that selects whether to connect the common terminal c of the second switches b04, b05 to the second terminal p2 or the fourth terminal, and a second touch selection signal Ty(n+4)L-3 that selects whether to connect the common terminal c of the second switches b08, b09 to the third terminal p3 or the fourth terminal.

As similar to the selection control circuit SR-R, the selection control circuit SR-L operates in synchronization with changes of the clock signal CLK when the magnetic-field enable signal SC_EN is at the high level and the control signal Y-CNT is at the high level. That is, the first touch selection signal and the second touch selection signal output from the selection control circuit SR-R are, for example, successively set to the high level.

In description using FIG. 11 as an example, the first touch selection signal Ty(n−2)L-2 and the second touch selection signal Ty(n−2)L-3 output from the unit selection circuit USL(n−2) becomes at the high level first. At this time, the other first touch selection signals Ty(n)L-2, Ty(n+2)L-2, Ty(n+4)L-2, Ty(n+6)L-2 and the other second touch selection signals Ty(n)L-3, Ty(n+2)L-3, Ty(n+4)L-3, Ty(n+6)L-3 are at a low level.

When the clock signal CLK changes, the first touch selection signal Ty(n)L-2 and the second touch selection signal Ty(n)L-3 output from the unit selection circuit USR (n) changes to the high level, and the other first touch selection signals Ty(n−2)L-2, Ty(n+2)L-2, Ty(n+4)L-2, Ty(n+6)L-2 are at the low level. Also, the other second touch selection signals Ty(n−2)L-3, Ty(n+2)L-3, Ty(n+4)L-3, Ty(n+6)L-3 are also at the low level. Hereinafter, for each change of the clock signal CLK, the first touch selection signals Ty(n+2)L-2, Ty(n+4)L-2, Ty(n+6)L-2 successively become at the high level in this order, and first touch selection signals except for the first touch selection signals becoming at the high level become at the low level. Similarly, the second touch selection signals Ty(n+2)L-3, Ty(n+4)L-3, Ty(n+6)L-3 successively become at the high level in this order, and second touch selection signals except for the second touch selection signals becoming at the high level become at the low level.

By the state in which the magnetic-field enable signal SC_EN becomes at the low level, the unit selection circuits USL(n−2), USL(n), USL(n+2), USL(n+4), USL(n+6) set the first touch selection signals Ty(n−2)L-2, Ty(n)L-2, Ty(n+2)L-2, Ty(n+4)L-2, Ty(n+6)L-2 to the low level, and set the second touch selection signals Ty(n−2)L-3, Ty(n)L-3, Ty(n+2)L-3, Ty(n+4)L-3, Ty(n+6)L-3 to the low level as well. At this time, the unit selection circuits USL(n−2), USL(n), USL(n+2), USL(n+4), USL(n+6) changes each of the display selection signals Ty(n−2)L-1, Ty(n)L-1, Ty(n+2)L-1, Ty(n+4)L-1, Ty(n+6)L-1 from the low level to the high level in response to the magnetic-field enable signal SC_EN which is at the low level.

In each of the second switches b00 to b09, the common terminal c is connected to the second terminal p2 by the supplied first touch selection signal being set to the high level, and the common terminal c is connected to the fourth terminal by the first touch selection signal being set to the low level. Also in each of the second switches b00 to b09, the common terminal c is connected to the third terminal p3 when the supplied second touch selection signal is at the high level, and the common terminal c is connected to the fourth terminal p3 when the second touch selection signal is at the low level. Further, in each of the second switches b00 to b09, the common terminal c is connected to the first terminal p1 when the supplied display selection signal is at the high level, and the common terminal c and the first terminal p1 are set to be non-conduction when the display selection signal is at the low level.

The magnetic-field enable signal SC_EN is set to the low level in touch detection, and the first touch selection signals Ty(n)L-2 to Ty(n+6)L-2 are successively set to the high level in this order. In synchronization with this, the second touch selection signals Ty(n)L-3 to Ty(n+6)L-3 are successively set to the high level in this order. Accordingly, as described above, magnetic-field drive signals are supplied to ends PTL(n−2), PTL(n−1) of the coils CY(n), CY(n+1), and the ground voltage Vss is supplied to ends PTL(n+2), PTL(n+3). Next, magnetic-field drive signals are supplied to ends PTL(n), PTL(n+1) of the coils CY(n+2), CY(n+3), and the ground voltage Vss is supplied to ends PTL(n+4), PTL(n+5). Then, magnetic-field drive signals are supplied to ends PTL(n+2), PTL(n+3) of the coils CY(n+4), CY(n+5), and the ground voltage Vss is supplied to ends PTL(n+6), PTL(n+7). That is, magnetic-field drive signals and the ground voltage Vss are successively supplied to the coils in each two as a unit.

Each of the second switches b00 to b09 may be configured by, for example, three switches. In this case, a first switch is connected between the common terminal c and the first terminal p1 and is brought into conduction when a display selection signal is at the high level and is brought into non-conduction when the display selection signal is at the low level. A second switch is connected between the common terminal c and the second terminal p2 and is brought into conduction when a first touch selection signal is at the high level and is brought into non-conduction when the first touch selection signal is at the low level. A third switch is connected between the common terminal c and the third terminal p3 and is brought into conduction when a second touch selection signal is at the high level and is brought into non-conduction when the second touch selection signal is at the low level.

The selection control circuit SR-R and the selection control circuit SR-L operate in synchronization with each other. That is, the unit selection circuits USR(n−2) to USR(n+6) and the unit selection circuits USL(n−2) to USL(n+6) output selection signals in synchronization. For example, when the unit selection circuit USR(n) outputs a touch selection signal having the high level, the unit selection circuit USL(n) also outputs a first touch selection signal and a second touch selection signal having the high level. In a display period, a display selection signal having the high level is output from each of the selection control circuit SR-R and the selection control circuit SR-L. Accordingly, the generated magnetic field can be enhanced in touch detection, and a display drive signal is supplied from both ends of a drive electrode in a display period, and thus, the voltage of the drive electrode can be stabilized.

<Scan Operation>

Figure 12:
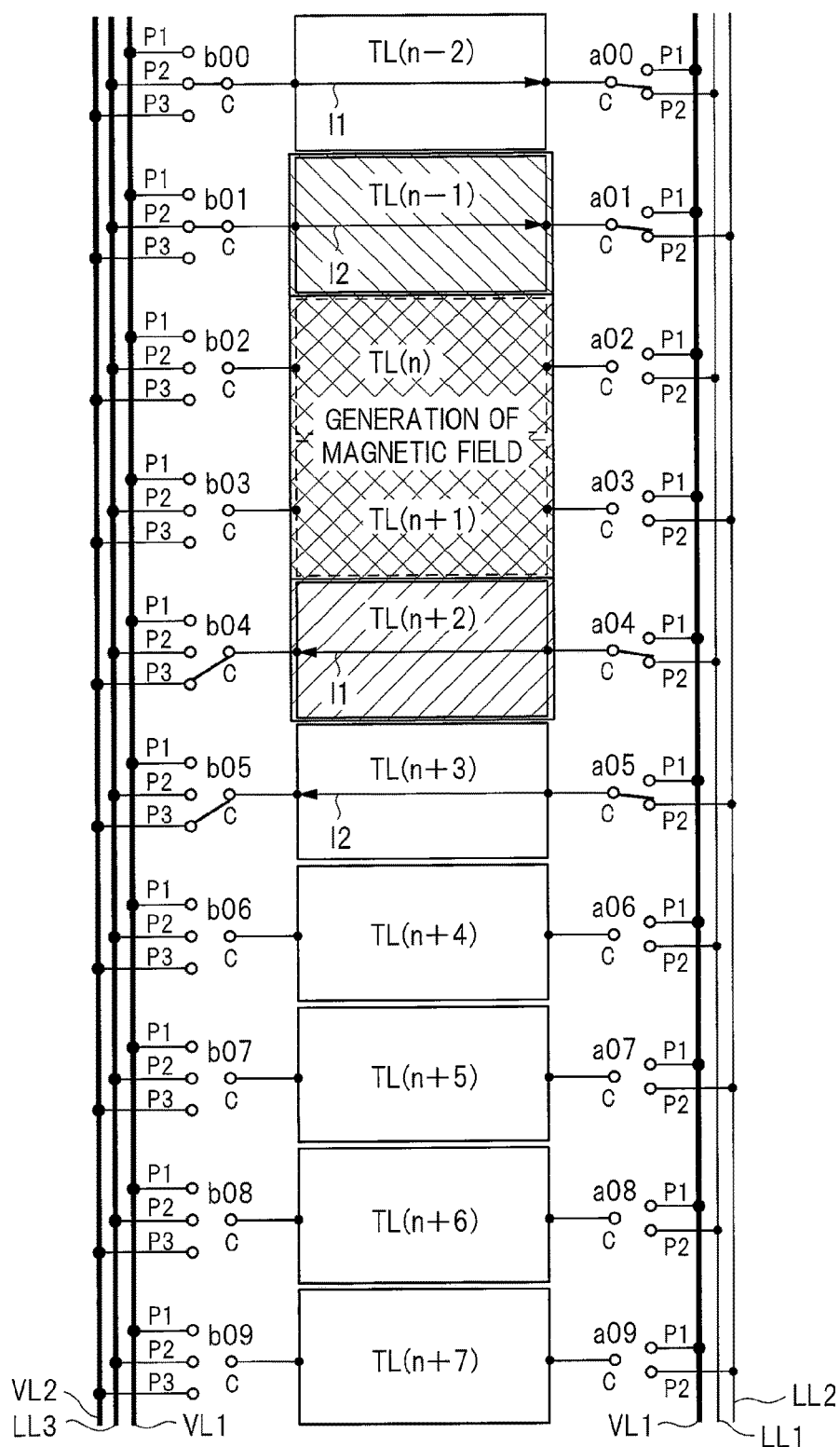
FIG. 12 is a block diagram showing an operation of touch detection of the liquid crystal display apparatus according to the first embodiment.
Figure 13:
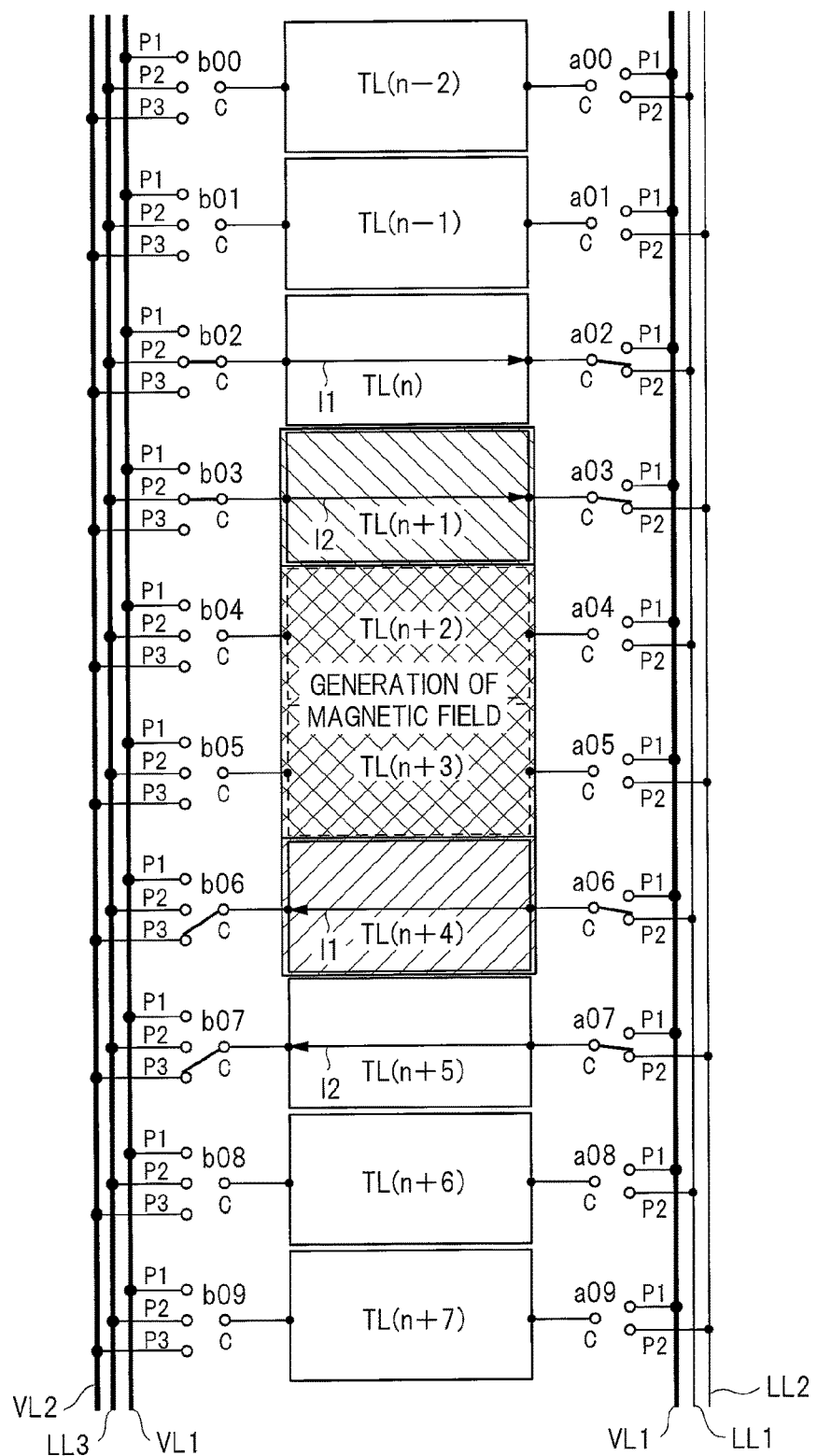
FIG. 13 is a block diagram showing an operation of touch detection of the liquid crystal display apparatus according to the first embodiment.
Figure 14:
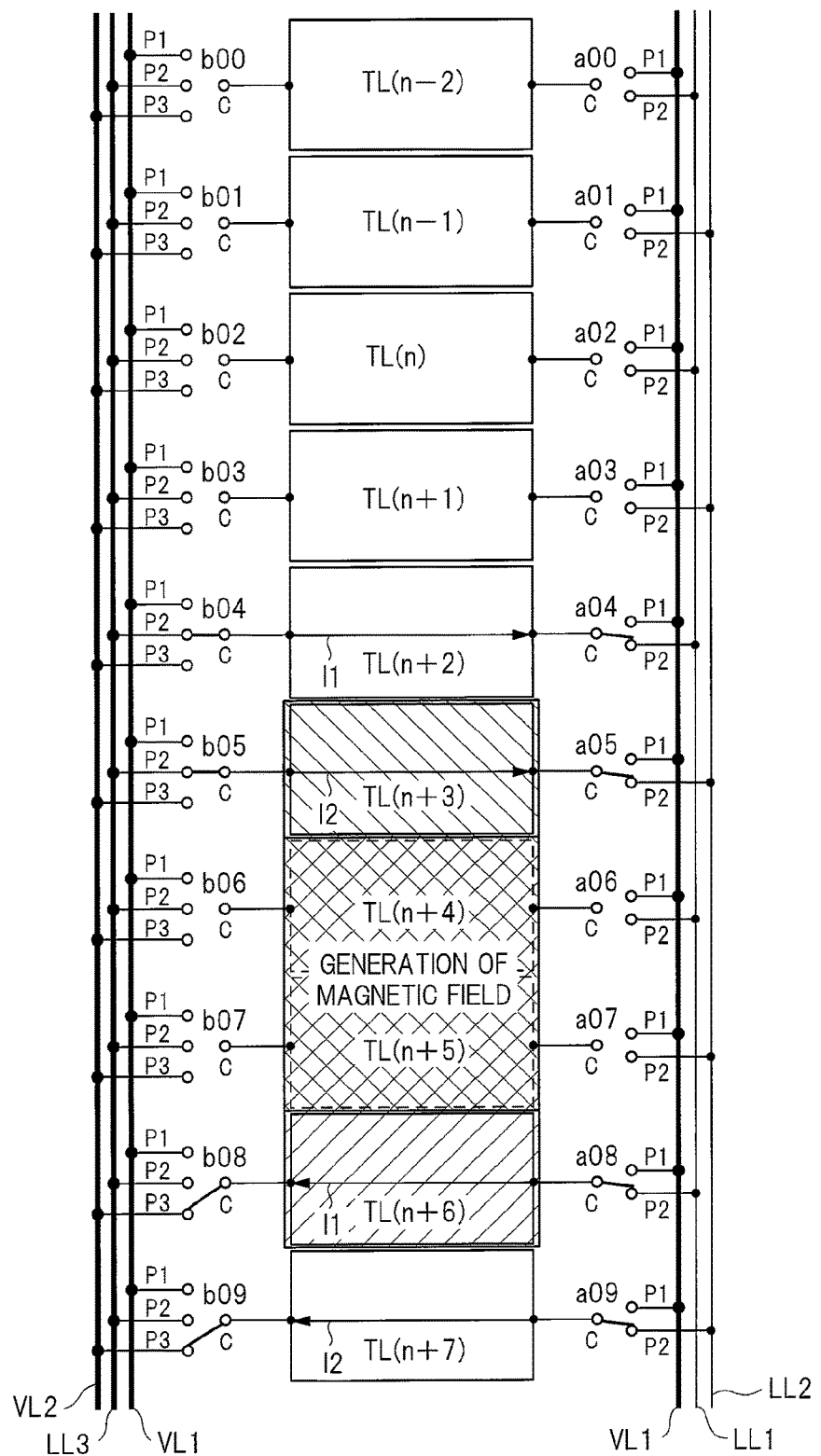
FIG. 14 is a block diagram showing an operation of touch detection of the liquid crystal display apparatus according to the first embodiment.

FIGS. 12 to 14 are block diagrams each showing the operation of the liquid crystal display apparatus 1 according to the first embodiment. In FIGS. 12 to 14, the operation of the liquid crystal display apparatus 1 in touch detection is shown, and the operation in display is omitted.

In FIGS. 12 to 14, TL(n−2) to TL(n+7) indicate drive electrodes. Here, the drive electrodes TL(n−2) to TL(n+7) indicate drive electrodes arranged in this order from the side 2-U side of the display panel 2 (FIGS. 6 and 7) to the side 2-D side. That is, the drive electrode TL(n−2) is a drive electrode arranged closer to the side 2-U of the display panel 2 than the drive electrodes TL(n−1) to TL(n+7), and the drive electrode TL(n+7) is a drive electrode arranged closer to the side 2-D of the display panel 2 than the drive electrodes TL(n−2) to TL(n+6).

The sides 2-U, 2-D of the display panel 2 correspond to the sides (sides parallel to the row) of the pixel array LCD shown in FIG. 10, and thus, the drive electrodes TL(n−2) to TL(n+7) can be considered to be drive electrodes arranged in this order from one side (corresponding to the side 2-U) of the pixel array LCD to the other side (corresponding to the side 2-D) of the pixel array LCD. Also in this case, the drive electrode TL(n−2) is a drive electrode arranged closer to one side (corresponding to the side 2-U) of the pixel array LCD than the drive electrodes TL(n−1) to TL(n+7), and the drive electrode TL(n+7) is a drive electrode arranged closer to the other side (corresponding to the side 2-D) of the pixel array LCD than the drive electrodes TL(n−2) to TL(n+6).

The operation of scanning to detect whether any portion of the display panel 2 is touched by a pen or detect the touched position in the display panel 2 will be described by using FIGS. 12 to 14. Here, the explanation will be made for a case of scan by successively performing touch detection from the side 2-U (one side of the pixel array LCD) of the display panel 2 to the side 2-D (the other side of the pixel array LCD). Naturally, an opposite-direction scan may be performed by successively performing touch detection in the opposite direction (from the side 2-D to the side 2-U).

Each of FIGS. 12 to 14 is similar to the configuration shown in FIG. 11, and thus, differences will mainly be described. First, in FIGS. 12 to 14, the selection control circuits SR-R, SR-L and the selection signals Ty(n−2)R to Ty(n+6)R, Ty(n−2)L to Ty(n+6)L described with reference to FIG. 11 are omitted. However, as similar to the description with reference to FIG. 11, the first switches a00 to a09 and the second switches b00 to b09 shown in FIGS. 12 to 14 are controlled by the selection signals Ty(n−2)R to Ty(n+6)R, Ty(n−2)L to Ty(n+6)L output from the selection control circuits SR-R, SR-L.

FIG. 12 shows a state in a case of the touch detection in an area corresponding to the drive electrodes TL(n), TL(n+1) arranged close to the side 2-U side of the display panel 2. As understood from FIG. 3, the detection of a touch includes the magnetic field generation period TGT and the magnetic field detection period TDT. In the magnetic field generation period TGT, in order to generate a strong magnetic field in an area corresponding to the drive electrodes TL(n), TL(n+1), the selection control circuits SR-R, SR-L set the selection signals Ty(n)R, Ty(n)L assigning the drive electrodes TL(n), TL(n+1) to the high level. That is, the unit selection circuits USR(n), USL(n) corresponding to the drive electrodes TL(n), TL(n+1) set the selection signals Ty(n)R, Ty(n)L assigning four drive electrodes arranged so as to surround these drive electrodes to the high level. More specifically, the touch selection signal Ty(n)R-2, the first touch selection signal Ty(n)L-2, and the second touch selection signal Ty(n)L-3 are set to the high level. Accordingly, as described with reference to FIG. 11, the first switch and the second switch are controlled as follows.

That is, by the selection signal Ty(n)R, the common terminal c in each of the first switches a00, a01, a04, a05 is connected to the second terminal p2. Also, by the selection signal Ty(n)L, the common terminal c in each of the second switches b00, b01 is connected to the second terminal p2, and the common terminal c in each of the second switches b04, b05 is connected to the third terminal p3. Accordingly, one end of the drive electrode TL(n−2) and one end of the drive electrode TL(n+2) are electrically connected via the first switches a00, a04. Similarly, an end of the drive electrode TL(n−1) and an end of the drive electrode TL(n+3) are electrically connected via the first switches a01, a05. Also, the other end of the drive electrode TL(n−2) is connected to the signal wire LL3 via the second switch b00, and the other end of the drive electrode TL(n−1) is also connected to the signal wire LL3 via the second switch b01. Further, the other end of the drive electrode TL(n+2) is connected to the voltage wire VL2 via the second switch b03, and the other end of the drive electrode TL(n+3) is also connected to the voltage wire VL2 via the second switch b04.

Accordingly, the single-winding coil CY(n) having the drive electrodes TL(n−2), TL(n+2) as a winding wire and the single-winding coil CY(n+1) having the drive electrodes TL(n−1), TL(n+3) as a winding wire are formed. In the magnetic field generation period TGT, the coil clock signal CCLK is supplied to the signal wire LL3, and the ground voltage Vss is supplied to the voltage wire VL2. As a result, each of these coils CY(n), CY(n+1) generates a magnetic field changing in accordance with changes of the coil clock signal CCLK. These coils CY(n), CY(n+1) overlap in an area corresponding to the drive electrodes TL(n), TL(n+1), and thus, magnetic fields generated by respective coils are superimposed in the overlapped area in the magnetic field generation period TGT to produce a strong magnetic field. Each of the coils CY(n), CY(n+1) has a U shape when seen in a plan view. Therefore, the wire which is connected in the U shape is also considered to be a coil. Also, the overlapping of the U shapes leads to the overlapping of the coils (CY(n) and CY(n+1)).

In FIG. 12, a reference character "I1" indicates a drive current flowing through the drive electrodes TL(n−2), TL(n+2) to be a winding wire of the coil CY(n) in the magnetic field generation period TGT, and a reference character "I2" indicates a drive current flowing through the drive electrodes TL(n−1), TL(n+3) to be a winding wire of the coil CY(n+1) in the magnetic field generation period TGT. In the first embodiment, each of the coils CY(n), CY(n+1) is a single-winding coil. Thus, the length between terminals (between PTL(n−2) and PTL(n+2)) of the coil CY(n) can be relatively suppressed to be small. Similarly, the length between terminals (between PTL(n−1) and PTL(n+3)) of the coil CY(n+1) can be relatively reduced to be small. As a result, even if the sheet resistance of a drive electrode is relatively high, the impedance of each coil can be suppressed to be low, so that the drive currents I1, I2 can be increased to a high value.

By increasing the drive currents I1, I2, weakening of a magnetic field generated by each coil is suppressed, and the magnetic field generated by each coil is superimposed in an area where the touch is detected. Therefore, in the magnetic field generation period TGT, a strong magnetic field can be generated in the area where the touch is detected.

Depending on whether a pen approaches an area where the touch is detected, that is, an area where coils overlap (corresponding to the drive electrodes TL(n), TL(n+1)), the amount of charge to be charged in the capacitative element C in the pen changes as described with reference to FIGS. 2 and 3.

In the magnetic field detection period TDT subsequent to the magnetic field generation period TGT, coils having the signal lines SL(0) to SL(p) as a winding wire are formed. If the pen internal coil L1 generates a magnetic field by charges charged in the capacitative element C in the magnetic field generation period TGT, an induced voltage is generated in the coil having the signal lines as a winding wire, and is supplied to the magnetic field detection circuit SE-DET as the sensor signals S(0) to S(p), and is detected.

In the first embodiment, a generated magnetic field can be enhanced in the magnetic field generation period TGT, and thus, the amount of charge to be charged in the capacitative element C in the pen can be increased, so that the accuracy of detection can be improved.

When the selection signals Ty(n)R, Ty(n)L corresponding to an area where the touch is detected are set to the high level, the selection control circuits SR-R, SR-L set all selection signals except for the selection signals Ty(n)R, Ty(n)L to the low level. In the description of FIG. 11 as an example, each of the selection signals Ty(n−2)R, Ty(n+2)R, Ty(n+4)R, Ty(n+6)R and Ty(n−2)L, Ty(n+2)L, Ty(n+4)L, Ty(n+6)L is set to the low level. Accordingly, the common terminal c in the first switches except for the first switches a00, a01, a04, a05 is connected to the third terminal. Also, the common terminal c in the second switches except for the second switches b00, b01, b04, b05 is connected to the fourth terminal.

Because the third terminal in the first switch and the fourth terminal in the second switch are put in a floating state, drive electrodes except for the drive electrodes TL(n−2), TL(n−1), TL(n+2), TL(n+3) to be a winding wire of the coils CY(n), CY(n+1) are in a floating state. In order to clearly specify that these drive electrodes are in a floating state, FIG. 12 shows the common terminals c of the first switches except for the first switches a00, a01, a04, a05 and the second switches except for the second switches b00, b01, b04, b05 so as to be connected to no signal wire.

FIG. 13 shows a state of the touch detection continued from FIG. 12. That is, FIG. 13 shows a state obtained when a close area to the area (corresponding to the drive electrodes TL(n), TL(n+1)) where the touch is detected as described with reference to FIG. 12 is assigned as an area where the touch is to be detected. In this case, an area closer to the side 2-D side of the display panel 2 than the area where the touch is detected as described with reference to FIG. 12 is the area (corresponding to the drive electrodes TL(n+2), TL(n+3)) where the touch is to be detected.

In the case of FIG. 13, the selection control circuits SR-R, SR-L set the selection signals Ty(n+2)R, Ty(n+2)L to the high level as the selection signals that assign an area where the touch should be detected. That is, the selection signals Ty(n+2)R, Ty(n+2)L output from the unit selection circuits USR(n+2), USL(n+2) are set to the high level. More specifically, the high-level touch selection signal Ty(n+2)R-2 is output from the unit selection circuit USR(n+2), and the high-level first touch selection signal Ty(n+2)R-2 and the high-level second touch selection signal Ty(n+2)R-3 are output from the unit selection circuit USL(n+2).

Accordingly, when the touch is detected in an area corresponding to the drive electrodes TL(n+2), TL(n+3), the common terminal c of the first switches a02, a03, a06, a07 is connected to the second terminal p2, the common terminal c of the second switches b02, b03 is connected to the second terminal p2, and the common terminal c of the second switches b06, b07 is connected to the third terminal p3 in the magnetic field generation period TGT. As a result, in the magnetic field generation period TGT, the coils CY(n+2), CY(n+3) overlapping with each other are formed of the drive electrodes TL(n), TL(n+1), TL(n+4), TL(n+5) in the area where the touch is detected (corresponding to the drive electrodes TL(n+2), TL(n+3)).

The coils CY(n+2), CY(n+3) overlapping with each other are formed in the area where the touch is detected, and these coils generate magnetic fields in accordance with changes of the coil clock signal CCLK. Therefore, as similar to the description with reference to FIG. 12, a strong magnetic field can be generated in an area where the touch is detected in the magnetic field generation period TGT.

Also in the case of FIG. 13, as similar to FIG. 12, coils are formed of signal lines in the magnetic field detection period TDT subsequent to the magnetic field generation period TGT, and signals in the formed coils are supplied to the magnetic field detection circuit SE-DET as the sensor signals S(0) to S(p), so that the touch is detected.

As similar to FIG. 12, note that the selection control circuits SR-R, SR-L set the selection signals except for the selection signals Ty(n+2)R, Ty(n+2)L that assign the area where the touch should be detected to the low level. Accordingly, drive electrodes except for the drive electrodes TL(n), TL(n+1), TL(n+4), TL(n+5) to be a winding wire of the coils are in a floating state. In order to clearly specify that these drive electrodes are in a floating state, FIG. 12 also shows the common terminals c of the first switches except for the first switches a02, a03, a06, a07 and the second switches except for the second switches b02, b03, b06, b07 so as to be connected to no signal wire as similar to FIG. 12.

FIG. 14 shows a state of the touch detection continued from FIG. 13. That is, FIG. 14 shows a state obtained when a close area to the area (corresponding to the drive electrodes TL(n+2), TL(n+3)) where the touch is detected as described with reference to FIG. 13 is assigned as an area where the touch is to be detected. In this case, an area closer to the side 2-D side of the display panel 2 than the area where the touch is detected as described with reference to FIG. 13 is the area (corresponding to the drive electrodes TL(n+4), TL(n+5)) where the touch is to be detected.

In the case of FIG. 14, the selection control circuits SR-R, SR-L set the selection signals Ty(n+4)R, Ty(n+4)L to the high level as the selection signals that assign an area where the touch should be detected. That is, the selection signals Ty(n+4)R, Ty(n+4)L output from the unit selection circuits USR(n+4), USL(n+4) are set to the high level. More specifically, the high-level touch selection signal Ty(n+4)R-2 is output from the unit selection circuit USR(n+4), and the high-level first touch selection signal Ty(n+4)R-2 and the high-level second touch selection signal Ty(n+4)R-3 are output from the unit selection circuit USL(n+4).

Accordingly, when the touch is detected in an area corresponding to the drive electrodes TL(n+4), TL(n+5), the common terminal c of the first switches a04, a05, a08, a09 is connected to the second terminal p2, the common terminal c of the second switches b04, b05 is connected to the second terminal p2, and the common terminal c of the second switches b08, b09 is connected to the third terminal p3 in the magnetic field generation period TGT. As a result, in the magnetic field generation period TGT, the coils CY(n+4), CY(n+5) overlapping with each other are formed of the drive electrodes TL(n+2), TL(n+3), TL(n+6), TL(n+7) in the area where the touch is detected (corresponding to the drive electrodes TL(n+4), TL(n+5)).

The coils CY(n+4), CY(n+5) overlapping with each other are formed in the area where the touch is detected, and these coils generate magnetic fields in accordance with changes of the coil clock signal CCLK. Therefore, as similar to the description with reference to FIG. 12, a strong magnetic field can be generated in an area where the touch is detected in the magnetic field generation period TGT.

Also in the case of FIG. 14, as similar to FIG. 12, coils are formed of signal lines in the magnetic field detection period TDT subsequent to the magnetic field generation period TGT, and signals in the formed coils are supplied to the magnetic field detection circuit SE-DET as the sensor signals S(0) to S(p), so that the touch is detected.

As similar to FIG. 12, note that the selection control circuits SR-R, SR-L set the selection signals except for the selection signals Ty(n+4)R, Ty(n+4)L that assign the area where the touch should be detected to the low level. Accordingly, drive electrodes except for the drive electrodes TL(n+2), TL(n+3), TL(n+6), TL(n+7) to be a winding wire of the coils are in a floating state. In order to clearly specify that these drive electrodes are in a floating state, FIG. 14 also shows the common terminals c of the first switches except for the first switches a04, a05, a08, a09 and the second switches except for the second switches b04, b05, b08, b09 so as to be connected to no signal wire as similar to FIG. 13.

By performing the touch detection successively from the side 2-U toward the side 2-D in the display panel 2 as described above, a scan operation from the side 2-U toward the side 2-D can be performed. By performing a scan operation, whether any portion of the display panel 2 is touched or the touched position of the display panel 2 can be scanned.

In the first embodiment, in a scan operation, the drive electrodes are successively assigned from the drive electrodes TL(n−2) to TL(n+7) arranged between the side 2-U and the side 2-D of the display panel 2 by selection signals output from the selection control circuits SR-R, SR-L, and two single-winding coils are formed of the assigned drive electrodes. A strong magnetic field is formed in an area where the two formed coils overlap, and the touch detection is performed in the overlapped area. Accordingly, the touch detection can be successively performed so as to scan the display panel 2.

From a different viewpoint, the touch detection can be considered to be performed by two coils, each of which is a single-winding wire, while the two coils are successively shifted from the side 2-U toward the side 2-D in the display panel 2 in accordance with selection signals from the selection control circuits SR-R, SR-L. In this case, the value of the shifted area in the two coils, each of which is a single-winding wire, serving as one unit, is substantially the same as the value of the area where the touch is detected. That is, in the first embodiment, the value of the shifted area and the value of the area where the touch is detected correspond to two close (adjacent) drive electrodes (for example, TL(n) and TL(n+1)). If two drive electrodes forming a single-winding coil is considered to be a bundle, the scan operation is achieved by performing the touch detection while two bundles (a first bundle and a second bundle) are shifted by two bundles in accordance with selection signals from the selection control circuits SR-R, SR-L.

In the first embodiment, in the magnetic field generation period TGT, two coils are formed by using drive electrodes arranged so as to be close to each other. In the description of FIG. 11 as an example, when a strong magnetic field is generated in an area corresponding to the drive electrodes TL(n), TL(n+1), the drive electrode TL(n−2) and the drive electrode TL(n−1) arranged close to each other are used as one winding wire of each of two coils. Also, the drive electrode TL(n+2) and the drive electrode TL(n+3) arranged close to each other are used as the other winding wire of each of the two coils. Each width of the drive electrodes, that is, each length thereof in a direction perpendicular to the extending direction of the drive electrodes are substantially the same. Thus, in the first embodiment, the width of the area where two coils overlap (area where the touch is detected) is substantially the same as the total width of drive electrodes used as one (or the other) winding wire of two coils.

<Switching Adjustment Circuits SCX-U, SCX-D and Selection Control Circuit SRX-D>

Figure 16:
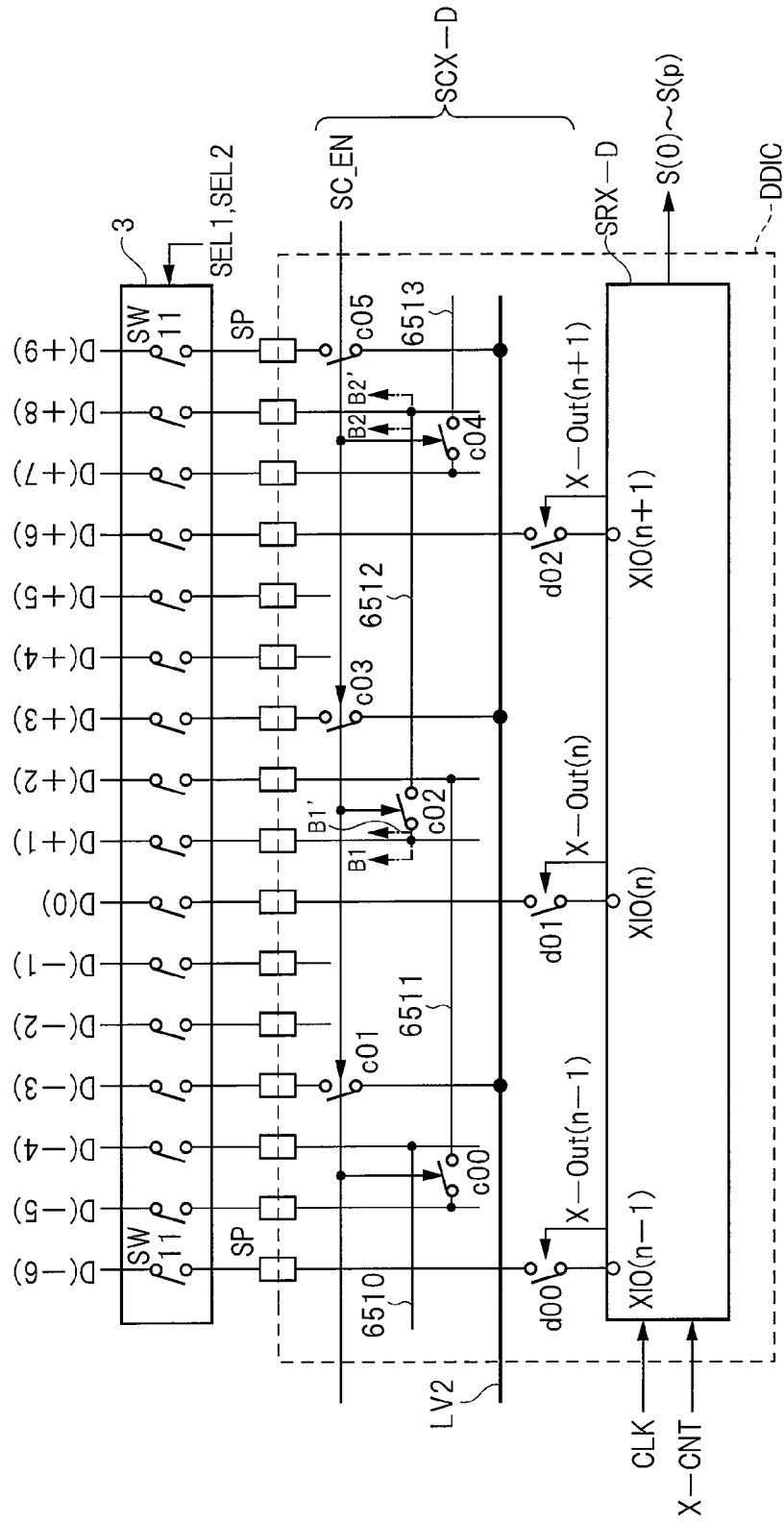
FIG. 16 is a block diagram showing a configuration of a selective control circuit and a switching circuit of the liquid crystal display apparatus according to the first embodiment.
Figure 17:
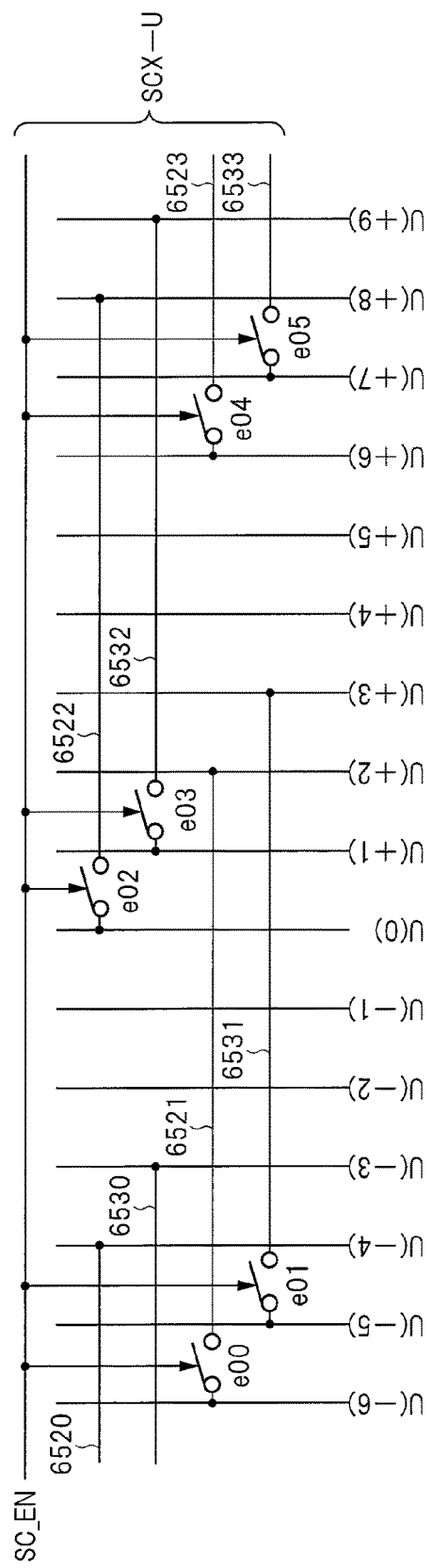
FIG. 17 is a block diagram showing a configuration of a switching adjustment circuit of the liquid crystal display apparatus according to the first embodiment.

FIG. 16 is a block diagram showing the configuration of the switching adjustment circuit SCX-D and the selection control circuit SRX-D in the liquid crystal display apparatus 1 according to the first embodiment. FIG. 17 is a block diagram showing the configuration of the switching adjustment circuit SCX-U in the liquid crystal display apparatus 1 according to the first embodiment.

FIG. 16 shows a portion of the switching adjustment circuit SCX-D corresponding to the signal lines SL(n−6) to SL(n+9) shown in FIG. 8 and a portion of the selection control circuit SRX-D corresponding to the signal lines SL(n−6) to SL(n+9). Reference characters D(−6) to D(+9) shown in FIG. 8 are connected to reference characters D(−6) to D(+9) shown in FIG. 16, respectively. Similarly, FIG. 17 shows a portion of the switching adjustment circuit SCX-U corresponding to the signal lines SL(n−6) to SL(n+9) shown in FIG. 8. Reference characters U(−6) to U(+9) shown in FIG. 8 are connected to reference characters U(−6) to U(+9) shown in FIG. 17, respectively.

<<Coil Formed of Signal Lines>>

Before the description for the switching adjustment circuits SCX-D, SCX-U and the selection control circuit SRX-D, a coil (detection coil) formed of signal lines in the first embodiment will be described.

Although not specifically limited, a plurality of double-winding coils are formed of the signal lines SL(0) to SL(P) in touch detection in the first embodiment. Here, coils CX(n−2) to CX(n+1) formed in touch detection from the signal lines SL(n−6) to SL(n+9) shown in FIG. 8 are described as an example.

Figure 18:
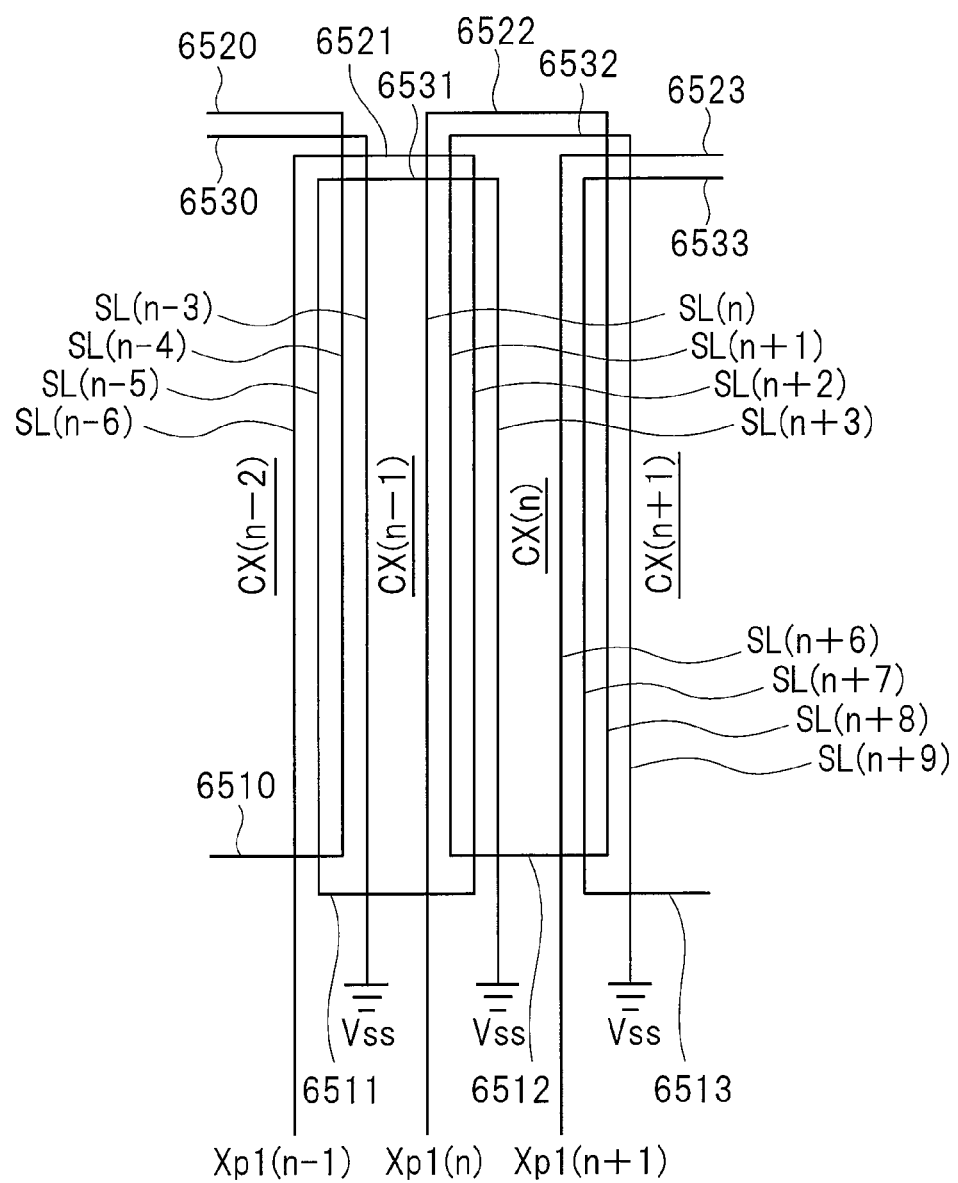
FIG. 18 is a plan view schematically showing a configuration of a coil formed in the liquid crystal display apparatus according to the first embodiment.

FIG. 18 is a schematic plan view of coils having the signal lines SL(n−6) to SL(n−3), SL(n) to SL(n+3), and SL(n+6) to SL(n+9) as winding wires. In the touch detection, the coils CX(n−2) to CX(n+1) are formed of these signal lines and signal wires connecting ends of these signal lines.

As described later with reference to FIGS. 16 and 17, ends of the following signal lines are electrically connected via signal wires in the touch detection.

One end of the signal line SL(n−5) is electrically connected to one end of the signal line SL(n+2) via a signal wire 6511. The other ends of the signal lines SL(n−6), SL(n−5) are connected to the other ends of the signal lines SL(n+2), SL(n+3) via signal wires 6521, 6531, respectively. Further, the ground voltage Vss is supplied to one end of the signal line SL(n+3), and one end of the signal line SL(n−6) is connected to an output terminal Xp1($n$1). Accordingly, in the touch detection, the signal lines SL(n−6), SL(n−5), SL(n+2), SL(n+3) are connected in series between the ground voltage Vss and the output terminal Xp1($n$−1). The signal lines SL(n−6) to SL(n+9) extend in parallel with each other. Thus, in the touch detection, the coil CX(n−1) having the signal lines SL(n−6), SL(n−5), SL(n+2), SL(n+3) as winding wires is formed.

Also, one end of the signal line SL(n+1) is electrically connected to one end of the signal line SL(n+8) via a signal wire 6512. The other ends of the signal lines SL(n), SL(n+1) are connected to the other ends of the signal lines SL(n+8), SL(n+9) via signal wires 6522, 6532, respectively. Further, the ground voltage Vss is supplied to one end of the signal line SL(n+9), and one end of the signal line SL(n) is connected to an output terminal Xp1($n$). Accordingly, in the touch detection, the signal lines SL(n−6), SL(n−5), SL(n+2), SL(n+3) are connected in series between the ground voltage Vss and the output terminal Xp(n), so that the coil CX(n) having the signal lines SL(n), SL(n+1), SL(n+8), SL(n+9) as winding wires is formed in the touch detection.

Similarly, the coil CX(n+1) is formed between an output terminal Xp1($n$+1) and the ground voltage Vss by making the connection between the signal lines SL(n+6), SL(n+7) and signal lines not shown via signal wires 6513, 6523, 6533. Further, the coil CX(n−2) is formed by making the connection between the signal lines SL(n−4), SL(n−3) and signal lines not shown via signal wires 6510, 6520, 6530.

The coils f having the signal lines SL(0) to SL(p) as winding wires in touch detection extend in an extending direction of the signal lines. On the other hand, coils shown in FIGS. 11 to 14, that is, coils having drive electrodes as winding wires extend in the extending direction of the drive electrodes. Thus, coils having signal lines as winding wires and coils having drive electrodes as winding wires are orthogonal to each other. In the description of the coils CY(n) to CY(n+5) shown in FIG. 15 and the coils CX(n−2) to CX(n+1) shown in FIG. 18 as an example, the coils CY(n) to CY(n+5) and the coils CX(n−2) to CX(n+1) are orthogonal to each other while they are electrically insulated from each other.

In the first embodiment, the coils CX(n−2) to CX(n+1) formed in touch detection are formed so as to overlap with each other. In the description of the coils CX(n), CX(n−1) as an example, the signal lines SL(n+2), SL(n+3) serving as a winding wire of the coil CX(n−1) are arranged inside the coil CX(n). Similarly, the signal lines SL(n), SL(n+1) serving as a winding wire of the coil CX(n) are arranged inside the coil CX(n−1). In this manner, in the touch detection, occurrence of an area where the accuracy of detection of a magnetic field is degraded can be prevented by making the coils overlap.

<<Configuration of the Switching Adjustment Circuit SCX-D and the Selection Control Circuit SRX-D>>

Next, the configuration of the switching adjustment circuit SCX-D and the selection control circuit SRX-D will be described with reference to FIGS. 16 and 8. FIG. 16 shows the configuration of a portion corresponding to the signal lines SL(n−6) to SL(n+9) and a schematic configuration of the signal line selector 3.

In the display period, an image signal is supplied to each of terminals SP from the display control device 4 (FIG. 6) in time-division mode. In FIG. 14, in order to avoid the complexity of the drawing, note that a reference character SP is attached to only the terminal arranged rightmost and the terminal arranged leftmost.

The signal line selector 3 includes a plurality of switches switch-controlled by the selection signals SEL1, SEL2 to supply an image signal, which is supplied to the terminal SP, to an appropriate signal line. While switches in the signal line selector 3 selectively connect the terminals SP and signal lines in a display period, they connect all signal lines and the terminals SP substantially at the same time in a touch detection period. In order to show the change between the display period and the touch detection period in the connection of signal lines and the terminals SP, FIG. 16 shows a schematic switch SW11 (reference character SW11 is attached to only the rightmost switch and the leftmost switch) as a switch included in the signal line selector 3. That is, the switch SW11 shown in FIG. 16 is illustrated to show that the signal lines SL(0) to SL(p) and the terminals SP are connected in a touch detection period.

The switching adjustment circuit SCX-D includes third switches c00 to c05 switch-controlled by the magnetic-field enable signal SC_EN, fourth switches d00 to d02 switch-controlled by selection signals X-Out(n−1) to X-Out(n+1) from the selection control circuit SRX-D, and signal wires 6510 to 6513.

In the assignment to the touch detection, the control circuit D-CNT (FIG. 6) sets the magnetic-field enable signal SC_EN to the high level. In the non-assignment to the touch detection or in the display period, the control circuit D-CNT sets the magnetic-field enable signal SC_EN to the low level. The third switches c00 to c05 are turned on when the magnetic-field enable signal SC_EN is set to the high level. On the other hand, when the magnetic-field enable signal SC_EN is set to the low level, the third switches c00 to c05 are turned off. Also, the switch SW11 in the signal line selector 3 is turned on in a touch detection period, and thus, the terminals SP and the signal lines SL(n−6) to SL(n+9) are electrically connected.

Accordingly, in the touch detection period, one end of the signal line SL(n−5) is connected to one end of the signal line SL(n+2) via the third switch c00 and the signal wire 6511, and one end of the signal line SL(n+1) is connected to one end of the signal line SL(n+8) via the third switch c02 and the signal wire 6512. Also, the signal line SL(n−4) is connected to a signal line not shown via the signal wire 6510 and a third switch not show, and the signal line SL(n+7) is connected to a signal line not shown via the third switch c04 and the signal wire 6513.

In the touch detection period, one end of each of the signal lines SL(n−3), SL(n+9) is connected to the voltage wire VL2 via the third switches c01, c05 respectively. In the touch detection period, for example, the ground voltage Vss is supplied to the voltage wire VL2. Also, in the touch detection period, the fourth switches d00 to d02 are turned on in accordance with the selection signals X-Out(n−1) to X-Out(n+1) from the selection control circuit SRX-D.

When the touch detection is started, the control circuit D-CNT shown in FIG. 6 sets the control signals X-CNT, Y-CNT to, for example, the high level. The control signal X-CNT becomes at the high level, so that the selection control circuit SRX-D performs a coil selection operation in synchronization with changes of the clock signal CLK. For example, the selection control circuit SRX-D sets the selection signals X-Out(0) to X-Out(p) to the high level in this order in synchronization with changes of the clock signal CLK. The selection control circuit SRX-D includes input terminals XIO(0) to XIO(p) corresponding to the coils CX(0) to CX(p), respectively. When the selection signals X-Out(0) to X-Out(p) successively become at the high level, the fourth switches are successively brought into conduction so that signals from the coils CX(0) to CX(p) are supplied to the input terminals XIO(0) to XIO(p). The selection control circuit SRX-D outputs supplied signals as the sense signals S(0) to S(p) in the magnetic field detection period TDT. Note that FIG. 16 shows only input terminals XIO(n−1) to XIO(n+1) connected to respective output terminals Xp1($n-1$) to Xp1($n+1$) of the coils CX(n−1) to CX(n+1) and selection signals X-Out(n−1) to X-Out(n+1) corresponding to these input terminals.

In FIG. 16, note that a reference character DDIC shown by a broken line indicates a semiconductor device for drive. The semiconductor device for drive DDIC is arranged so as to cover the switching adjustment circuit SCX-D and the selection control circuit SRX-D described above, and an external terminal of the semiconductor device for drive DDIC is connected to the terminal SP. From the external terminal of the semiconductor device for drive DDIC connected to the terminal SP, an image signal is supplied to the terminal SP in a display period. In a touch detection period, the external terminal of the semiconductor device for drive DDIC is put into a high-impedance state.

Note that the output terminals Xp1(0) to Xp1($p$) of the coils CX(0) to CX(p) may be connected to the input terminals XIO(0) to XIO(p) of the selection control circuit SRX-D, respectively, without providing the fourth switches. In this manner, signals from the coils CX(0) to CX(p) can be output from the selection control circuit SRX-D as the sense signals S(0) to S(p), respectively.

<<Configuration of the Switching Adjustment Circuit SCX-U>>

FIG. 17 is a circuit diagram showing the configuration of the switching adjustment circuit SCX-U. FIG. 17 shows a portion of the switching adjustment circuit SCX-U corresponding to the signal lines SL(n−6) to SL(n+9). The switching adjustment circuit SCX-U includes fifth switches e00 to e05 switch-controlled by the magnetic-field enable signal SC_EN and signal wires 6520 to 6523, 6530 to 6533. To the fifth switches e00 to e05, the high-level magnetic-field enable signal SC_EN is supplied in touch detection, and therefore, these switches are turned on. On the other hand, in no assignment to the touch detection and in the display period, the fifth switches e00 to e05 are turned off.

In touch detection, in the switching adjustment circuit SCX-U, the other end of the signal line SL(n−6) is connected to the other end of the signal line SL(n+2) via the fifth switch e00 and the signal wire 6521, and the other end of the signal line SL(n−5) is connected to the other end of the signal line SL(n+3) via the fifth switch e01 and the signal wire 6531. At this time, in the switching adjustment circuit SCX-U, the other end of the signal line SL(n) is connected to the other end of the signal line SL(n+8) via the fifth switch e02 and the signal wire 6522, and the other end of the signal line SL(n+1) is connected to the other end of the signal line SL(n+9) via the fifth switch e03 and the signal wire 6532. Also at this time, the signal line SL(n−4) is connected to a signal line not shown via a fifth switch not shown and the signal wire 6520, and the signal line SL(n−3) is connected to a signal line not shown via a fifth switch not shown and the signal wire 6520. Further, the signal line SL(n+6) is connected to a signal line not shown via the fifth switch e04 and the signal wire 6523, and the signal line SL(n+7) is connected to a signal line not shown via the fifth switch e05 and the signal wire 6533.

<<The Switching Adjustment Circuits SCX-D, SCX-U and the Selection Control Circuit SRX-D>>

When the touch detection is assigned, in the switching adjustment circuit SCX-D, the signal line SL(n−5) and the signal line SL(n+2) are connected, the signal line SL(n+1) and the signal line SL(n+8) are connected, and the signal lines SL(n+3), SL(n+9) are connected to the voltage wire VL2. Also when the touch detection is assigned, in the switching adjustment circuit SCX-U, the signal line SL(n−6) and the signal line SL(n+2) are connected, the signal line SL(n−5) and the signal line SL(n+3) are connected, the signal lines SL(n) and the signal SL(n+8) are connected, and the signal lines SL(n+1) and the signal SL(n+9) are connected. Accordingly, when the touch detection is assigned, the signal lines SL(n−6), SL(n−5), SL(n+2), SL(n+3) arranged in parallel with each other are connected in series in the display panel 2, so that the coil X(n−1) having these signal lines as a winding wire is formed. Similarly, when the magnetic field touch detection is assigned, the signal lines SL(n), SL(n+1), SL(n+8), SL(n+9) are connected in series, so that the coil X(n) having these signal lines as a winding wire is formed.

At this time, to one end of each of the coils X(n−1), X(n), the voltage wire VL2 is connected, so that the ground voltage Vss is supplied thereto. If the coil X(n−1) or/and the coil X(n) are selected by the selection control circuit SRX-D, the selection signals X-Out(n−1) or/and X-Out(n) are set to the high level. Accordingly, the other ends of the selected coils X(n−1) or/and X(n) are connected to the input terminals XIO(n−1) or/and XIO(n) of the selection control circuit SRX-D via the fourth switches d00 or/and d01.

In the magnetic field generation period TGT of touch detection, as described with reference to FIGS. 11 to 14, a strong magnetic field is generated in an area where the touch should be detected by coils (for example, the coils CY(n), CY(n+1)) having drive electrodes as winding wires. At this time, the amount of charge to be charged in the capacitative element C in the pen is determined depending on whether the pen approaches the area where the touch is to be detected or not.

In the magnetic field detection period TDT subsequent to the magnetic field generation period TGT, the selection control circuit SRX-D sets only the selection signal X-Out(n−1) or X-Out(n) corresponding to the coil X(n−1) or X(n) to be selected to the high level, and the selection signal corresponding to the coil X(n−1) or X(n) to be not selected to the low level. Accordingly, the output terminal of the selected coil X(n−1) or X(n) is connected to the input terminal of the selection control circuit SRX-D, and the output terminal of the non-selected coil is not connected to the input terminal of the selection control circuit SRX-D.

In touch detection, if a pen exists in vicinity of the selected coil in an area where the touch should be detected, the pen internal coil L1 generates a magnetic field by charges charged in the capacitive element C inside the pen, and an induced voltage is generated in the selected coil by the generated magnetic field. As a result, signal change occurs in the output terminal of the selected coil. The signal change is transferred to the input terminal of the selection control circuit SRX-D, and is output from the selection control circuit SRX-D as the sense signal S(n). On the other hand, in touch detection, if a pen does not exist in an area where the touch should be detected or in vicinity of the selected coil, no signal change occurs in the output terminal of the selected coil, and this is output as the sense signal S(n).

Meanwhile, in a display period, the third switches c00 to c05, the fourth switches d00 to d02, and the fifth switches e00 to e05 are turned off. Accordingly, the signal lines SL(n−6) to SL(n+9) are electrically insulated from each other. In a display period, an image signal is supplied from the display control device 4 to the terminal SP, and the signal lines SL(n−6) to SL(n+9) can transfer the image signal.

<Structure of the Signal Wire>

Figure 19:
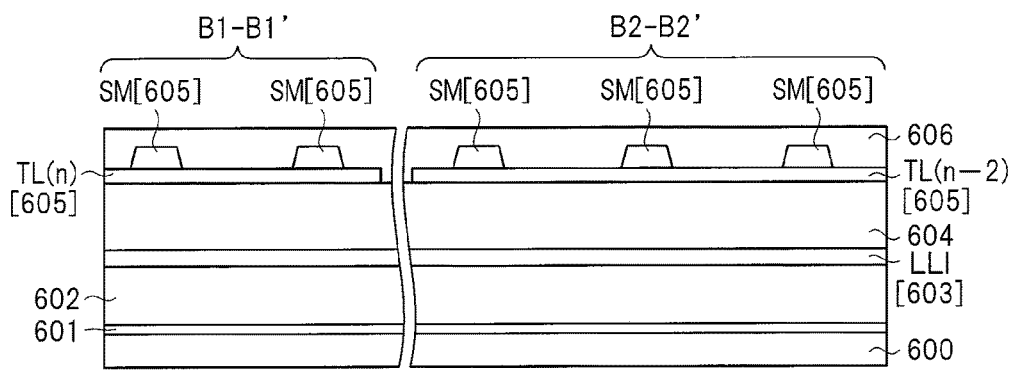
FIG. 19 is a cross-sectional view schematically showing the configuration of the liquid crystal display apparatus according to the first embodiment.

In the first embodiment, the switching circuit DSC and the selection drive circuit SDC are arranged outside the display panel 2 (pixel array LCD). That is, the signal wires LL1, LL2 included in the switching circuit DSC and the selection drive circuit SDC are formed of wires arranged outside the display panel 2. Here, the structure of the signal wire using wires arranged outside the display panel 2 will be described while exemplifying the signal wire LL1 shown in FIG. 11. FIG. 19 is a cross-sectional view showing a cross section of B1-B1' and a cross section of B2-B2' in FIG. 11. Note that the structure of the cross section in the display panel 2 is shown in FIG. 9, and thus, the description thereof is omitted.

In FIG. 19, a reference character [603] indicates a second wiring layer 603, and a reference character [605] indicates a third wiring layer 605. The drive electrodes TL(0) to TL(p) and the auxiliary electrode SM are formed of wires arranged in the third wiring layer. The drive electrodes TL(0) to TL(p) and the auxiliary electrode SM formed in the display panel 2 extend to the switching circuit DSC and the selection drive circuit SDC arranged outside the display panel 2 although not specifically limited. FIG. 19 shows the drive electrodes TL(n+1), TL(n+8) extending to the switching circuit DSC and the auxiliary electrode SM arranged on these drive electrodes. In order to clearly show that the drive electrodes TL(n), TL(n−2) and the auxiliary electrode SM are formed of wires of the third wiring layer 605, FIG. 19 shows these electrodes as reference characters TL(n)[605], TL(n−2), and SM[605] in.

In the first embodiment, signal wires included in the switching circuit DSC and the selection drive circuit SDC are formed of wires in the second wiring layer. That is, the signal wire LL1 is formed of the wire LL1 [603] formed in the second wiring layer 603. The wire LL1[603] is connected to the drive electrode TL(n)[605] and the auxiliary electrode SM[605] via the first switch a02, and further connected to the drive electrode TL(n−2)[605] and the auxiliary electrode SM [605] via the first switch a00. Note that the switching circuit DSC and the selection drive circuit SDC are outside the display panel 2, and thus, the liquid crystal layer 607 is not formed on the insulating layer 606 shown in FIG. 19.

In the first embodiment, wires of the second wiring layer 603 are used as the signal wires LL1, LL2 that connect drive electrodes in order to form a coil. That is, wires of the same wiring layer as the signal lines SL(0) to SL(p) are used as the signal wires LL1, LL2. Also, the drive electrodes and the auxiliary electrode are used as winding wires of coils. Thus, coils can be formed without increasing the number of the wiring layers, so that increase in a piece can be suppressed.

When the signal lines SL(0) to SL(p) are formed, wires parallel to the signal lines SL(0) to SL(p) may be also formed outside the display panel 2, and the wires formed outside the display panel 2 are used as the signal wires LL1, LL2 described above.

Figure 20:
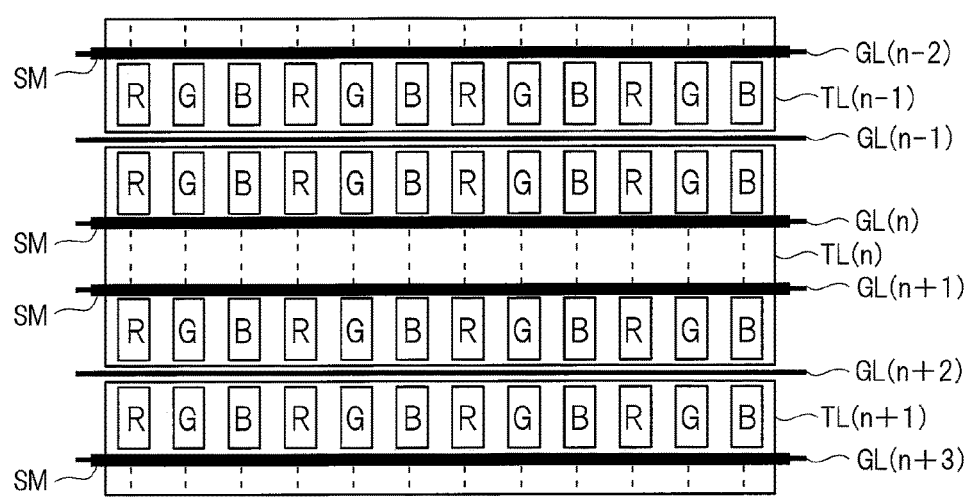
FIG. 20 is a plan view schematically showing the configuration of the liquid crystal display apparatus according to the first embodiment.

FIG. 20 is a plan view specifically showing an area PP1 surrounded by a broken line in FIG. 11. In FIG. 20, reference characters R, G, and B indicate pixels of the three primary colors, and reference characters TL(n−1) to TL(n+1) indicate drive electrodes. Also, a reference character SM indicates an auxiliary electrode and is electrically connected to drive electrodes. Further, in FIG. 20, reference characters GL(n−2) to GL(n+3) indicate scanning lines.

As shown in FIG. 20, a plurality of auxiliary electrodes SM are connected to one drive electrode TL(n). For example, several tens of auxiliary electrodes SM extend in parallel with the drive electrode TL(n) and are connected to the drive electrode TL(n). Accordingly, the resistance of a coil can be reduced when the coil is formed of the drive electrodes and auxiliary electrodes SM.

An example in which wires in the second wiring layer 603 are used as the signal wires LL1, LL2 has been described. However, the present embodiment is not limited to such an example. For example, wires in the first wiring layer 601 may be used as signal wires, or wires in the third wiring layer 605 may be used as signal wires.

Figure 21:
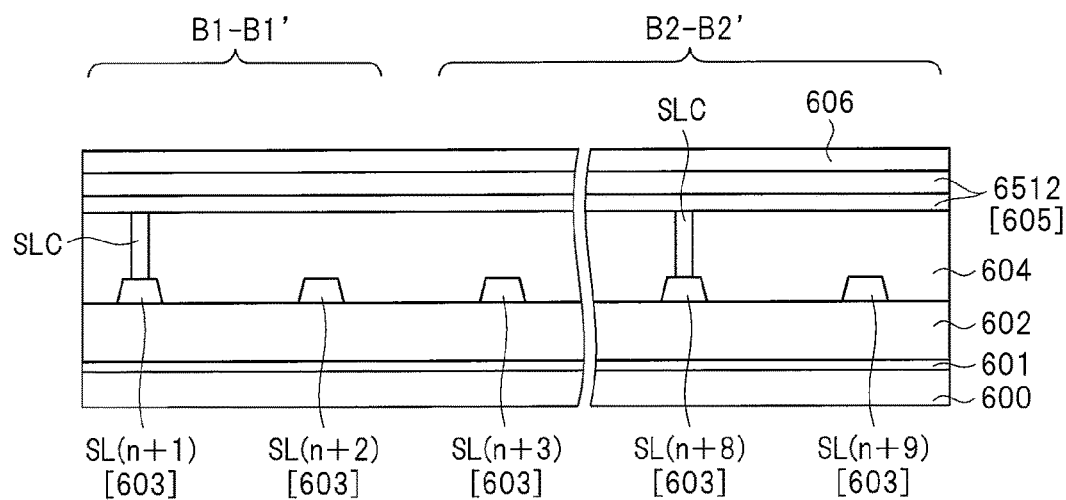
FIG. 21 is a cross-sectional view schematically showing the configuration of the liquid crystal display apparatus according to the first embodiment.

In the first embodiment, the switching adjustment circuits SCX-U, SCX-D are arranged outside the display panel 2 (pixel array LCD). That is, signal wires included in the switching adjustment circuits SCX-U, SCX-D are formed of wires arranged outside the display panel 2. In the description of the example shown in FIGS. 16 and 17, the signal wires 6510 to 6513, 6520 to 6523, and 6530 to 6533 are formed of wires arranged outside the display panel 2. Here, the structure of a signal wire using wires arranged outside the display panel 2 will be described while exemplifying the signal wire 6512 included in the switching adjustment circuit SCX-D. FIG. 21 is a cross-sectional view showing a cross section of B1-B1' and a cross section of B2-B2' in FIG. 16. Note that the structure of the cross section in the display panel 2 is shown in FIG. 9, and thus, the description thereof is omitted.

In FIG. 21, a reference character [603] indicates a wire of a second wiring layer, and a reference character [605] indicates a wire of a third wiring layer. The signal lines SL(0) to SL(p) are formed of wires formed in the second wiring layer. Signal lines formed in the display panel 2 are connected to wires of the second wiring layer in the switching adjustment circuits SCX-U, SCX-D. In FIG. 21, reference characters SL(n+1)[603] to SL(n+3)[603] and SL(n+8)[603] indicate wires of the second wiring layer to which the signal lines SL(n+1) to SL(n+3) and SL(n+8) are connected in the switching adjustment circuit SCX-D. The signal wire 6512 shown in FIG. 16 is formed of the wire 6512[605] formed in the third wiring layer 605. The wire 6512[605] is connected to the wires SL(n+1)[603] and SL(n+8)[603] by an interlayer wire SLC. In this case, the wire 6512[605] includes a wire corresponding to the auxiliary electrode SM and a wire corresponding to the drive electrode. Note that the switching adjustment circuits SCX- U, SCX-D are outside the display panel 2, and thus, the liquid crystal layer 607 is not formed on the insulating layer 606 shown in FIG. 21.

In the first embodiment, wires in the third wiring layer 605 are used as signal wires that connect signal lines in order to form a coil. That is, wires of the same wiring layer as the drive electrode TL and the auxiliary electrode SM are used as the signal wires 6510 to 6513, 6520 to 6523, and 6530 to 6533. Also, signal lines are used as winding wires of coils. Thus, coils can be formed without increasing the number of the wiring layers, so that increase in a price can be suppressed. For example, when the drive electrode TL and the auxiliary electrode are formed in an active area of the display panel 2, wires may also be formed outside the display panel 2 (outside the active area) to use wires formed outside the display panel 2 as the above-described signal wires.

Also, when the drive electrode TL and the auxiliary electrode are formed, wires parallel to the drive electrode TL and the auxiliary electrode may be also formed outside the display panel 2 to use wires formed outside the display panel 2 as the above-described signal wires. In this case, a portion that is not connected to a signal wire may be cut. Wires that are not required because of being cut may be left or be removed.

Figure 22:
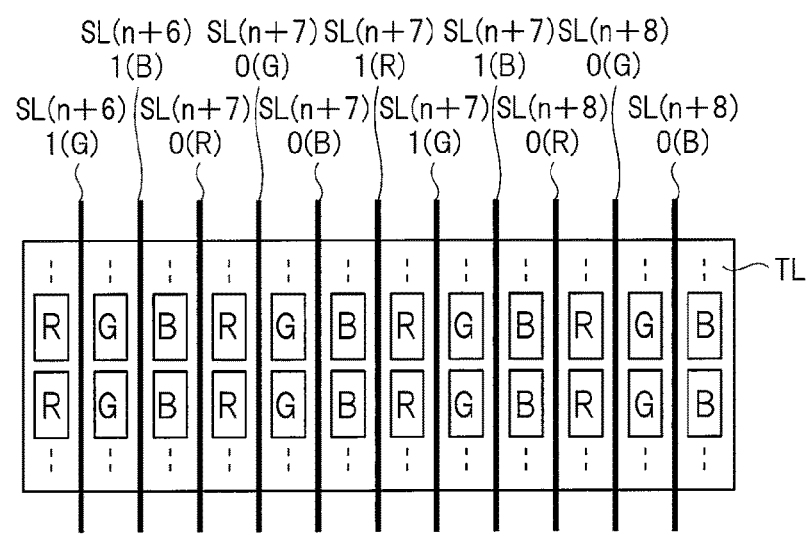
FIG. 22 is a plan view schematically showing the configuration of the liquid crystal display apparatus according to the first embodiment.

FIG. 22 is a plan view specifically showing an area PP2 surrounded by an alternate long and short dash line in FIG. 18 in detail. In FIG. 22, reference characters R, G, and B indicate pixels of the three primary colors, and a reference character TL indicates a drive electrode. Also, reference characters SL(n+6)1(G) to SL(n+8)0(G), SL(n+6)1(B) to SL(n+8)0(B), and SL(n+7)0(R) to SL(n+8)0(R) indicate signal lines.

In the first embodiment, as the signal line SL(n+8) shown in FIG. 8, a plurality of signal lines of the signal lines SL(n+6)1(G) to SL(n+8)0(G), SL(n+6)1(B) to SL(n+8)0(B), and SL(n+7)0(R) to SL(n+8)0(R) shown in FIG. 22 are used. That is, when a coil is formed of signal lines, a plurality of signal lines are connected to each other so as to serve as one signal line and are used as a winding wire of the coil. Accordingly, the resistance of the coil can be reduced. In this case, it is desired to, for example, electrically connect several tens of signal lines to each other to use as a winding wire of a coil.

In FIGS. 15 to 17, a case when the number of windings of a coil formed of signal lines is 2 has been described. However, the present embodiment is not limited to such a case. The number of windings of a coil can be increased or decreased by changing the number of connections of signal lines and signal wires in the switching adjustment circuits SCX-U, SCX-D. Also by changing connections of signal lines and signal wires, any signal line can be used as a winding wire of the coil. Further, by changing connections in the switching adjustment circuits SCX-U, SCX-D, a degree of overlap between the coils close to each other can be changed. That is, coils used in a touch detection period can be adjusted by an adjustment unit.

An example in which wires in the third wiring layer 605 are used as signal wires have been described. However, the present embodiment is not limited to such an example. For example, wires in the first wiring layer may be used as the signal wires 6510 to 6513, 6520 to 6523, and 6530 to 6533. In this case, when the scanning lines GL(0) to GL(p) are formed, wires to be used as the signal wires 6510 to 6513, 6520 to 6523, and 6530 to 6533 are formed. Also in this case, increase in a price can be suppressed.

Second Embodiment

Figure 23:
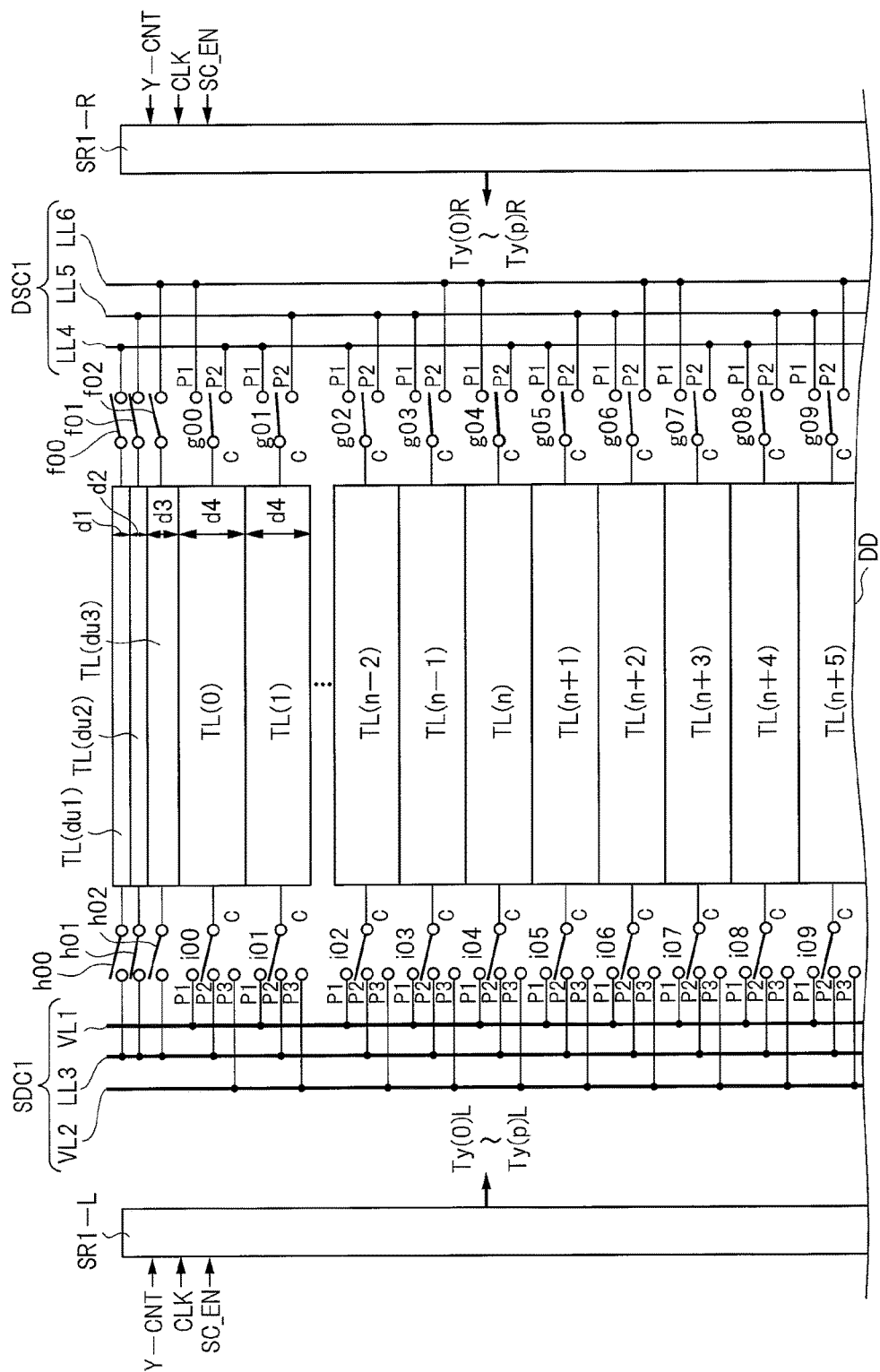
FIG. 23 is a block diagram showing a configuration of a liquid crystal display apparatus according to the second embodiment.
Figure 24:
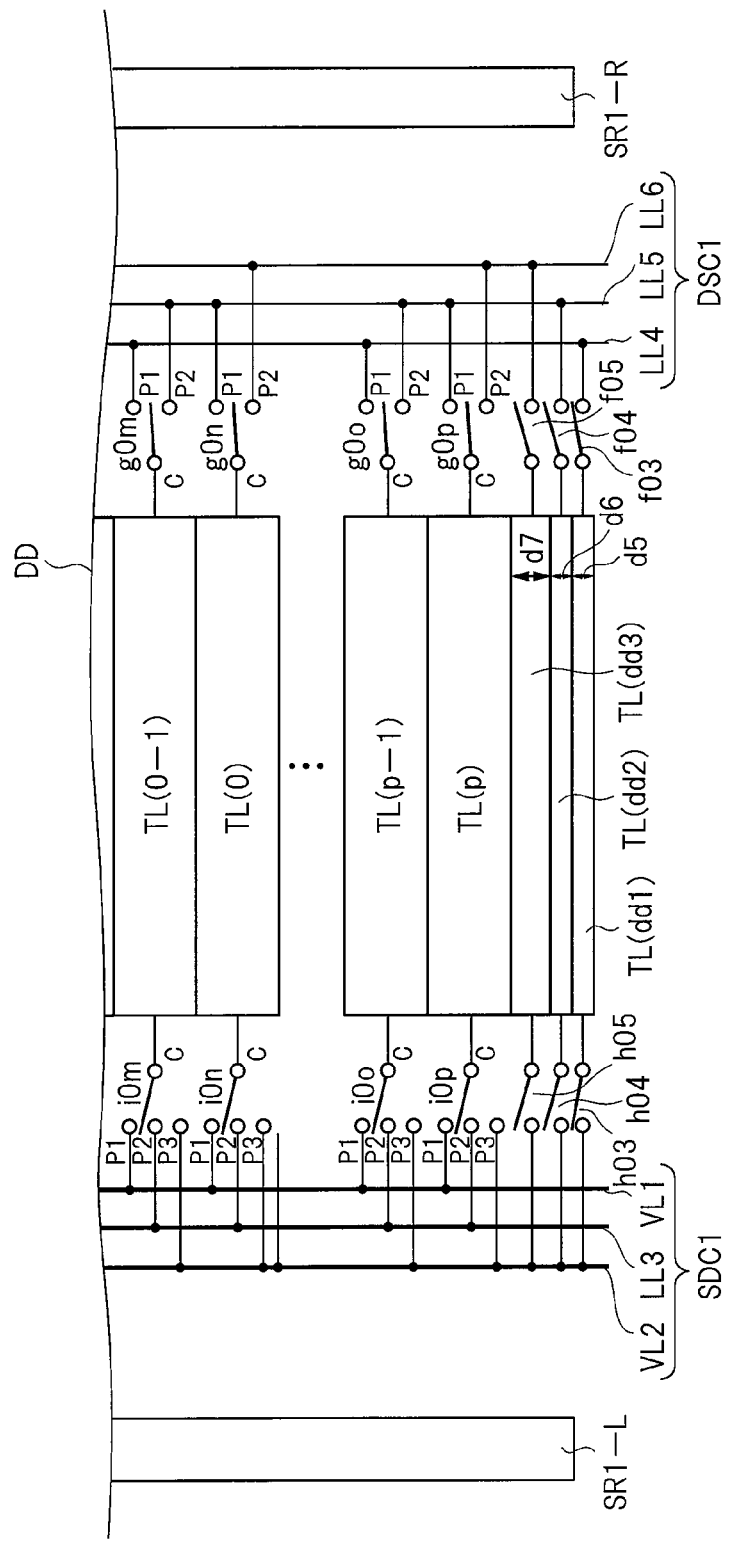
FIG. 24 is a block diagram showing a configuration of a liquid crystal display apparatus according to the second embodiment.

FIGS. 23 and 24 are block diagrams showing the configuration of the liquid crystal display apparatus 1 according to the second embodiment. FIG. 24 continues from FIG. 23. That is, a portion indicated by a reference character DD in FIG. 23 continues to a portion indicated by a reference character DD in FIG. 24. As similar to FIG. 11, FIGS. 23 and 24 show drive electrodes TL(0) to TL(p) (first drive electrodes), a switching circuit DSC1, a selection drive electrode SDC1, and selection control circuits SR1-R, SR1-L. In FIGS. 23 and 24, TL(du1) to TL(du3) and TL(dd1) to TL(dd3) are drive electrodes for magnetic field generation (hereinafter, each of which is also called magnetic-field drive electrode (second drive electrode)) although not specifically limited.

In the first embodiment, two coils each of which is a single-winding wire are formed in the magnetic field generation period TGT, and a magnetic field is generated while two coils are set to be a unit. In the second embodiment, by contrast, three coils each of which is a single-winding wire are formed in the magnetic field generation period TGT, and a magnetic field is generated while three coils are set to be a unit. Also, in the first embodiment, an area where areas of two coils overlap each other is an area corresponding to two drive electrodes. However, in the second embodiment, an area where areas of three coils overlap one another is set as an area corresponding to one drive electrode.

Further, in the scan operation in the first embodiment, coils are shifted by each two coils to be a unit, and the shift amount corresponds to two coils. On the other hand, in the second embodiment, while coils are shifted by each three coils to be a unit, the shift amount corresponds to one coil.

<Drive Electrode for Magnetic Field>

In the second embodiment, the drive electrodes TL(0) to TL(p) are arranged from the side 2-U side toward the side 2-D side of the display panel 2 (pixel array LCD) in this order although not specifically limited. That is, in the active area of the display panel 2, the drive electrodes TL(0) to TL(P) are arranged. In contrast, the drive electrodes for magnetic field TL(du1) to TL(du3) are arranged along the side 2-U of the display panel 2 (pixel array LCD), but are arranged outside the active area of the display panel 2. Similarly, the drive electrodes for magnetic field TL(dd1) to TL(dd3) are arranged along the side 2-D of the display panel 2 (pixel array LCD), but are arranged outside the active area of the display panel 2.

Each of the drive electrodes for magnetic field TL(du1) to TL(du3) is arranged to extend in parallel with the drive electrodes TL(0) to TL(p), and is arranged so as to be distant away from the side 2-U of the display panel 2 in the order of the drive electrodes for magnetic field TL(du3) to TL(du1). Although not specifically limited, a width d1 of the drive electrode for magnetic field TL(du1) is made narrower than a width d2 of the drive electrode for magnetic field TL(du2), and the width d2 of the drive electrode for magnetic field TL(du2) is made narrower than a width d3 of the drive electrode for magnetic field TL(du3). Further, the width d3 of the drive electrode for magnetic field TL(du3) is made narrower than a width d4 of each of the drive electrodes TL(0) to TL(p).

Similarly, each of the drive electrodes for magnetic field TL(dd1) to TL(dd3) is arranged to extend in parallel with the drive electrodes TL(0) to TL(P), and is arranged so as to be distant away from the side 2-D of the display panel 2 in the order of the drive electrodes for magnetic field TL(dd3) to TL(dd1). Although not specifically limited, a width d5 of the drive electrode for magnetic field TL(dd1) is made narrower than a width d6 of the drive electrode for magnetic field TL(dd2), and the width d6 of the drive electrode for magnetic field TL(dd2) is made narrower than a width d7 of the drive electrode for magnetic field TL(dd3). Further, the width d7 of the drive electrode for magnetic field TL(dd3) is made narrower than the width d4 of each of the drive electrodes TL(0) to TL(p).

In the description by associating with the pixel array LCD, each of the drive electrodes for magnetic field TL(du1) to TL(du3) is arranged along a side (corresponding to the side 2-U of the display panel 2) parallel to the row of the pixel array LCD, and each of them is parallel to the row of the pixel array LCD. Also, the drive electrodes for magnetic field TL(du3) to TL(du1) are arranged so as to be distant away from a side (corresponding to the side 2-U) of the pixel array LCD in this order. Similarly, each of the drive electrodes for magnetic field TL(dd1) to TL(dd3) is arranged along a side (corresponding to the side 2-D of the display panel 2) parallel to the row of the pixel array LCD, and each of them is parallel to the row of the pixel array LCD. Also, the drive electrodes for magnetic field TL(dd3) to TL(dd1) are arranged so as to be distant away from a side (corresponding to the side 2-D) of the pixel array LCD in this order.

The drive electrodes for magnetic field TL(du1) to TL(du3) and TL(dd1) to TL(dd3) are formed outside the active area of the display panel 2, and thus, does not function in the display. That is, the display is not affected regardless of either the supply or non-supply of a display drive signal to the drive electrodes for magnetic field TL(du1) to TL(du3) and TL(dd1) to TL(dd3) in the display. The drive electrodes for magnetic field TL(du1) to TL(du3) and TL(dd1) to TL(dd3) are combined with drive electrodes in the magnetic field generation period TGT. That is, in the magnetic field generation period TGT, coils are formed of drive electrodes and drive electrodes for magnetic field close to the side 2-U or the side 2-D of the display panel 2 (pixel array LCD). In this case, electrodes which are arranged outside the display panel 2 and which are combined with drive electrodes in a magnetic field generation period to form a coil can be considered to be drive electrodes for magnetic field.

<The Selection Control Circuits SR1-R, SR1-L>

The selection control circuits SR1-R, SR1-L have a configuration similar to that of the selection control circuits SR-R, SR-L described in the first embodiment. That is, each of the selection control circuits SR1-R, SR1-L has a shift register, and includes a plurality of unit selection circuits corresponding to respective steps of the shift register. The shift register performs a shift operation in synchronization with changes of the clock signal CLK by the setting of the magnetic-field enable signal SC_EN to the high level and the setting of the control signal Y-CNT to the high level so that the operation of touch detection is assigned. By the shift operation, selection signals Ty(0)R to Ty(p)R and Ty(0)L to Ty(p)L that are successively set to the high level are output from the unit selection circuits corresponding to respective steps of the shift register. As similar to the first embodiment, note that the selection control circuit SR1-R and the selection control circuit SR1-L operate in synchronization with each other. That is, for example, when the selection signal Ty(n)R from the selection control circuit SR1-R changes to the high level, the selection signal Ty(n)L from the selection control circuit SR1-L also changes to the high level.

The selection signals Ty(0)R to Ty(p)R and Ty(0)L to Ty(p)L output from the selection control circuits SR1-R, SR1-L are in a one-to-one correspondence with the drive electrodes TL(0) to TL(p). For example, the selection signals Ty(0)R, Ty(0)L correspond to the drive electrode TL(0), the selection signals Ty(n)R, TY(n)L correspond to the drive electrode TL(n), and the selection signals Ty(p)R, Ty(p)L correspond to the drive electrode TL(p). An area where a strong magnetic field is to be generated (corresponding to a drive electrode) is assigned by the selection signals Ty(0)R to Ty(p)R and Ty(0)L to Ty(p)L from the selection control circuits SR1-R, SR1-L. That is, the switching circuit DSC1 and the selection drive circuit SDC1 are controlled so that a strong magnetic field is generated in an area corresponding to drive electrodes corresponding to the selection signals set to the high level. For example, if the selection signal Ty(n) is at the high level, the switching circuit DSC1 and the selection drive circuit SDC1 are controlled so that a strong magnetic field is generated in an area corresponding to the drive electrode TL(n) corresponding to the selection signal Ty(n).

In the second embodiment, the selection signals Ty(0)R to Ty(p)R and Ty(0)L to Ty(p)L output from the selection control circuits R1-R, SR1-L change to the high level in this order although not specifically limited. That is, in touch detection, the selection signals Ty(0)R, Ty(0)L change from the low level to the high level, and then, the selection signals Ty(0)R, Ty(0)L change from the high level to the low level, and the selection signals Ty(1)R, Ty(1)L change from the low level to the high level.

In this manner, the high level successively moves from the selection signals Ty(0)R, Ty(0)L to the selection signals Ty(p)R, Ty(p)L. Accordingly, in touch detection, a magnetic field is successively generated from the side 2-U toward the side 2-D of the display panel 2 (pixel array LCD). That is, in touch detection, a strong magnetic field is generated in an area corresponding to the drive electrode TL(0), and next, a strong magnetic field is generated in an area corresponding to the close drive electrode TL(1). Hereinafter, a strong magnetic field is successively generated in an area corresponding to one drive electrode. Accordingly, the touch on the display panel 2 can be scanned.

<The Switching Circuit DSC1>

The switching circuit DSC1 includes signal wires LL4, LL5, LL6, sixth switches f00 to f05, and seventh switches g00 to g0p. Here, the signal wires LL4, LL5 are signal wires that connect drive electrodes in the magnetic field generation period TGT. In the magnetic field generation period TGT in the second embodiment, the three signal wires are substantially simultaneously formed, and thus, the three signal wires LL4 to LL6 are provided as signal wires that connect drive electrodes.

The sixth switch f00 is connected between the drive electrode for magnetic field TL(du1) and the signal wire LL4, the sixth switch f01 is connected between the drive electrode for magnetic field TL(du2) and the signal wire LL5, and the sixth switch f02 is connected between the drive electrode for magnetic field TL(du3) and the signal wire LL6. Here, the sixth switches f00 to f02 are switch-controlled by the selection signals Ty(0)R to Ty(2)R from the selection control circuit SR1-R.

Also, the sixth switch f03 is connected between the drive electrode for magnetic field TL(dd1) and the signal wire LL4, the sixth switch f04 is connected between the drive electrode for magnetic field TL(dd2) and the signal wire LL5, and the sixth switch f05 is connected between the drive electrode for magnetic field TL(dd3) and the signal wire LL6. Here, the sixth switches f03 to f05 are switch-controlled by the selection signals Ty(p−2)R to Ty(p)R from the selection control circuit SR1-R.

As different from the sixth switches f00 to f05, each of the seventh switches g00 to g0p includes the common terminal c, the first terminal p1, the second terminal p2, and the third terminal. To the seventh switches g00 to g0p, the selection signals Ty(0)R to Ty(p)R are supplied from the selection control circuit SR1-R. Each of the seventh switches g00 to g0p connects the common terminal c to the first terminal p1, the second terminal p2, or the third terminal in accordance with the supplied selection signal. The third terminal of each of the seventh switches g00 to g0p is connected to no signal wire and is in a floating state. Thus, as similar to the first switches a00 to a09 in FIG. 11, the third terminal is omitted in FIGS. 23 and 24.

The common terminals c of the seventh switches g00 to g0p are connected to ends of the drive electrodes TL(0) to TL(p), respectively. For example, the seventh switch g00 corresponds to the drive electrode TL(0), and the common terminal c of the seventh switch g00 is connected to an end of the drive electrode TL(0). The seventh switch g04 corresponds to the drive electrode TL(n), and the common terminal c of the seventh switch g04 is connected to an end of the drive electrode TL(n). In this manner, the common terminals of the seventh switches are connected to ends of the corresponding drive electrode, respectively.

The first terminal p1 of each of the seventh switches g01, g02, g05, g08, g0m, goo is connected to the signal wire LL4, the first terminal p1 of each of the seventh switches g03, g06, g09, g0n, g0p is connected to the signal wire LL5, and the first terminal p1 of each of the seventh switches g00, g04, g07 is connected to the signal wire LL6.

Also, the second terminal p2 of each of the seventh switches g00, g04, g07 is connected to the signal wire LL4, the second terminal p2 of each of the seventh switches g01, g02, g05, g08, g0m, goo is connected to the signal wire LL5, and the second terminal p2 of each of the seventh switches g03, g06, g09, g0n, g0p is connected to the signal wire LL6.

In the magnetic field generation period TGT, the sixth switches f00 to f05 and the seventh switches g00 to g0p are controlled as follows by the selection signals Ty(0)R to Ty(p)R output from the selection control circuit SR1-R. That is, when a selection signal changes to the high level, the common terminal c in three seventh switches connected to three respective drive electrodes arranged closer to the side 2-U side than the drive electrode corresponding to the selection signal at the high level is connected to the second terminal p2. At this time, the common terminal c in three seventh switches connected to three respective drive electrodes arranged closer to the side 2-D side than the drive electrode corresponding to the selection signal at the high level is connected to the first terminal p1. At this time, the common terminal c in the seventh switches except for these six seventh switches is connected to the third terminal. In addition, the sixth switches f00 to f05 are turned off.

The following is the explanation while exemplifying a case when the selection signal Ty(n+1)R output from the selection control circuit SR1-R is at the high level. Because the selection signal Ty(n+1) is changed to the high level, the common terminal c in the seventh switches g04, g03, g02 connected to the drive electrodes TL(n), TL(n−1), TL(n−2) arranged closer to the side 2-U side than the drive electrode TL(n+1) corresponding to the selection signal Ty(n+1) is connected to the second terminal p2. Also, the common terminal c in the seventh switches g06, g07, g08 connected to the respective drive electrodes TL(n+2), TL(n+3), TL(n+4) arranged closer to the side 2-D side than the drive electrode TL(n+1) is connected to the first terminal p1. At this time, the common terminal c in the seventh switches (g05 and g09 to g0p in FIGS. 23 and 24) except for the seventh switches g02 to g04 and g06 to g08 is connected to the third terminal. At this time, the seventh switches f00 to f05 are turned off.

Accordingly, an end of the drive electrode TL(n−2) is connected to the signal wire LL5 via the seventh switch g02, an end of the drive electrode TL(n−1) is connected to the signal wire LL6 via the seventh switch g03, and an end of the drive electrode TL(n) is connected to the signal wire LL4 via the seventh switch g04. Also, an end of the drive electrode TL(n+2) arranged on the opposite side of the drive electrodes TL(n) to TL(n−2) across the drive electrode TL(n+1) is connected to the signal wire LL5 via the seventh switch g06, an end of the drive electrode TL(n+3) is connected to the signal wire LL6 via the seventh switch g07, and an end of the drive electrode TL(n+4) is connected to the signal wire LL4 via the seventh switch g08.

As a result, the drive electrode TL(n−2) and the drive electrode TL(n+2) are connected in series via the signal wire LL5, the drive electrode TL(n−1) and the drive electrode TL(n+3) are connected in series via the signal wire LL6, and the drive electrode TL(n) and the drive electrode TL(n+4) are connected in series via the signal wire LL4. Accordingly, three coils each of which is a single-winding wire are formed of drive electrodes as winding wires. In this case, an area where the three coils overlap with one another is an area corresponding to the drive electrode TL(n+1) corresponding to the selection signal Ty(n+1) at the high level.

The sixth switches and the seventh switches are controlled as described above when any of the selection switches Ty(3)R to Ty(p−3)R is set to the high level by the selection control circuit SR1-R, so that three coils overlapping with one another are formed in an area corresponding to the drive electrode corresponding to the high-level selection signal.

Among the selection signals Ty(0) to Ty(p) output from the selection control circuit SR1-R, if a selection signal corresponding to a drive electrode close to the side 2-U or the side 2-D of the display panel 2 changes to the high level, a drive electrode that forms a coil does not exist in the active area of the display panel 2. For example, when the selection signal Ty(0)R changes to the high level, the drive electrode corresponding to the selection signal Ty(0)R is the drive electrode TL(0). For the drive electrode TL(0), while the drive electrodes TL(1) to TL(3) exist on the side 2-D side, no drive electrode exists on the side 2-U side. That is, it is difficult to form a coil having an area corresponding to the drive electrode TL(0) inside. Therefore, in the magnetic field generation period TGT, it is difficult to generate a strong magnetic field in an area corresponding to the drive electrode TL(0).

If the selection signal Ty(1)R or the selection signal Ty(2)R changes to the high level, the number of coils overlapping with each other in an area corresponding to the drive electrode TL(1) or TL(2) decreases. Thus, the magnetic field generated in the magnetic field generation period TGT weakens.

On the other hand, in the second embodiment, a strong magnetic field can be generated also in an area close to the side 2-U or the side 2-D of the display panel 2 by providing a drive electrode for magnetic field outside the active area of the display panel 2.

That is, the sixth switch f00 is controlled so as to be turned on when the selection signal Ty(0)R changes to the high level, and the sixth switch f01 is controlled so as to be turned on when the selection signal Ty(0)R or Ty(1)R changes to the high level. Further, the sixth switch f02 is controlled so as to be turned on when any one of the selection signals Ty(0)R to Ty(2)R changes to the high level. As similar to the selection signal Ty(n−1)R described above, the common terminal c in the drive electrodes TL(1) to TL(3) is controlled to be connected to the first terminal p1 when any one of the selection signals Ty(0)R to Ty(2)R changes to the high level.

Accordingly, when the selection signal Ty(0) is at the high level in the magnetic field generation period TGT, the drive electrode for magnetic field TL(du1) is connected to the signal wire LL4 via the sixth switch f00, the drive electrode for magnetic field TL(du2) is connected to the signal wire LL5 via the sixth switch f01, and the drive electrode for magnetic field TL(du3) is connected to the signal wire LL6 via the sixth switch f02. At this time, an end of the drive electrode TL(1) is connected to the signal wire LL4 via the seventh switch g01. Although not shown in FIG. 23, the drive electrode TL(2) is connected to the signal wire LL5 via a seventh switch, and the drive electrode TL(3) is connected to the signal wire LL6 via a seventh switch. That is, three coils are formed by combining drive electrodes and drive electrodes for magnetic field. Accordingly, three coils whose areas overlap with one another can be formed in an area corresponding to the drive electrode TL(0) in the magnetic field generation period TGT, so that a strong magnetic field can be generated in the area corresponding to the drive electrode TL(0).

When the selection signal Ty(1)R is at the high level, one coil is formed of the drive electrode TL(2) not shown and the drive electrode for magnetic field TL(du2), one coil is formed of the drive electrode TL(3) not shown and the drive electrode for magnetic field TL(du3), and one coil is formed of the drive electrode TL(0) and the drive electrode TL(4) not shown. Further, when the selection signal Ty(2)R is at the high level, one coil is formed of the drive electrode TL(3) not shown and the drive electrode for magnetic field TL(du3), one coil is formed of the drive electrode TL(4) not shown and the drive electrode TL(0), and one coil is formed of the drive electrode TL(1) and the drive electrode TL(5) not shown.

Accordingly, the touch detection can be performed even if an area close to the side 2-U of the display panel 2 is assigned as an area of the touch detection.

While widths of the drive electrodes for magnetic fields TL(du1) to TL(du3) are different from one another in the second embodiment, they may be the same as one another. Alternatively, the drive electrodes for magnetic fields TL(du1) to TL(du3) may be made narrower in width in this order. The drive electrodes for magnetic field do not affect the display. Therefore, in order to suppress the widening of the perimeter (frame) of the display panel 2, the widths of the drive electrodes for magnetic fields TL(du1) to TL(du3) are desirably narrower than the width d4 of the drive electrode TL.

As shown in FIG. 24, the drive electrodes for magnetic fields TL(dd1) to TL(dd3) are arranged outside the active area of the display panel 2 along the side 2-D of the display panel 2. The drive electrodes for magnetic fields TL(dd1) to TL(dd3) and the sixth switches f03 to f05 operate as similar to the drive electrodes for magnetic fields TL(du1) to TL(du3) and the sixth switches f00 to f02.

Thus, although a detailed description is omitted, when the selection signal Ty(p)R changes to the high level, a coil is formed of the drive electrode for magnetic field TL(dd1) and the drive electrode TL(p−1), a coil is formed of the drive electrode for magnetic field TL(dd2) and the drive electrode TL(p−2) not shown, and a coil is formed of the drive electrode for magnetic field TL(dd3) and the drive electrode TL(p−3) not shown. Also, when the selection signal Ty(p−1)R changes to the high level, a coil is formed of the drive electrode for magnetic field TL(dd2) and the drive electrode TL(p−2) not shown, a coil is formed of the drive electrode for magnetic field TL(dd3) and the drive electrode TL(p−3) not shown, and a coil is formed of the drive electrode TL(p) and the drive electrode TL(p−4) not shown. Further, when the selection signal Ty(p−2)R changes to the high level, a coil is formed of the drive electrode for magnetic field TL(dd3) and the drive electrode TL(p−3), a coil is formed of the drive electrode TL(p) and the drive electrode TL(p−4) not shown, and a coil is formed of the drive electrode TL(p−1) and the drive electrode TL(p−5).

Accordingly, the touch detection can be performed even if an area close to the side 2-D of the display panel 2 is assigned as an area of the touch detection.

<The Selection Drive Circuit SDC1>

The selection drive circuit SDC1 includes the voltage wire VL1, the voltage wire VL2, the signal wire LL3, eighth switches h00 to h05, and ninth switches i00 to i0p. As similar to the first embodiment, the display drive signal VCOMDC is supplied to the voltage wire VL1 in display, and, for example, the ground voltage Vss is supplied to the voltage wire VL2 in the magnetic field generation period TGT. Also, the coil clock signal CCLK is supplied to the signal wire LL3 in the magnetic field generation period TGT.

The eighth switch h00 is connected between the signal wire LL3 and an end of the drive electrode for magnetic field TL(du1), the eighth switch h01 is connected between the signal wire LL3 and an end of the drive electrode for magnetic field TL(du2), and the eighth switch h02 is connected between the signal wire LL3 and an end of the drive electrode for magnetic field TL(du3). Also, the eighth switch h03 is connected between the voltage wire VL2 and an end of the drive electrode for magnetic field TL(dd1), the eighth switch h04 is connected between the voltage wire VL2 and an end of the drive electrode for magnetic field TL(dd2), and the eighth switch h05 is connected between the voltage wire VL2 and an end of the drive electrode for magnetic field TL(dd3).

Each of these eighth switches h00 to h05 is controlled by the selection signals Ty(0)L to Ty(2)L and Ty(p−2)L to Ty(p)L from the selection control circuit SR1-L. That is, the eighth switches h00 to h05 are turned on or turned off by the selection signals Ty(0)L to Ty(2)L and Ty(p−2)L to Ty(p)L.

Each of the ninth switches i00 to i0p includes the common terminal c connected to an end of the corresponding drive electrode, the first terminal p1 connected to the voltage wire VL1, the second terminal p2 connected to the signal wire LL3, the third terminal p3 connected to the voltage wire VL2, and the fourth terminal. The fourth terminal of each of the ninth switches i00 to i0p is connected to no signal wire and is in a floating state. Thus, as similar to the second switches b00 to b09 shown in FIG. 11, the fourth terminal is omitted in FIGS. 23 and 24.

These ninth switches i00 to i0p are also controlled by the selection signals Ty(0)L to Ty(p)L from the selection control circuit SR1-L. However, as different from the eighth switches h00 to h05, the common terminal c is connected to any one of the first terminal p1, the second terminal p2, the third terminal p3, and the fourth terminal in accordance with the supplied selection signal.

As similar to each of the selection signals Ty(0)R to Ty(p)R output from the selection circuit SR1-R, each of the selection signals Ty(0)L to Ty(p)L output from the selection control circuit SR1-L is in a one-to-one correspondence with the drive electrodes TL(0) to TL(p). When a selection signal output from the selection control circuit SR1-L is at the high level, the ninth switches i00 to i0p are controlled so that a magnetic-field drive signal and the ground voltage Vss are supplied to three coils overlapping with one another in an area corresponding to the drive electrode corresponding to the high-level selection signal.

That is, when a selection signal changes to the high level, in three ninth switches connected to three respective drive electrodes arranged closer to the side 2-U side than the drive electrode corresponding to the selection signal, the common terminal c is controlled to be connected to the second terminal p2. At this time, in three ninth switches connected to three respective drive electrodes arranged closer to the side 2-D side than the drive electrode corresponding to the selection signal, the common terminal c is controlled to be connected to the third terminal p3. Also at this time, in the ninth switches except for these six ninth switches, the common terminal c is connected to the fourth terminal. Also, the eighth switches h00 to h05 are turned off.

As similar to the selection control circuit SR1-R, the following is the explanation while exemplifying a case when the selection signal Ty(n+1)L output from the selection control circuit SR1-L is at the high level. When the selection signal Ty(n+1)L is changed to the high level, in the ninth switches i04, i03, i02 connected to the respective drive electrodes TL(n), TL(n−1), TL(n−2) arranged closer to the side 2-U side than the drive electrode TL(n+1) corresponding to the selection signal Ty(n+1)L, the common terminal c is connected to the second terminal p2. Also, in the ninth switches i06, i07, i08 connected to the respective drive electrodes TL(n+2), TL(n+3), TL(n+4) arranged closer to the side 2-D side than the drive electrode TL(n+1), the common terminal c is connected to the third terminal p3. At this time, in the ninth switches (i05 and i09 to i0p in FIGS. 23 and 24) except for the ninth switches i02 to i04 and i06 to i08, the common terminal c is connected to the fourth terminal. At this time, the eighth switches h00 to h05 are turned off.

Accordingly, an end of the drive electrode TL(n−2) is connected to the signal wire LL3 via the ninth switch i02, an end of the drive electrode TL(n−1) is connected to the signal wire LL3 via the ninth switch i03, and an end of the drive electrode TL(n) is connected to the signal wire LL3 via the ninth switch i04. Also, an end of the drive electrode TL(n+2) arranged on the opposite side of the drive electrodes TL(n) to TL(n−2) across the drive electrode TL(n+1) is connected to the voltage wire VL2 via the ninth switch i06, an end of the drive electrode TL(n+3) is connected to the voltage wire VL2 via the ninth switch i07, and an end of the drive electrode TL(n+4) is connected to the voltage wire VL2 via the ninth switch i08.

At this time, as described above, by the switching circuit DSC1, the drive electrode TL(n−2) and the drive electrode TL(n+2) are connected in series via the signal wire LL5, the drive electrode TL(n−1) and the drive electrode TL(n+3) are connected in series via the signal wire LL6, and the drive electrode TL(n) and the drive electrode TL(n+4) are connected in series via the signal wire LL4. That is, three coils each of which is a single-winding wire are formed of drive electrodes as winding wires.

The ground voltage Vss of the voltage wire VL2 is supplied to an end of each of the drive electrodes TL(n+2), TL(n+3), TL(n+4) via the ninth switches i06 to i08. Also, the coil clock signal CCLK of the signal wire LL3 is supplied to an end of each of the drive electrodes TL(n−2), TL(n−1), TL(n) via the ninth switches i02 to i04 in parallel in terms of time.

As a result, a magnetic-field drive signal is supplied to the three coils whose areas overlap with one another in an area corresponding to the drive electrode TL(n+1) substantially at the same time, so that a strong magnetic field is generated in the area corresponding to the drive electrode TL(n+1).

The eighth switch h00 is controlled to be turned on when the selection signal Ty(0)L changes to the high level, and the eighth switch h01 is controlled to be turned on when either one of the selection signals Ty(0)L and Ty(1)L changes to the high level. Further, the eighth switch h02 is controlled to be turned on when any one of the selection signals Ty(0)L to Ty(2)L changes to the high level. On the other hand, in each of the ninth switches i01 to i03, the common terminal c is controlled to be connected to the third terminal p3 when the selection signals Ty(0)L to Ty(2)L are set to the high level as similar to the selection signal Ty(n+1)L described above.

Accordingly, when the selection signal Ty(0)L is at the high level, the drive electrode for magnetic field TL(du1) is connected to the signal wire LL3 via the eighth switch h00, the drive electrode for magnetic field TL(du2) is connected to the signal wire LL3 via the eighth switch h01, and the drive electrode for magnetic field TL(du3) is connected to the signal wire LL3 via the eighth switch h02. At this time, an end of the drive electrode TL(1) is connected to the voltage wire VL2 via the ninth switch i01. Although not shown in FIG. 23, the drive electrode TL(2) is connected to the voltage wire VL2 via the ninth switch i02 and the drive electrode TL(3) is connected to the voltage wire VL2 via the ninth switch i03. Accordingly, the magnetic-field drive signal and the ground voltage Vss are supplied to each of three coils formed by combining the drive electrodes TL(1) to TL(3) and the drive electrodes for magnetic field TL(du1) to TL(du3) substantially at the same time. As a result, in the magnetic field generation period TGT, three coils whose areas overlap with one another can be formed in an area corresponding to the drive electrode TL(0), so that a strong magnetic field can be generated in the area corresponding to the drive electrode TL(0).

Similarly, when the selection signal Ty(1)L corresponding to the drive electrode TL(1) changes to the high level, a magnetic-field drive signal and the ground voltage Vss are supplied to three coils formed by combining the drive electrodes for magnetic field TL(du2), TL(du3), the drive electrode TL(0), and the drive electrodes TL(2) to TL(4) not shown. In this case, the eighth switches h01, h02 are turned on, the common terminal c of the ninth switch i00 is connected to the second terminal p2, and the common terminal c of the ninth switches i01, i02, i03 is connected to the third terminal p3. Also, when the selection signal Ty(2)L corresponding to the drive electrode TL(2) changes to the high level, a magnetic-field drive signal and the ground voltage Vss are supplied to three coils formed by combining the drive electrode for magnetic field TL(du3), the drive electrode TL(0), TL(1), and a drive electrode not shown.

A case when the drive electrodes TL(p), TL(p−1), TL(p−2) arranged on the side 2-D side of the display panel 2 are assigned as an area of the touch detection is similar. That is, when the selection signal Ty(p)L corresponding to the drive electrode TL(p) changes to the high level, a magnetic-field drive signal and the ground voltage Vss are supplied to three coils formed by combining the drive electrodes for magnetic field TL(dd1) to TL(dd3), the drive electrode TL(p−1), and the drive electrodes TL(p−2), TL(p−3) not shown. In this case, the eighth switches h03 to h05 are turned on, and the common terminal c in a ninth switch (a reference character i0o is exemplified in FIG. 24) connected to each of the drive electrodes TL(p−1) to TL(p−3) is connected to the second terminal p2.

Also, when the selection signal Ty(p−1)L corresponding to the drive electrode TL(p−1) changes to the high level, a magnetic-field drive signal and the ground voltage Vss are supplied to three coils formed by combining the drive electrodes for magnetic field TL(dd2), TL(dd3), the drive electrode TL(p), and the drive electrodes TL(p−2) to TL(p−4) not shown. In this case, the eighth switches h04, h05 are turned on, and the common terminal c in the ninth switch i0p and ninth switches connected to the drive electrodes TL(p−2), TL(p−3) is connected to the second terminal p2. Further, when the selection signal Ty(p−2)L corresponding to the drive electrode TL(p−2) changes to the high level, a magnetic-field drive signal and the ground voltage Vss are supplied to three coils formed by combining the drive electrode for magnetic field TL(dd3), the drive electrodes TL(p), TL(p−1), and the drive electrodes TL(p−3) to TL(p−5) not shown.

Thus, the eighth switches h00 to h05 and the ninth switches i00 to i0p are controlled as described above by the state in which the corresponding selection signals Ty(0)L to Ty(p)L are changed to the high level by the selection control circuit SR1-L, and a magnetic-field drive signal and the ground voltage Vss are supplied substantially at the same time to three coils overlapping with one another in an area corresponding to the drive electrode corresponding to the high-level selection signal.

When, for example, the magnetic-field enable signal SC_EN is at the low level, the selection control circuit SR1-L performs such control that the common terminals c of each of the ninth switches i00 to i0p is connected to the first terminal p1. In the display period, the magnetic-field enable signal SC_EN is set to the low level. Thus, in the display period, the ninth switches i00 to i0p connect the respective drive electrodes TL(0) to TL(p) to the voltage wire VL1. In the display period, the display drive signal VCOMDC is supplied to the voltage wire VL1, and thus, a display drive signal is supplied from the selection drive circuit SDC1 to the respective drive electrodes TL(0) to TL(p) in the display period.

The common terminal c of each of the seventh switches g00 to g0p may be connected to a fourth terminal when the voltage wire VL1 is also provided to the switching circuit DSC1, when the fourth terminal connected to the voltage wire VL1 is provided to each of the seventh switches g00 to g0p, and when the magnetic-field enable signal SC_EN is at the low level. In this manner, a display drive signal can also be supplied from the switching circuit DSC1 to the drive electrodes TL(0) to TL(P) in the display period. That is, in the display period, a display drive signal can be supplied from both ends of the drive electrodes TL(0) to TL(p).

<Operation of Touch Detection>

Next, the operation of touch detection in the liquid crystal display apparatus 1 according to the second embodiment will be described with reference to FIGS. 25 to 28. Each of FIGS. 25 to 28 shows a state in which the sixth switches f00 to f05, the seventh switches g00 to g0p, the eighth switches h00 to h05, and the ninth switches i00 to i0p are controlled by the selection control circuits SR1-R, SR1-L shown in FIGS. 23 and 24 in the magnetic field generation period TGT. In FIGS. 25 to 28, the eighth switches h00 to h05 and the ninth switches i00 to i0p are omitted in order to avoid the complexity of the drawings, and drive currents supplied by connecting the common terminal c in the ninth switch to the second terminal p2 or the third terminal p3 are shown as reference characters I1 to I4. In the magnetic field generation period TGT, the drive current flows by the supply of the magnetic-field drive signal to the coil, and thus, the reference characters I1 to I4 can also be considered to show magnetic-field drive signals.

Drive electrodes except for drive electrodes to which the drive currents (magnetic-field drive signals) I1 to I4 are supplied are in a floating state. That is, the sixth switches and the eighth switches connected to drive electrodes to which the magnetic-field drive signals I1 to I4 are not supplied are turned off. The common terminal c in the seventh switches connected to drive electrodes to which the magnetic-field drive signals I1 to I4 are not supplied is connected to the third terminal p3, and the common terminal c in the ninth switch is connected to the fourth terminal.

Here is the explanation as an example for a case when a strong magnetic field is successively generated from an area corresponding to the drive electrode TL(n+1) to an area corresponding to the drive electrode TL(n+4) by a scan operation. A case when a strong magnetic field is generated in other areas is also similar. The operation to generate a strong magnetic field by combining the drive electrodes for magnetic field TL(du1) to TL(du3) and TL(dd1) to TL(dd3) and drive electrodes has been described above, and thus, the description thereof is omitted here.

The selection control circuits SR1-R, SR1-L successively set selection signals to the high level in the order of the selection signals Ty(0)R, Ty(0)L to the selection signals Ty(p)R, Ty(p)L from the side 2-U toward the side 2-D of the display panel 2. In exemplifying the FIGS. 25 to 28, the selection control circuits SR1-R, SR1-L set the selection signals Ty(n+1)R, Ty(n+1)L to the high level in touch detection in the magnetic field generation period TGT, and set the selection signals Ty(n+2)R, Ty(n+2)L to the high level in the next magnetic field generation period TGT. In the subsequent magnetic field generation period TGT, the selection control circuits SR1-R, SR1-L set the selection signals Ty(n+3)R, Ty(n+3)L to the high level. In the still subsequent magnetic field generation period TGT, they set the selection signals Ty(n+4)R, Ty(n+4)L to the high level. In any of the magnetic field generation periods TGT, selection signals except for the selection signals set to the high level are set to the low level.

Figure 25:
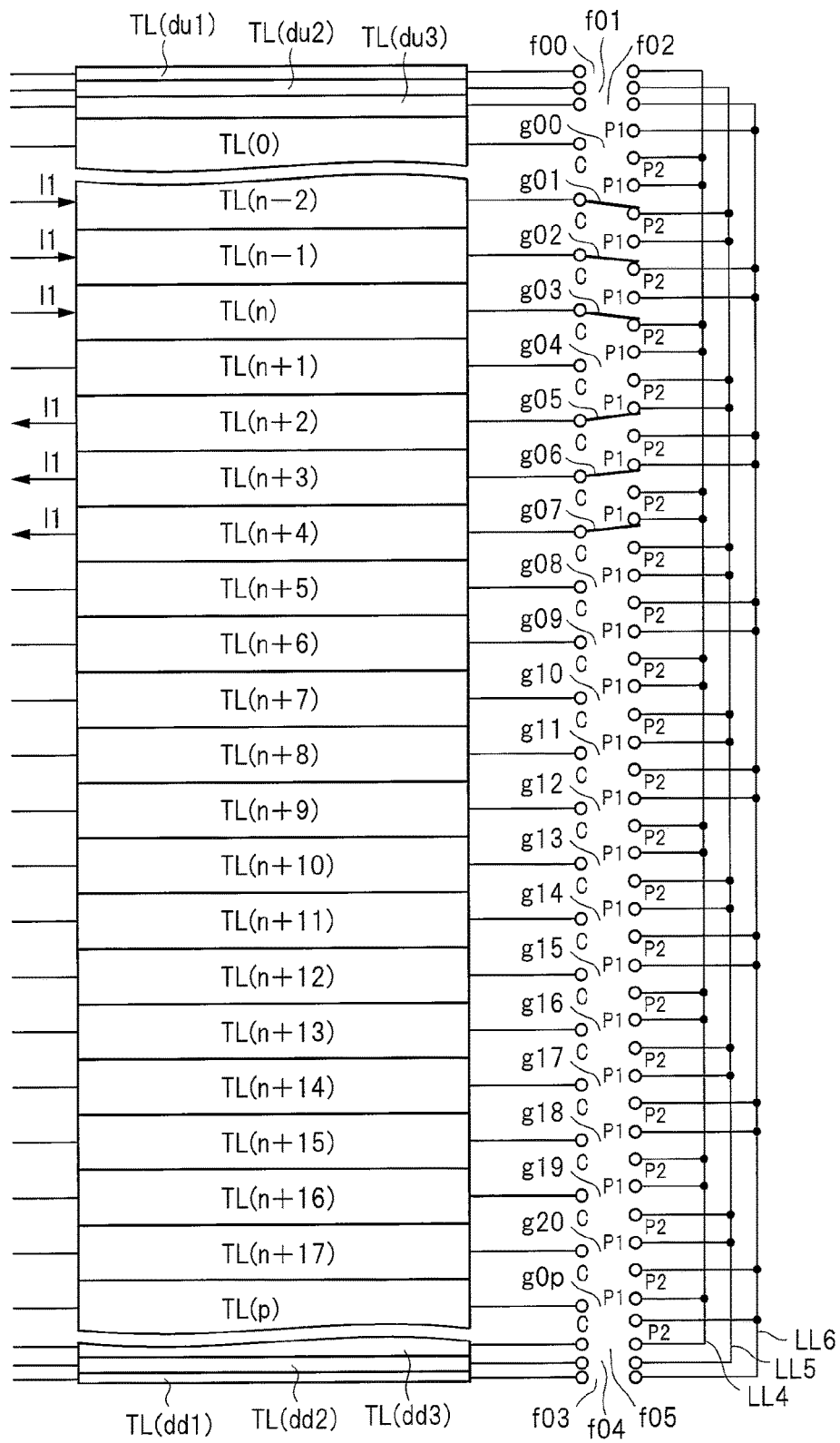
FIG. 25 is a block diagram showing an operation of touch detection of the liquid crystal display apparatus according to the second embodiment.
Figure 26:
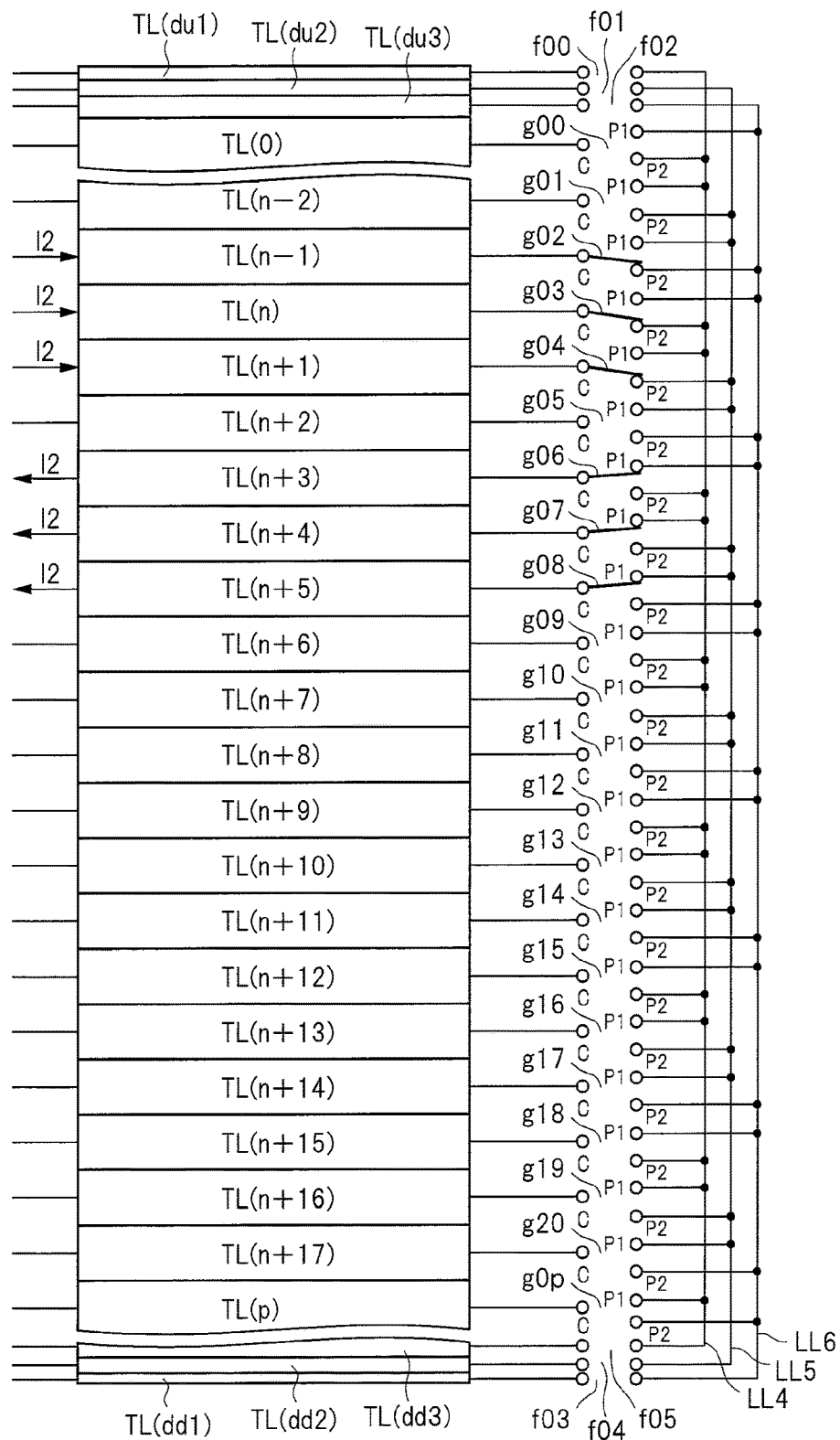
FIG. 26 is a block diagram showing an operation of touch detection of the liquid crystal display apparatus according to the second embodiment.
Figure 27:
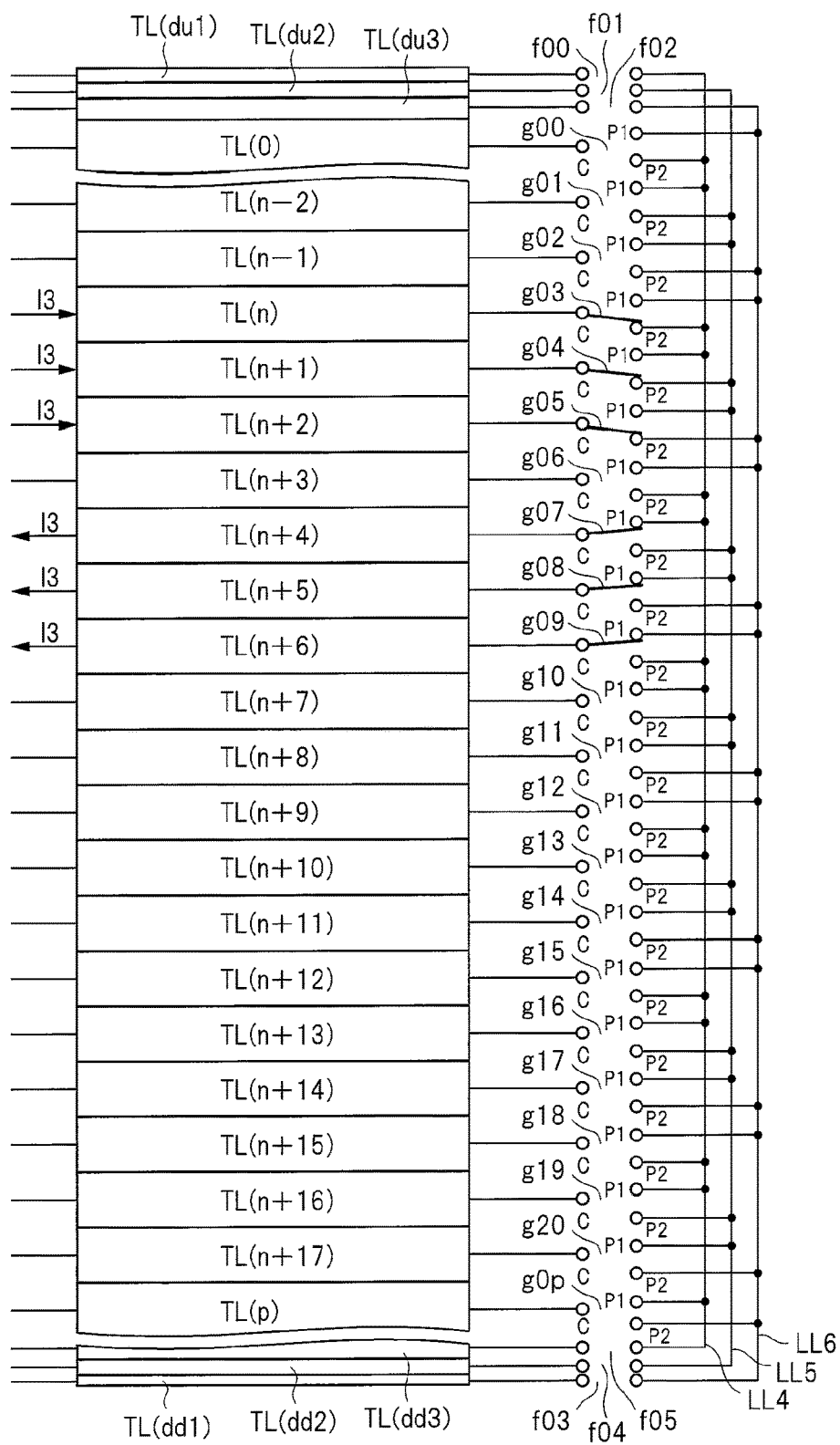
FIG. 27 is a block diagram showing an operation of touch detection of the liquid crystal display apparatus according to the second embodiment.
Figure 28:
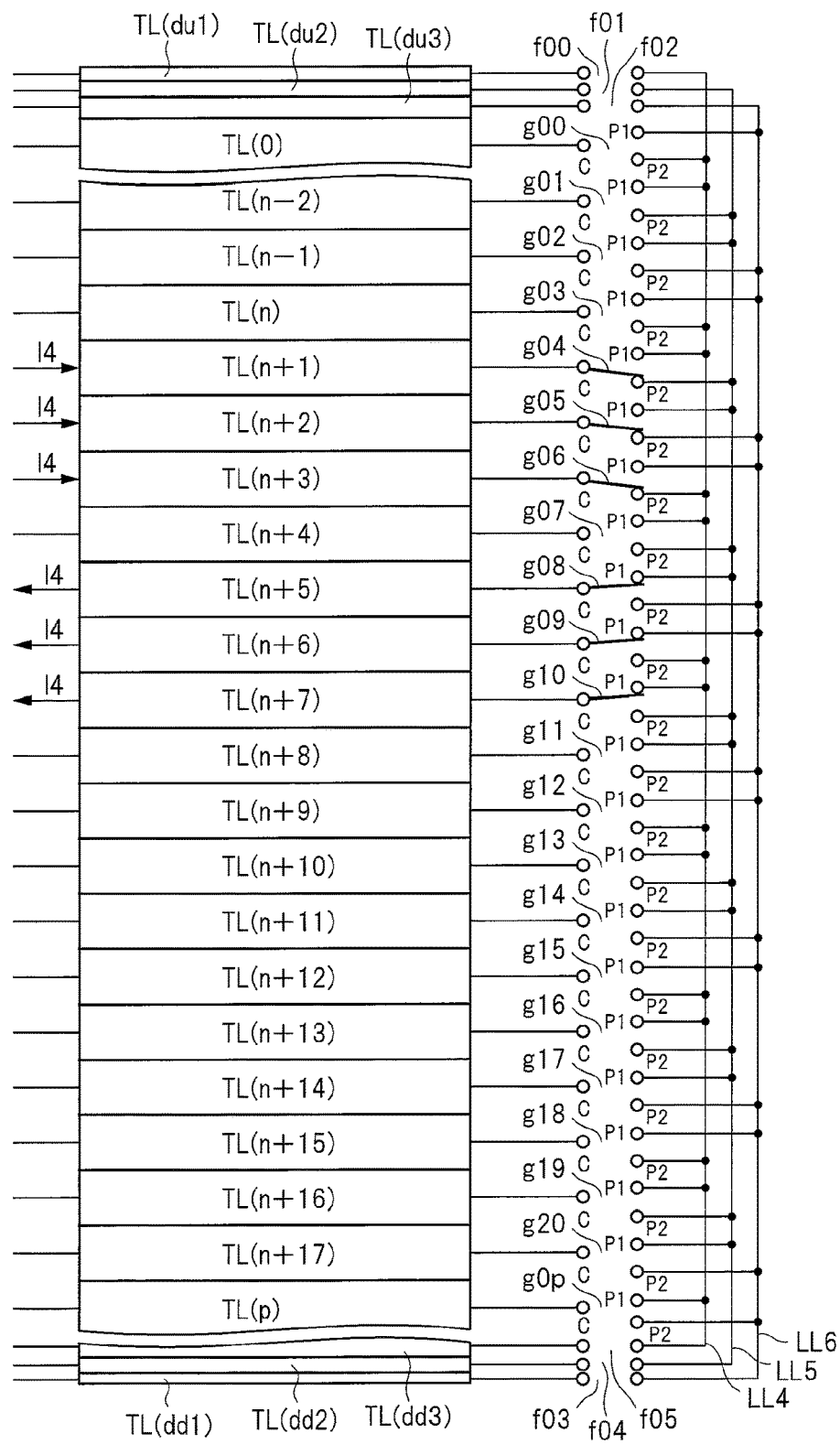
FIG. 28 is a block diagram showing an operation of touch detection of the liquid crystal display apparatus according to the second embodiment.

FIG. 25 shows a state in which the selection signals Ty(n+1)R, Ty(n+1)L are at the high level, and FIG. 26 shows a state in which the selection signals Ty(n+2)R, Ty(n+2)L are at the high level. Similarly, FIG. 27 shows a state in which the selection signals Ty(n+3)R, Ty(n+3)L are at the high level, and FIG. 28 shows a state in which the selection signals Ty(n+4)R, Ty(n+4)L are at the high level.

As described with reference to FIGS. 23 and 24, by the state in which the selection signal Ty(n+1)R is at the high level, the common terminal c in each of the seventh switches g02 to g04 is connected to the second terminal p2, and the common terminal c in each of the seventh switches g06 to g08 is connected to the first terminal p1. Accordingly, the drive electrodes TL(n−2), TL(n+2) are connected to the signal wire LL5 via the seventh switches g02, g06, the drive electrodes TL(n−1), TL(n+3) are connected to the signal wire LL6 via the seventh switches g03, g07, and the drive electrodes TL(n), TL(n+4) are connected to the signal wire LL4 via the seventh switches g03, g07. As a result, the coil CY(n) having the drive electrodes TL(n−2), TL(n+2) as winding wires is formed, the coil CY(n+1) having the drive electrodes TL(n−1), TL(n+3) as winding wires is formed, and the coil CY(n+2) having the drive electrodes TL(n), TL(n+4) as winding wires is formed (see FIG. 15).

In this case, the coil CY(n) becomes a coil having an area corresponding to the drive electrodes TL(n−1) to TL(n+1) inside, the coil CY(n+1) becomes a coil having an area corresponding to the drive electrodes TL(n) to TL(n+2) inside, and the coil CY(n+2) becomes a coil having an area corresponding to the drive electrodes TL(n+1) to TL(n+3) inside. Thus, the coil CY(n) and the coil CY(n+1) overlap in an area corresponding to the drive electrodes TL(n), TL(n+1), the coil CY(n) and the coil CY(n+2) overlap in an area corresponding to the drive electrode TL(n+1), and the coil CY(n+1) and the coil CY(n+2) overlap in an area corresponding to the drive electrodes TL(n), TL(n+1). The area where the three coils CY(n) to CY(n+2) overlap is an area corresponding to the drive electrode TL(n+1).

When each of the coils CY(n) to CY(n+2) is formed, that is, when the period is the magnetic field generation period TGT, the selection signal Ty(n+1)L also changes to the high level, and thus, the common terminal c in each of the ninth switches i02 to i04 is connected to the second terminal p2, and the common terminal c in each of the ninth switches i06 to i08 is connected to the third terminal p3. As a result, to the respective terminals PTL(n−2) to PTL(n) of the coils CY(n) to CY(n+2), the coil clock signal CCLK is supplied from the signal wire LL3 as the magnetic-field drive signal. The magnetic-field drive signal is transferred in drive electrodes forming the coils CY(n) to CY(n+2) and in signal wires, and is transferred from the respective terminals PTL(n+2) to PTL(n+4) to the voltage wire VL2.

The coil clock signal CCLK is a periodically-changing signal, and thus, each of the coils CY(n) to CY(n+2) generates a magnetic field changing in accordance with changes of the magnetic-field drive signal. The magnetic-field drive signal is supplied to the coils CY(n) to CY(n+2) substantially at the same time. Thus, magnetic fields are superimposed in an area where the inner sides of the coils CY(n) to CY(n+2) overlap. In such a case, magnetic fields generated by two coils are superimposed in an area where the two coils overlap. Particularly, the area corresponding to the drive electrode TL(n) is an area where the three coils CY(n) to CY(n+2) overlap, and thus, magnetic fields generated by the three coils are superimposed in the area corresponding to the drive electrode TL(n), so that the strongest magnetic field is generated therein.

In the touch detection, signal are changed in the coils CX(0) to CX(p) formed by using signal lines depending on whether an area corresponding to the drive electrode TL(n+1) is touched by a pen or not in the magnetic field detection period TDT as described with reference to FIGS. 16 to 18, and the signals are output as sense signals.

Subsequent to the selection signals Ty(n+1)R, Ty(n+1)L, the selection control circuits SR1-R, SR1-L set the selection signals Ty(n+2)R, Ty(n+2)L to the high level. At this time, the selection signals Ty(n+1)R, Ty(n+1)L change to the low level. As shown in FIG. 26, by the state in which the selection signals Ty(n+2)R, Ty(n+2)L are changed to the high level, the common terminal c in each of the seventh switches g03 to g05 is connected to the second terminal p2, and the common terminal c in each of the seventh switches g07 to g09 is connected to the first terminal p1. As a result, the drive electrodes TL(n−1), TL(n+3) are connected to the signal wire LL6, the drive electrodes TL(n), TL(n+4) are connected to the signal wire LL4, and the drive electrodes TL(n+1), TL(n+5) are connected to the signal wire LL5. Accordingly, the coils CY(n+1) to CY(n+3) having these drive electrodes as winding wires are formed substantially at the same time. In this case, the area where the three coils CY(n+1) to CY(n+3) overlap with one another is an area corresponding to the drive electrode TL(n+2).

On the other hand, by the state in which the selection control signal Ty(n+2)L is changed to the high level, the common terminal c in each of the ninth switches i03 to i05 is connected to the second terminal p2, and the common terminal c in each of the ninth switches i07 to i09 is connected to the third terminal p3. As a result, the terminals PTL(n−1) to PTL(n+1) of the coils CY(n+1) to CY(n+3) are connected to the signal wire LL3, and the terminals PTL(n+3) to PTL(n+5) of the coils CY(n+1) to CY(n+3) are connected to the voltage wire VL2. Accordingly, in the magnetic field generation period TGT, the coil clock signal CCLK is supplied to the terminals PTL(n−1) to PTL(n+1) of the coils CY(n+1) to CY(n+3) as the magnetic-field drive signal, and the magnetic-field drive signal is transferred to the voltage wire VL2 via these coils.

Accordingly, as similar to the case of FIG. 25, a magnetic field is generated by each of the coils CY(n+1) to CY(n+3). In the case of FIG. 26, magnetic fields generated by the three coils are superimposed in the area corresponding to the drive electrode TL(n+2), so that the strongest magnetic field is generated therein.

In the touch detection, signal are changed in the coils CX(0) to CX(p) formed by using signal lines depending on whether an area corresponding to the drive electrode TL(n+2) is touched by a pen or not in the magnetic field detection period TDT as described with reference to FIGS. 16 to 18, and the signals are output as sense signals.

Subsequent to the selection signals Ty(n+2)R, Ty(n+2)L, the selection control circuits SR1-R, SR1-L set the selection signals Ty(n+3)R, Ty(n+3)L to the high level. At this time, the selection signals Ty(n+2)R, Ty(n+2)L change to the low level. As shown in FIG. 27, by the state in which the selection signals Ty(n+3)R, Ty(n+3)L are changed to the high level, the common terminal c in each of the seventh switches g04 to g06 is connected to the second terminal p2, and the common terminal c in each of the seventh switches g08 to g10 is connected to the first terminal p1. As a result, the drive electrodes TL(n), TL(n+4) are connected to the signal wire LL4, the drive electrodes TL(n+1), TL(n+5) are connected to the signal wire LL5, and the drive electrodes TL(n+2), TL(n+6) are connected to the signal wire LL6. Accordingly, the coils CY(n+2) to CY(n+4) having these drive electrodes as winding wires are formed substantially at the same time. In this case, the area where the three coils CY(n+2) to CY(n+4) overlap with one another is an area corresponding to the drive electrode TL(n+3).

On the other hand, by the state in which the selection control signal Ty(n+3)L is changed to the high level, the common terminal c in each of the ninth switches i04 to i06 is connected to the second terminal p2, and the common terminal c in each of the ninth switches i08 to i10 is connected to the third terminal p3. As a result, the terminals PTL(n) to PTL(n+2) of the coils CY(n+2) to CY(n+4) are connected to the signal wire LL3, and the terminals PTL(n+4) to PTL(n+6) of the coils CY(n+2) to CY(n+4) are connected to the voltage wire VL2. Accordingly, in the magnetic field generation period TGT, the coil clock signal CCLK is supplied to the terminals PTL(n) to PTL(n+2) of the coils CY(n+2) to CY(n+4) as the magnetic-field drive signal, and the magnetic-field drive signal is transferred to the voltage wire VL2 via these coils.

Accordingly, as similar to the case of FIG. 25, a magnetic field is generated by each of the coils CY(n+2) to CY(n+4). In the case of FIG. 27, magnetic fields generated by the three coils are superimposed in the area corresponding to the drive electrode TL(n+3), so that the strongest magnetic field is generated therein.

Subsequent to the selection signals Ty(n+3)R, Ty(n+3)L, the selection control circuits SR1-R, SR1-L set the selection signals Ty(n+4)R, Ty(n+4)L to the high level. At this time, the selection signals Ty(n+3)R, Ty(n+3)L change to the low level. As shown in FIG. 28, by the state in which the selection signals Ty(n+4)R, Ty(n+4)L are changed to the high level, the common terminal c in each of the seventh switches g04 to g06 is connected to the second terminal p2, and the common terminal c in each of the seventh switches g08 to g10 is connected to the first terminal p1. As a result, the drive electrodes TL(n+1), TL(n+5) are connected to the signal wire LL5, the drive electrodes TL(n+2), TL(n+6) are connected to the signal wire LL6, and the drive electrodes TL(n+3), TL(n+7) are connected to the signal wire LL4. Accordingly, the coils CY(n+3) to CY(n+5) having these drive electrodes as winding wires are formed substantially at the same time. In this case, the area where the three coils CY(n+3) to CY(n+5) overlap with one another is an area corresponding to the drive electrode TL(n+4).

On the other hand, by the state in which the selection control signal Ty(n+4)L is changed to the high level, the common terminal c in each of the ninth switches i05 to i07 is connected to the second terminal p2, and the common terminal c in each of the ninth switches i09 to i11 is connected to the third terminal p3. As a result, each one terminal of the coils CY(n+3) to CY(n+5) is connected to the signal wire LL3, and each other terminal of the coils CY(n+2) to CY(n+4) is connected to the voltage wire VL2. Accordingly, in the magnetic field generation period TGT, the coil clock signal CCLK is supplied to each one terminal of the coils CY(n+3) to CY(n+5) as the magnetic-field drive signal, and the magnetic-field drive signal is transferred to the voltage wire VL2 via these coils.

Accordingly, as similar to the case of FIG. 25, a magnetic field is generated by each of the coils CY(n+3) to CY(n+5). In the case of FIG. 28, magnetic fields generated by the three coils are superimposed in the area corresponding to the drive electrode TL(n+4), so that the strongest magnetic field is generated therein.

In the second embodiment, three coils (for example, CY(n+2) to CY(n)) are formed by using drive electrodes (for example, TL(n−2) to TL(n) and TL(n+2) to TL(n+4)) arranged close to each other as winding wires in the magnetic field generation period TGT. To the formed three coils, the magnetic-field drive signal is supplied substantially at the same time. An area where the inner sides the three coils overlap with one another becomes an area corresponding to the drive electrode (TL(n+1)) sandwiched between drive electrodes to be winding wires of the coils. In the area where the coils overlap, magnetic fields generated by each of the three coils are superimposed to generate the strongest magnetic field. If a pen approaches an area where coils overlap in touch detection, the pen internal coil L1 generates an induced voltage by a strong magnetic field, and thus, the amount of charge to be charged in the capacitative element C in the pen can be increased, so that the accuracy of detection can be improved. Because each coil is a single-winding coil, decrease in the drive current flowing through each coil can be prevented, so that the weakening of the magnetic field generated by each coil can be suppressed.

In the second embodiment, three single-winding coils are formed in the magnetic field generation period TGT, and a strong magnetic field is generated in an area where the three coils overlap. In a scan operation, three coils are formed while being shifted from the side 2-U side toward the side 2-D side of the display panel 2. The width of the shifted area corresponds to the width of one drive electrode corresponding to the area where the touch should be detected. Therefore, the area where the touch is detected can be prevented from being discontinuous, so that occurrence of an area where the accuracy of detection is degraded can be prevented.

The drive electrodes for magnetic field are provided outside the active area of the display panel 2 along the side 2-U and the side 2-D of the display panel 2. When an area close to the side 2-U or the side 2-D of the display panel 2 is set as an area of touch detection, a strong magnetic field can be generated also in an area close to the side 2-U or the side 2-D of the display panel 2 by using a drive electrode for magnetic field as a winding wire for forming a coil. As a result, the degradation of the accuracy of detection can be prevented in an area close to a side of the display panel 2.

An example in which the drive electrodes for magnetic field TL(du1) to TL(du3) and TL(dd1) to TL(dd3) to be winding wires for forming a coil are provided outside the active area of the display panel 2, that is, outside the display area has been described. However, the present embodiment is not limited to such an example. For example, even inside the active area of the display panel 2, one or a plurality of drive electrodes for magnetic field may be provided along the side 2-U or the side 2-D of the display panel 2. In such a case, narrowing of the display area can be reduced by making the width of drive electrodes for magnetic field narrower.

Third Embodiment

Figure 29:
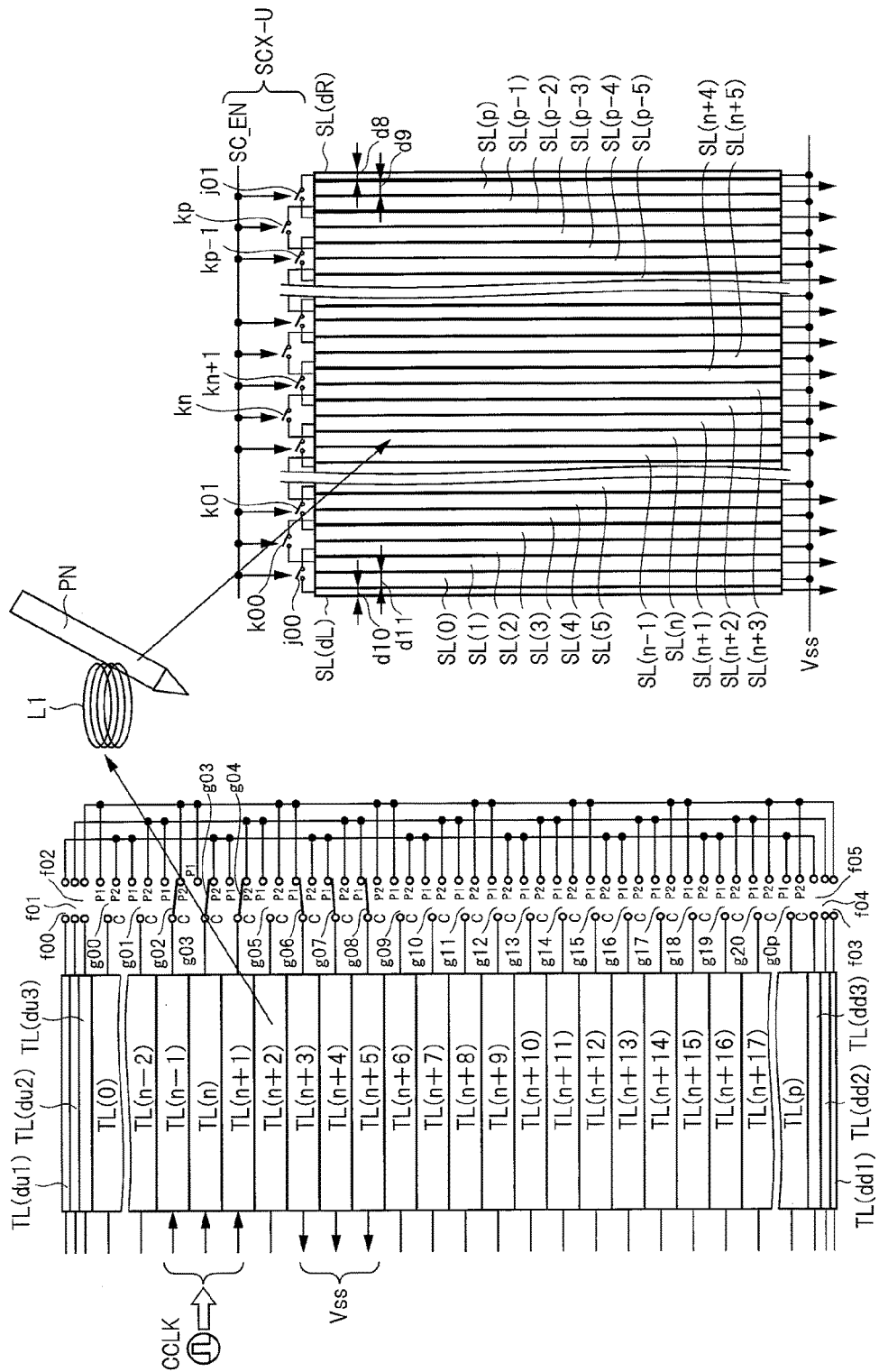
FIG. 29 is a block diagram showing a configuration of a liquid crystal display apparatus according to the third embodiment.

FIG. 29 is an explanatory diagram showing the configuration of the liquid crystal display apparatus 1 according to the third embodiment. FIG. 29 shows an operation in touch detection. This drawing shows such a configuration as generating a magnetic field by a coil formed of drive electrodes in the magnetic field generation period TGT and as detecting a magnetic field from a pen PN by a coil formed of signal lines in the magnetic field detection period TDT.

The left side of FIG. 29 shows a state of the magnetic field generation period TGT, in which an induced voltage is generated in the coil L1 inside the pen PN shown on the upper side of FIG. 29 by a magnetic field generated in the magnetic field generation period TGT, and in which the capacitative element C (not shown) inside the pen PN is charged by the induced voltage generated in the coil L1. In the magnetic field detection period TDT, the coil L1 inside the pen PN generates a magnetic field by charges charged in the capacitative element C. The generated magnetic field is detected by a coil formed of signal lines shown on the right side of FIG. 29.

First, the state of the magnetic field generation period TGT shown on the left side of FIG. 29 will be described. The left side of FIG. 29 shows the drive electrodes TL(0) to TL(p) arranged in the display panel 2, the drive electrodes for magnetic field TL(du1) to TL(du3), TL(dd1) to TL(dd3) arranged outside the active area of the display panel 2, the sixth switches f00 to f05, and the seventh switches g00 to g0p. The configurations of these drive electrodes, drive electrodes for magnetic field, sixth switches, and seventh switches are the same as those shown in FIGS. 23 to 28. Also, as similar to FIG. 26, the left side of FIG. 29 shows a state in which the common terminal c in the seventh switches g02 to g04 is connected to the second terminal p2 and the common terminal c in the seventh switches g06 to g08 is connected to the first terminal p1. Accordingly, as described with reference to FIG. 26, the coils CY(n−1) to CY(n+1) are formed.

In the magnetic field generation period TGT, the coil clock signal CCLK is supplied to each of one ends PTL(n−1) to PTL(n+1) of the formed coils CY(n−1) to CY(n+1) as a magnetic-field drive signal, and the ground voltage Vss is supplied to each of the other ends PTL(n+3) to PTL(n+5) of the coils CY(n−1) to CY(n+1). Accordingly, in the magnetic field generation period TGT, the strongest magnetic field is generated in an area where these coils overlap with each other, that is, an area corresponding to the drive electrode TL(n−2).

By the state in which the pen PN exists in vicinity of the drive electrode TL(n−2), an induced voltage is generated in the coil L1 inside the pen PN, so that the capacitative element C inside the pen PN is charged.

Next, the configuration shown on the right side of FIG. 29 will be described. Also in the third embodiment, as similar to the first embodiment, a plurality of coils are formed of signal lines in the magnetic field detection period TDT. In the third embodiment, each of coils formed of signal lines is a single-winding coil as different from the first embodiment.

In the third embodiment, although not specifically limited, signal lines for magnetic field SL(dR), SL(dL) are arranged along the sides 2-R, 2-L of the display panel 2. That is, the liquid crystal display apparatus 1 includes the signal line for magnetic field SL(dR) (second signal line) arranged to be parallel to the signal lines SL(0) to SL(p) (first signal lines) along the side 2-R outside the active area of the display panel 2 and the signal line for magnetic field SL(dL) (second signal line) arranged to be parallel to the signal lines SL(0) to SL(p) along the side 2-R outside the active area of the display panel 2. The signal lines for magnetic field SL(dR), SL(dL) are outside the active area of the display panel 2, and thus, do not contribute to the display and are used in the touch detection.

If the display panel 2 is corresponded to the pixel array LCD, note that the signal lines for magnetic field SL(dR), SL(dL) are arranged along sides of the pixel array LCD and parallel to the column of the pixel array LCD. That is, the signal line for magnetic field SL(dR) is arranged along the side of the pixel array LCD corresponding to the side 2-R of the display panel 2, and the signal line for magnetic field SL(dL) is arranged along the side of the pixel array LCD corresponding to the side 2-L of the display panel 2.

In the third embodiment, the switching adjustment circuit SCX-U is arranged along the side 2-U side of the display panel 2. In FIG. 29, the upper side shows the side 2-U side of the display panel 2, and the lower side shows the side 2-D side of the display panel 2. The switching adjustment circuit SCX-U includes tenth switches j00, j01 and eleventh switches k00 to kp.

Although not specifically limited, the signal lines SL(0) to SL(p) are arranged in this order from the side 2-L toward the side 2-R of the display panel 2. In the magnetic field detection period TDT in the third embodiment, signal lines arranged so as to sandwich two signal lines therebetween are connected by the eleventh switches k00 to kp. In the description of FIG. 29 as an example, the eleventh switch k00 is connected between an end of the signal line SL(1) and an end of the signal line SL(4), and the eleventh switch k01 is connected between an end of the signal line SL(3) and an end of the signal line SL(6). Also, the eleventh switch kn−1 is connected between an end of the signal line SL(n−2) and an end of the signal line SL(n+1), the eleventh switch kn is connected between an end of the signal line SL(n) and an end of the signal line SL(n+3), and the eleventh switch kn+1 is connected between an end of the signal line SL(n+2) and an end of the signal line SL(n+5).

Further, the eleventh switch kp−1 is connected between an end of the signal line SL(p−6) and an end of the signal line SL(p−3), and the eleventh switch kp is connected between an end of the signal line SL(p−4) and an end of the signal line SL(p−1).

The tenth switch j00 is connected between an end of the signal line for magnetic field SL(dL) and an end of the signal line SL(2), and the tenth switch j01 is connected between an end of the signal line for magnetic field SL(dR) and an end of the signal line SL(p−2).

Each of the tenth switches j00, j01 and the eleventh switches k00 to kp is switch-controlled by the magnetic-field enable signal SC_EN. In the third embodiment, the tenth switches j00, j01 and the eleventh switches k00 to kp are turned on when the magnetic-field enable signal SC_EN is at the high level, and are turned off when the magnetic-field enable signal SC_EN is at the low level.

The magnetic-field enable signal SC_EN is set to the high level in the touch detection, and thus, the tenth switches and the eleventh switches are turned on. As a result, in the touch detection, signal lines sandwiching two signal lines therebetween are electrically connected to each other. In the description of FIG. 29 as an example, the signal lines SL(1), SL(4) arranged so as to sandwich the signal lines SL(2), SL(3) therebetween are electrically connected to each other by the eleventh switch k00. Similarly, the signal lines SL(3), SL(6) arranged so as to sandwich the signal lines SL(4), SL(5) therebetween are connected to each other by the eleventh switch k01, the signal lines SL(n−2), SL(n+1) arranged so as to sandwich the signal lines SL(n−1), SL(n) therebetween are connected to each other by the eleventh switch kn−1, the signal lines SL(n), SL(n+3) arranged so as to sandwich the signal lines SL(n+1), SL(n+2) therebetween are connected to each other by the eleventh switch kn, and the signal lines SL(n+2), SL(n+5) arranged so as to sandwich the signal lines SL(n+3), SL(n+4) therebetween are connected to each other by the eleventh switch kn+1.

Further, the signal lines SL(p−6), SL(p−3) arranged so as to sandwich the signal lines SL(p−5), SL(p−4) therebetween are connected to each other by the eleventh switch kp−1, and the signal lines SL(p−4), SL(p−2) arranged so as to sandwich the signal lines SL(p−3), SL(p−2) therebetween are connected to each other by the eleventh switch kp.

In the third embodiment, further, the signal line for magnetic field SL(dL) and the signal line SL(2) arranged so as to sandwich the signal lines SL(0), SL(1) therebetween are connected to each other by the tenth switch j00, and the signal line for magnetic field SL(dR) and the signal line SL(p−2) arranged so as to sandwich the signal lines SL(p−1), SL(p) therebetween are connected to each other by the tenth switch j01.

Accordingly, as described with reference to FIGS. 16 to 18, coils having the signal lines SL(0) to SL(p) as winding wires can be formed in the magnetic field detection period TDT. Further in the third embodiment, coils can be formed also in vicinity of the sides 2-R. 2-L of the display panel 2 in the magnetic field detection period TDT. That is, a coil having the signal lines SL(0), SL(1) arranged close to the side 2-L of the display panel 2 inside can be formed of the signal line for magnetic field SL(dL) and the signal line SL(2). Similarly, a coil having the signal lines SL(p−1), SL(p) arranged close to the side 2-R of the display panel 2 inside can be formed of the signal line for magnetic field SL(dR) and the signal line SL(p−2). Accordingly, the pen PN can be detected even if the pen PN approaches the side 2-R or the side 2-L. Also in the third embodiment, as similar to the coils described with reference to FIGS. 16 to 18, the formed coils overlap with each other. Accordingly, detection missing can be prevented.

Widths d8, d10 of the signal lines for magnetic field SL(dR), SL(dL) are made narrower than widths d9, d10 of the signal lines SL(0) to SL(p). Accordingly, increase in a size of a frame can be prevented.

In the magnetic field detection period TDT, the ground voltage Vss is supplied to one terminal of a pair of terminals of each of coils formed of signal lines, and the other terminal thereof is connected to the input terminal XIO of the selection control circuit SRX-D via the fourth switch described with reference to FIG. 16. In the description of FIG. 29 as an example, an end of the signal line SL(n−2) is connected to the input terminal XIO(n−1) via the fourth switch d00 shown in FIG. 16, an end of the signal line SL(n) is connected to the input terminal XIO(n) via the fourth switch d01 shown in FIG. 16, and an end of the signal line SL(n+2) is connected to the input terminal XIO(n+1) via the fourth switch d02 shown in FIG. 16.

In the magnetic field detection period TDT, by turning on the fourth switch (for example, the fourth switch d01) by the selection signals X-Out(0) to X-Out(p) from the selection control circuit SRX-D, a signal depending on whether or not an induced voltage is generated in the coil formed of the signal lines SL(n), SL(n+3) by a magnetic field generated from the pen PN is transferred to the input terminal XIO(n) and is output as a sense signal.

In FIG. 29, note that drive electrodes and signal lines are separately shown for the description. However, drive electrodes and signal lines overlap in an electrically-insulated state.

The third embodiment describes an example in which the signal lines for magnetic field SL(dR), SL(dL) to be winding wires for forming a coil are provided along both sides of the display panel 2. However, of course, the signal lines for magnetic field may be provided along either one side. The tenth switch j00 and the eleventh switches k00 to kp may be turned on after a predetermined time passes from the change of the magnetic-field enable signal SC_EN to the high level. In this manner, the tenth switches and the eleventh switches may be turned on in the magnetic field detection period TDT even in touch detection.

Figure 33:
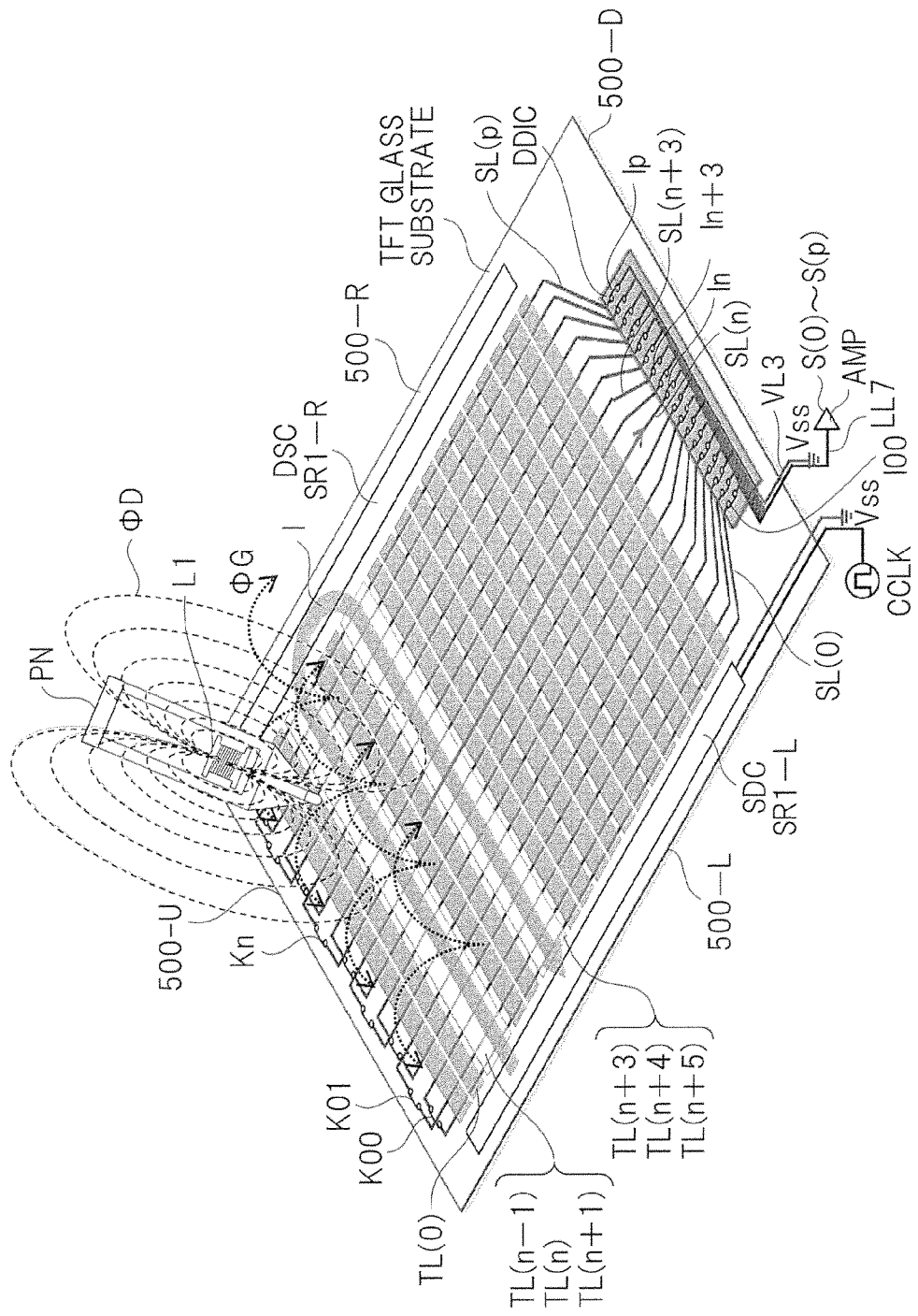
FIG. 33 is a schematic diagram showing an outline of a liquid crystal display apparatus according to the third embodiment.

FIG. 33 is a schematic diagram schematically showing an outline of the liquid crystal display apparatus 1 according to the third embodiment. This drawing shows the drive electrodes TL(0) to TL(p), the signal lines SL(0) to SL(p), the eleventh switches k00 to kp, the semiconductor device for drive DDIC, twelfth switches l00 to lp, the selection control circuits SR1-R, SR1-L, the switching circuit DSC, and the selection drive circuit SDC. They are formed on a TFT glass substrate. Thus, the liquid crystal display apparatus 1 mounted on a module can be considered to be shown in FIG. 33. In FIG. 33, the pen PN including the coil L1 is also shown.

The switching circuit DSC and the selection control circuit SR1-R are arranged along the side 500-R of the module, and the selection drive circuit SDC and the selection control circuit SR1-L are arranged along the side 500-L. The signal lines SL(0)~SL(p) are arranged between the switching circuit DSC and the selection drive circuit SDC so as to be parallel to each other, the eleventh switches k00 to kp are arranged along the side 500-U of the module, and the twelfth switches l00 to lp are arranged along the side 500-D. The drive electrodes TL(0) to TL(p) are arranged between the eleventh switches k00 to kp and the twelfth switches l00 to lp so as to be parallel to each other.

As described with reference to FIG. 29, the eleventh switches k00 to kp connect signal lines in touch detection.

The twelfth switches l00 to lp are categorized into two groups, and the twelfth switches in the first group are connected between a voltage wire VL3 and an end of each of signal lines such as the signal lines SL(2), SL(n+3), SL(p−1) shown in FIG. 29 to which the ground voltage Vss should be supplied in the magnetic field detection period TDT, and are turned on in the magnetic field detection period TDT. The twelfth switches in the second group are connected between a corresponding signal wire LL7 and an end of each of signal lines such as the signal lines SL(1), SL(n), SL(p−4) shown in FIG. 29 from which a signal change in a coil is output in the magnetic field detection period TDT. As exemplification in FIG. 33, references characters l00, ln, ln+3, lp are attached to the twelfth switch (of the second group) connected to an end of the signal line SL(0), the twelfth switch (of the second group) connected to an end of the signal line SL(n), the twelfth switch (of the first group) connected to an end of the signal line SL(n+3), and the twelfth switch (of the first group) connected to an end of the signal line L(p), respectively. Although the signal wire LL7 is shown as a wire, the signal wire includes signal wires as many as the number corresponding to the twelfth switches of the second group. The twelfth switches of the second group are also turned on in a magnetic field detection period. Accordingly, a signal generated in each coil is transferred to the corresponding signal wire LL7, is amplified by an amplifier circuit AMP, and is supplied to the semiconductor device for touch detection 6 (FIG. 6) as the sense signals S(0) to S(p).

In the third embodiment, the twelfth switches l00 to lp are formed on a TFT glass substrate, and the semiconductor device for drive DDIC is arranged so as to cover the twelfth switches l00 to lp. Accordingly, widening of the frame can be suppressed.

In the touch detection, three coils having the drive electrodes TL(n−1) to TL(n+1), TL(n+3) to TL(n+5) as winding wires are formed by the selection control circuits SR1-R, SR1-L, the switching circuit DSC, and the selection drive circuit SDC, and a magnetic-field drive signal is supplied to each of the three coils. Accordingly, a drive current as indicated by a solid line I with an attached arrow in FIG. 33 flows. A magnetic field is generated in each of the three coils by periodic changes of the magnetic-field drive signal. FIG. 33 schematically shows an appearance of a generated magnetic field □G by a broken line. Note that the direction of arrow has no particular meaning, and shows that a strong magnetic field is generated from an area (drive electrode TL(n+2)) where the three coils overlap.

If the pen PN exists in vicinity of an area where the three coils overlap with one another, an induced voltage is generated in the coil L1 inside the pen PN by the action of mutual induction. The capacitive element C (not shown) inside the pen PN is charged by the generated induced voltage.

In the magnetic field detection period TDT, the coil L1 inside the pen PN generates a magnetic field by charges charged in the capacitative element C. The line of magnetic force at this time is shown as ☐D in FIG. 33.

As described with reference to FIG. 29, in the magnetic field detection period TDT, the eleventh switches k00 to kp are turned on. Accordingly, a plurality of coils having the signal lines SL(0) to SL(p) as winding wires are formed. By the action of mutual induction between a coil having signal lines as winding wires and the coil L1 inside the pen PN, an induced voltage is generated in the coil having signal lines as winding wires, so that a signal in the signal lines is transferred to the twelfth switches of the second group. The signal is output from the amplifier circuit AMP as the sense signals S(0) to S(p) by turning on the twelfth switches of the second group. In FIG. 33, the signal transferred to the twelfth switch ln via the signal line SL(n) is shown by a solid line with an attached arrow.

An example in which the signal lines for magnetic field SL(dL), SL(dR) are arranged outside the active area of the display panel 2 has been described. However, the present embodiment is not limited to such an example. For example, along the side 2-L or the side 2-R inside the active area of the display panel 2, the signal line for magnetic field SL(dL) and/or the signal line for magnetic field SL(dR) may be arranged. In such a case, by making the width d10 of the signal line for magnetic field SL(dL) and/or SL(dR) to be arranged narrower than the width d11 of signal lines, narrowing of the display area can be reduced.

Fourth Embodiment

Figure 30:
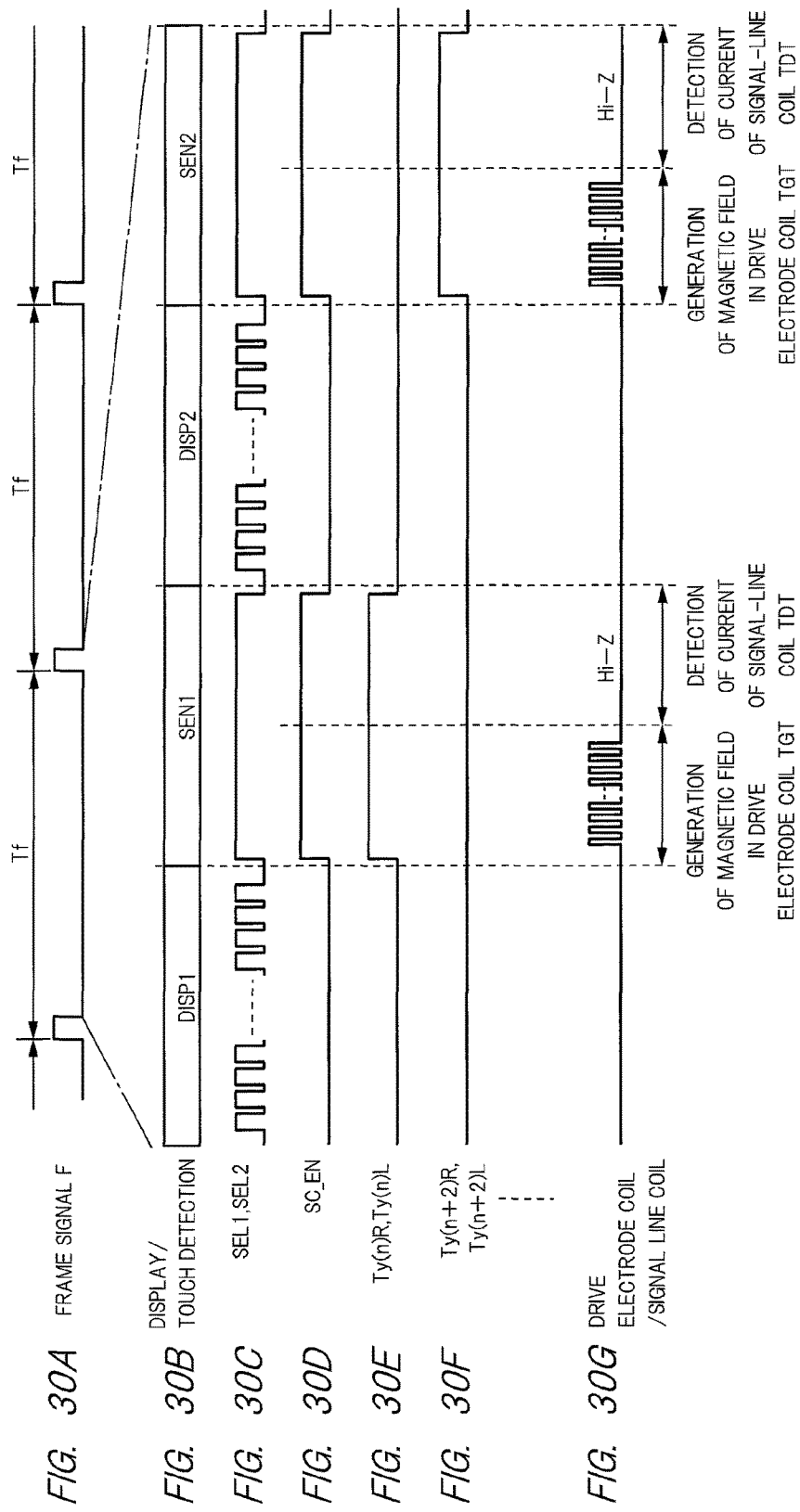
FIG. 30A is a waveform diagram showing an operation of a liquid crystal display apparatus according to the fourth embodiment.
FIG. 30B is a waveform diagram showing an operation of the liquid crystal display apparatus according to the fourth embodiment.
FIG. 30C is a waveform diagram showing an operation of the liquid crystal display apparatus according to the fourth embodiment.
FIG. 30D is a waveform diagram showing an operation of the liquid crystal display apparatus according to the fourth embodiment.
FIG. 30E is a waveform diagram showing an operation of the liquid crystal display apparatus according to the fourth embodiment.
FIG. 30F is a waveform diagram showing an operation of the liquid crystal display apparatus according to the fourth embodiment.
FIG. 30G is a waveform diagram showing an operation of the liquid crystal display apparatus according to the fourth embodiment.

FIG. 30 is a timing chart showing the operation of the liquid crystal display apparatus 1 according to the fourth embodiment. Here, while the liquid crystal display apparatus 1 according to the first embodiment will be described as an example, the same goes for the second embodiment and the third embodiment.

In FIG. 30, the horizontal axis represents the time. FIG. 30A shows a frame signal F that is periodically generated, and the liquid crystal display apparatus displays, for example, an image corresponding to one screen in one frame period Tf defined by the frame signal F. In the fourth embodiment, the control circuit D-CNT shown in FIG. 6 performs control so that a plurality of display periods and a plurality of touch detection periods are alternately generated in one frame period Tf. FIGS. 30B to 30G show the timing in one frame period Tf of a plurality of frame periods Tf. That is, the timing shown in FIGS. 30B to 30G occurs in each of the plurality of frame periods Tf.

Here, FIG. 30B schematically shows display periods and touch detection periods generated in one frame period Tf. FIG. 30C shows a waveform of the selection signals SEL1, SEL2 supplied to the signal line selector 3 (FIG. 6). FIG. 30D shows a waveform of the magnetic-field enable signal SC_EN. FIGS. 30E and 30F show waveforms of the selection signals Ty(n)R, Ty(n)L and the selection signals Ty(n+2)R, Ty(n+2)L of selection signals from the selection control circuits SR-R, SR-L. FIG. 30G shows signal changes in coils formed by using drive electrodes and coils formed by using signal lines.

As shown in FIG. 30B, the control circuit D-CNT performs control so that the display period DISP1 (DISP2) and the touch detection period SEN1 (SEN2) are alternately generated in time series in each frame period Tf. That is, in the display period DISP1 (DISP2), an image signal Sn is set to be supplied to the appropriate signal line by supplying the image signal Sn from the signal driver D-DRV (FIG. 6) to the signal line selector 3 so that the selection signals SEL1, SEL2 are alternately set to the high level. In FIG. 30C, note that the selection signals SEL1, SEL2 are shown as one waveform in order to show that the selection signals SEL1, SEL2 change. Also in the display period DISP1 (DISP2), the switching circuit DSC and the selection drive circuit SDC are controlled by the selection control circuits SR-R, SR-L so that a display drive signal is supplied from the switching circuit DSC and the selection drive circuit SDC to the drive electrodes TL(0) to TL(p). Further, the gate driver 5 (FIG. 6) is controlled so that an appropriate scanning signal is supplied from the gate driver 5 to the scanning lines GL(0) to GL(P). Accordingly, in the display period DISP1 (DISP2), the display panel 2 performs the display in accordance with the image signal Sn.

As shown in FIG. 30D, in the touch detection period SEN1 (SEN2), the control circuit D-CNT sets the magnetic-field enable signal SC_EN to the high level. Accordingly, the selection control circuits SR-R, SR-L sets, for example, the selection signals Ty(0)R, Ty(0)L to Ty(p)R, Ty(p)L to the high level in this order. FIG. 30 shows a state in which the selection signals Ty(n)R, Ty(n)L change to the high level in the touch detection period SEN1 and in which the selection signals Ty(n+2)R, Ty(n+2)L change to the high level in the next touch detection period SEN2.

The touch detection period SEN1 (SEN2) includes the magnetic field generation period TGT in which a magnetic field is generated and the magnetic field detection period TDT subsequent to the magnetic field generation period TGT. In the magnetic field generation period TGT, a coil is formed by using drive electrodes, and a magnetic field is generated by the formed coil. An induced voltage is generated in the coil L1 by mutual induction between the coil and the coil L1 inside a pen (FIGS. 1 and 2), so that the capacitative element C inside the pen (FIG. 2) is charged. In the magnetic field detection period TDT, the coil L1 inside the pen generates a magnetic field in accordance with the amount of charge charged in the capacitative element C. Also in the magnetic field detection period TDT, a coil is formed by using signal lines. An induced voltage is generated in the coil formed of signal lines by mutual induction between the coil formed of signal lines and the coil L1 inside the pen. The pen is detected by detecting a flowing current of the signal lines caused by the induced voltage.

In the magnetic field generation period TGT, the control circuit D-CNT supplies the coil clock signal CCLK to the signal wire LL3. In the magnetic field detection period TDT, the control circuit D-CNT stops the supply of the coil clock signal CCLK, performs control so that an external terminal of the semiconductor device for drive DDIC connected to the terminal SP (FIG. 16) is in a high-impedance state, and so that the signal line selector 3 (FIG. 16) connects the terminal SP and signal lines by the selection signals SEL1, SEL2. Accordingly, when a coil is formed by using the signal lines SL(0) to SL(p), the coil is put into a high-impedance state.

By the state in which the selection signals Ty(n)R, Ty(n)L are changed to the high level, as described in the first embodiment, two coils having drive electrodes as winding wires are formed. Areas of the two formed coils overlap in the drive electrodes TL(n), TL(n+1) corresponding to the selection signals TY(n)R, Ty(n)L. In the magnetic field generation period TGT, the signal wire LL3 is connected to each of the two coils, and the coil clock signal CCLK is supplied to each coil as a magnetic-field drive signal. As a result, a magnetic field changing in accordance with the magnetic-field drive signal is generated in each of the two coils, and magnetic fields are superimposed in an area corresponding to the drive electrodes TL(n), TL(n+1) to generate a strong magnetic field ("Occurrence of magnetic field in drive electrode coil" is described in FIG. 30).

In the magnetic field detection period TDT, as described in the first embodiment, a plurality of coils CX(0) to CX(p) (see FIG. 18) are formed of the signal wires SL(0) to SL(p). In the touch detection period SEN1, the amount of charge charged in the capacitative element C inside the pen changes depending on whether or not a pen approaches an area corresponding to the drive electrode TL(n) in the magnetic field generation period TGT. In the magnetic field detection period TDT, coordinates or others of an area to which the pen approaches can be determined by detecting a current in each of the plurality of coils CX(0) to CX(p) (signal-line coil current detection).

Next, the control circuit D-CNT sets the magnetic-field enable signal SC_EN to the low level to perform a display operation in the display period DISP2. After the display period DISP2, the control circuit D-CNT sets the magnetic-field enable signal SC_EN to the high level again.

In synchronization with the change of the magnetic-field enable signal SC_EN to the high level, the selection control circuits SR-R, SR-L change the selection signals Ty(n+2)R, Ty(n+2)L to the high level, and maintain the selection signals Ty(n)R, Ty(n)L at the low level. In the touch detection period SEN2, the control circuit D-CNT supplies the coil clock signal CCLK to the signal wire LL3 in the magnetic field generation period TGT, and stops the supply of the coil clock signal CCLK in the magnetic field detection period TDT. Accordingly, as described in the first embodiment, in the magnetic field generation period TGT, two coils overlapping with each other in an area corresponding to the drive electrode TL(n+1) are formed so that a strong magnetic field is generated in an area corresponding to the drive electrodes TL(n+2), TL(n+3), a magnetic field in accordance with changes of the coil clock signal CCLK (magnetic-field drive signal) is generated by each coil, and the magnetic fields are superimposed in the area corresponding to the drive electrodes TL(n+2), TL(n+3).

In the magnetic field detection period TDT, the coils CX(0) to CX(p) are formed of signal lines, and coordinates or others of an area to which a pen approaches are determined by detecting a current from each coil.

By repeating the operation in the touch detection period described above, a strong magnetic field is successively generated from the side 2-U toward the side 2-D of the display panel 2 for, for example, each area corresponding to two drive electrodes as a unit. The position to which a pen approaches in an area where a strong magnetic field is generated is determined by currents from the coils CX(0) to CX(p). Accordingly, for example, the touch on the entire surface of the display panel 2 can be detected in one frame period Tf.

In the magnetic field generation period TGT, the selection drive circuit SDC connects drive electrodes corresponding to the high-level selection signal to the signal wire LL3 and the voltage wire VL2, and puts drive electrodes corresponding to low-level selection signals into a floating state. As described as an example, when the selection signal Ty(n)L is at the high level, the drive electrodes TL(n−2), TL(n−1) are connected to the signal wire LL3, and the drive electrodes TL(n+2), TL(n+3) are connected to the voltage wire VL2. Drive electrodes except for these four drive electrodes, that is, the drive electrodes TL(0) to TL(n−3), TL(n), TL(n+1), and TL(n+4) to TL(p) are put into a floating state. In other words, these drive electrodes TL(0) to TL(n−3), TL(n), TL(n+1), and TL(n+4) to TL(p) are in a high-impedance state.

Also in the fourth embodiment, a high-impedance control signal HZ-CT is supplied from the control circuit D-CNT to the gate driver 5 and the signal line drive circuit D-DRV. In the magnetic field generation period TGT, the control circuit D-CNT performs control so that the output of each of the gate driver 5 and the signal line drive circuit D-DRV is put into a high-impedance state by the high-impedance control signal HZ-CT. Accordingly, in the magnetic field generation period TGT, the signal lines SL(0) to SL(p) and the scanning lines GL(0) to GL(p) are floated and are put into a high-impedance state. As a result, all of drive electrodes, signal lines, and scanning lines that do not form a coil are put into a high-impedance state. Accordingly, when coils are driven by the coil clock signal CCLK, the parasitic capacitance to be charged can be reduced, so that the magnetic field generation period can be shortened, and the accuracy of magnetic field detection can be improved.

Fifth Embodiment

In the first to fourth embodiments, the coil that generates magnetic fields in the magnetic field generation period TGT and the coil that detects a magnetic field in the magnetic field detection period TDT are different from each other. That is, in the magnetic field generation period TGT, a magnetic field is generated by coils formed by using drive electrodes arranged in parallel with the row direction of the display panel 2 (pixel array LCD). On the other hand, in the magnetic field detection period TDT, a magnetic field is detected by coils formed by using signal lines arranged in parallel with the column direction of the display panel 2 (pixel array LCD). By contrast, in the fifth embodiment, a magnetic field is generated by using coils formed of drive electrodes in the magnetic field generation period TGT, and a magnetic field is detected by using coils formed of drive electrodes in the magnetic field detection period TDT. That is, coils formed by using drive electrodes are used for both of magnetic field generation and magnetic field detection. In this case, by using the coils formed by using signal lines for both of magnetic field generation and magnetic field detection, coordinates of an area to which a pen approaches can be extracted.

Here, a case when coils formed by using drive electrodes are used for both of magnetic field generation and magnetic field detection will be described.

Figure 31:
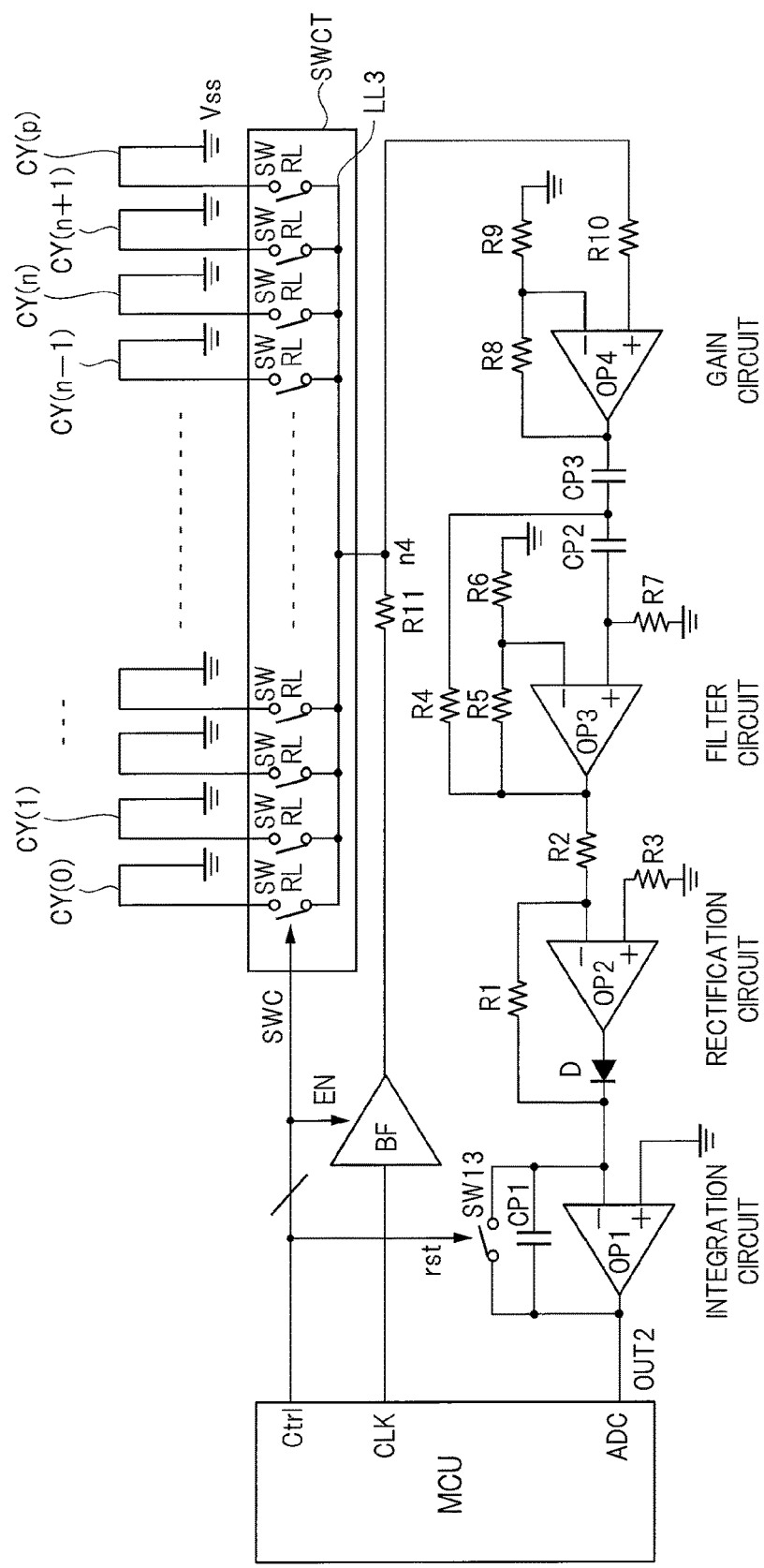
FIG. 31 is a block diagram showing a configuration of a liquid crystal display apparatus according to the fifth embodiment.

FIG. 31 is a circuit diagram showing an example of a magnetic field detection circuit used for the liquid crystal display apparatus 1 according to the fifth embodiment. In FIG. 31, reference characters CY(0) to CY(p) indicate coils formed in a touch detection period. a reference character SWCT indicates a switch unit having a plurality of switches SWRL switch-controlled by a switch control signal SWC. Here, for example, the switch SWRL corresponds to the second switches b00 to b09 shown in FIG. 11, and the switch control signal SWC corresponds to the selection signals Ty(n−2)L to Ty(n+6)L.

In a touch detection period, one end of each of the coils CY(0) to CY(p) is connected to the ground voltage Vss, and the other end thereof is connected to a node n4 via the corresponding switch SWRL and signal wire LL3. A detection signal in the node n4 is supplied to a gain circuit and is amplified by the gain circuit. The amplified detection signal is supplied to a filter circuit in order to remove noise, and the output of the filter circuit is rectified by a rectification circuit and is supplied to an integrating circuit. The output of the integrating circuit is supplied to a micro-controller MCU.

Although not shown, the micro-controller MCU includes an analog/digital conversion circuit, a clock signal generator circuit, a nonvolatile memory storing a program, and a processing unit operating in accordance with the program stored in the nonvolatile memory. The output from the above-described integrating circuit is supplied to the analog/digital conversion circuit via a terminal ADC of the micro-controller MCU and is converted into a digital signal. The digital signal obtained by the conversion is processed by the processing unit to determine whether or not a pen approaches any of the coils CY(0) to CY(p).

The processing unit in the micro-controller MCU forms a control signal in accordance with a program. The control signal includes the switch control signal SWC, an enable signal EN, and a reset signal rst. Also, the clock signal CLK whose voltage changes periodically is generated by the clock signal generator circuit in the micro-controller MCU. The clock signal is used as the coil clock signal CCLK.

The coil clock signal CCLK is supplied to a buffer circuit BF. The buffer circuit BF is controlled by the enable signal EN. When the enable signal EN is at the high level, the coil clock signal CCLK is supplied to the node n4 via a resistor R11. On the other hand, when the enable signal EN is at the low level, the output of the buffer circuit BF is in a high-impedance state (Hi-Z).

The gain circuit includes resistors R8 to R10, an operational amplifier OP4, and a capacitative element CP3 for DC cutting. A detection signal is supplied to a positive-phase input (+) of the operational amplifier OP4, and an inverse input (−) of the operational amplifier OP4 is connected to the ground voltage Vs via the resistor R9 and is also connected to the output of the operational amplifier OP4 via the resistor R8.

The filter circuit includes resistors R4 to R7, a capacitative element CP2, and an operational amplifier OP3. The positive-phase input (+) of the operational amplifier OP3 is connected to the ground voltage Vs via the resistor R7, and an output signal from the gain circuit is supplied thereto via the capacitative element CP2. The inverse input (−) of the operational amplifier OP3 is connected to the ground voltage Vs via the resistor R6, and further connected to the output of an operational amplifier via the resistor R5. Further, the output of the operational amplifier OP3 is connected to the input of the filter circuit via the resistor R4.

The rectification circuit includes resistors R1 to R3, an operational amplifier OP2, and a diode D. The positive-phase input (+) of the operational amplifier is connected to the ground voltage Vs via the resistor R3, and the output from the filter circuit is supplied to the inverse input (−) of the operational amplifier OP2 via the resistor R2. Further, the output of the rectification circuit is supplied thereto via the resistor R1. The output of the operational amplifier OP2 is output via the diode D.

The integrating circuit includes a capacitative element CP1, a switch SW13 that receives the reset signal rst as a switch control signal, and an operational amplifier OP1. The positive-phase input (+) of the operational amplifier is connected to the ground voltage Vs, and the inverse input (−) thereof is connected to the output of the integrating circuit via the capacitative element CP1. The switch SW13 is connected between the output and the input of the integrating circuit.

Figure 32:
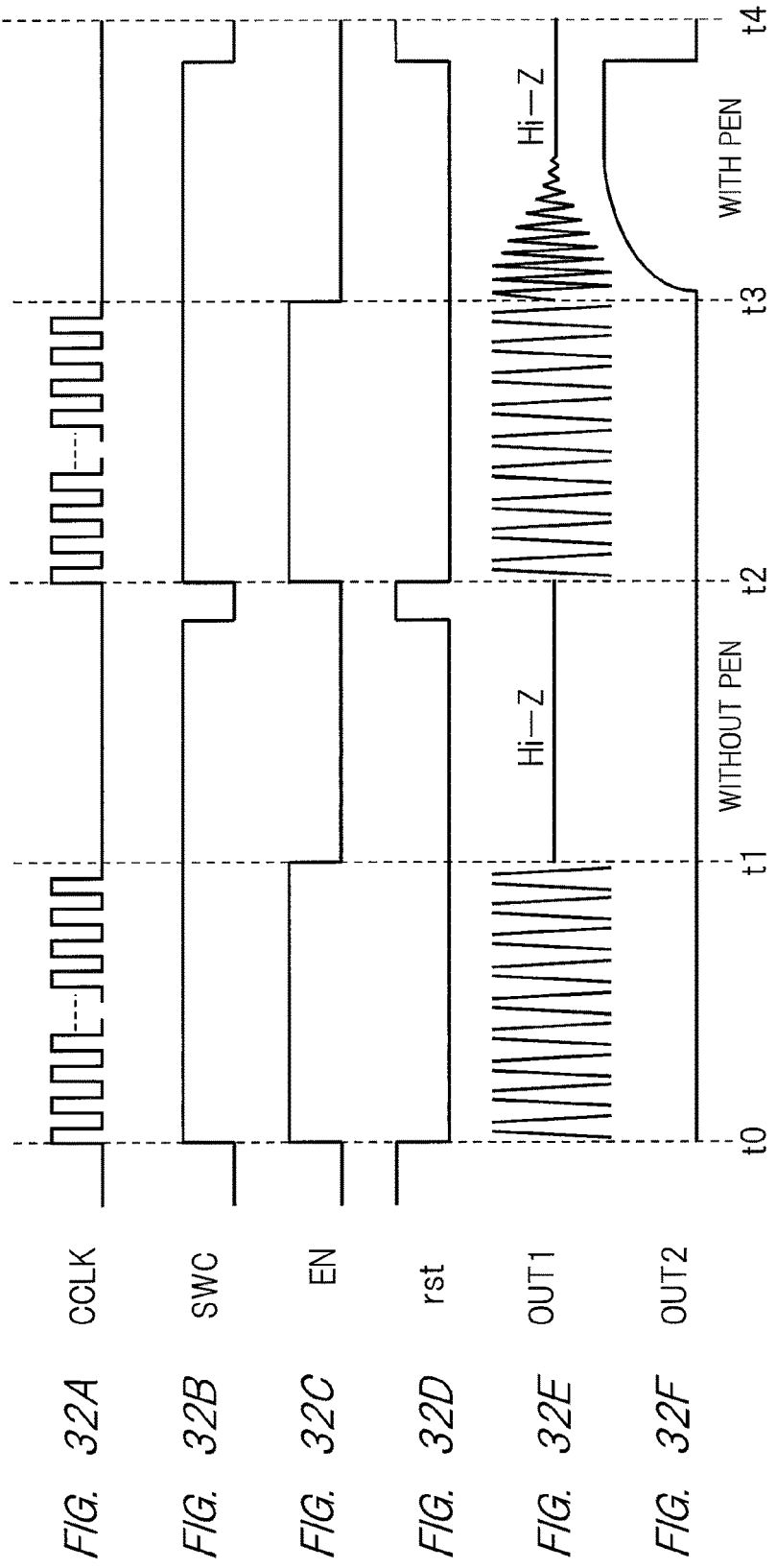
FIG. 32A is a waveform diagram showing an operation of a liquid crystal display apparatus according to the fifth embodiment.
FIG. 32B is a waveform diagram showing an operation of the liquid crystal display apparatus according to the fifth embodiment.
FIG. 32C is a waveform diagram showing an operation of the liquid crystal display apparatus according to the fifth embodiment.
FIG. 32D is a waveform diagram showing an operation of the liquid crystal display apparatus according to the fifth embodiment.
FIG. 32E is a waveform diagram showing an operation of the liquid crystal display apparatus according to the fifth embodiment.
FIG. 32F is a waveform diagram showing an operation of the liquid crystal display apparatus according to the fifth embodiment.

FIG. 32 is a waveform chart showing the operation of the magnetic field detection circuit shown in FIG. 31. In FIG. 32, the horizontal axis represents the time, and the vertical axis represents the voltage. FIG. 32A shows the waveform of the coil clock signal CCLK, FIG. 32B shows the waveform of the switch control signal SWC, and FIG. 32C shows the waveform of the enable signal EN. Also, FIG. 32D shows the waveform of the reset signal rst, FIG. 32E shows an output waveform OUT1 of the gain circuit, and FIG. 32F shows the waveform of an output OUT2 of the integrating circuit. Note that the operation of touch detection is shown in FIG. 32 and that the operation of a display period is omitted.

First, a reset is canceled by a state in which the reset signal rst is set to the low level at time t0. At this time, the micro-controller MCU sets the enable signal EN to the high level. Accordingly, the coil clock signal CCLK is supplied from the buffer circuit BF to the node n4 via the resistor R11. At this time, the micro-controller MCU outputs such a switch control signal SWC as turning on the switch SWRL corresponding to, for example, the coils CY(n−2), CY(n−1). Here, the correspondence between the ON state/OFF state of the switch SWRL and the second switch shown in FIG. 11 will be described as follows. That is, in the example with the second switches b00, b01, b04, b05 shown in FIG. 11, the ON state of the switch SWRL means a state in which the common terminal c in each of the second switches b00, b01 is connected to the second terminal p2 and in which the common terminal c in each of the second switches b04, b05 is connected to the third terminal p3. On the other hand, the OFF state of the switch SWRL means a state in which the common terminal c in each of the second switches b00, b01, b04, b05 is connected to the fourth terminal.

By the ON state of the switches SWRL (the second switches b00, b01, b04, b05 in FIG. 11) corresponding to the coils CY(n−2), CY(n−1), the coil clock signal CCLK supplied to the node n4 is supplied to an end of each of the coils CY(n−2), CY(n−1) as a magnetic-field drive signal.

The coil clock signal CCLK supplied to the node n4 is also supplied to the gain circuit. An output OUT1 of the gain circuit changes in accordance with voltage changes of the coil clock signal CCLK, and thus, changes as shown in FIG. 32E. The output OUT1 of the amplifier circuit is supplied to the rectification circuit via the filter circuit, and the rectified output is supplied to the integrating circuit. While the voltage of the node n4 changes periodically from time t0 to time t1, there is no change in terms of an envelope curve, and thus, the output of the integrating circuit is a fixed value.

At time t1, the micro-controller MCU sets the enable signal EN to the low level. Accordingly, the node n4 is put into a high-impedance state (Hi-Z). Also at time t1, the micro-controller MCU forms such a switch control signal SWC as maintaining the ON state of the switches SWRL (b00, b01, b04, b05) corresponding to the coils CY(n−2), CY(n−1) and as turning off the rest of SWRL (b02, b03, b06 to b09). Accordingly, an end of each of the coils CY(n−2), CY(n−1) is maintained in a connected state to the node n4, and other coils are maintained in a disconnected state from the node n4. Between time t0 and time t2 in the example of FIG. 32, the pen does not approach an area where the coils CY(n−2), CY(n−1) overlap, and thus, no magnetic energy is provided from the pen to the coils CY(n−2), CY(n−1). Therefore, the output OUT2 of the integrating circuit does not change.

Before shift to time t2, the micro-controller MCU temporarily sets the reset signal rst to the high level and also sets all the switch control signals SWC to the low level. Accordingly, the reset is set, and then, the reset is canceled by setting the reset signal rst to the low level again. The interval between time t2 and time t3 is the same in the signals as the interval between time t0 and time t1.

At time t3, the micro-controller MCU forms such a switch control signal SWC as maintaining the ON state of the switches SWRL (b02, b03, b06, b07) corresponding to the coils CY(n), CY(n+1) and as turning off the switches SWRL corresponding to the rest of switches. Note that FIG. 32B shows the waveform of the switch control signal SWC supplied to the switch SWRL corresponding to the coils CY(n−2), CY(n−1) between time t0 and time t2, and shows the waveform of the switch control signal SWC supplied to the switch SWRL corresponding to the coils CY(n), CY(n+1) between time t2 and time t4.

At time t3, the micro-controller MCU sets the enable signal EN to the low level. Accordingly, the node n4 is put into the high-impedance state. At this time, a pen exists in vicinity of an area where the coils CY(n), CY(n+1) overlap, and thus, an induced voltage is generated in the coils CY(n), CY(n+1) by a magnetic field generated in an area where the coils CY(n), CY(n+1) overlap between time t2 and time t3, so that the capacitative element C (FIG. 2) is charged.

At time t3, the coil L1 inside the pen generates a magnetic field based on the amount of charge charged in the capacitative element C. An induced voltage is generated in the coils CY(n), CY(n+1) by changes of the magnetic field generated by the coil L1.

As a result, as shown in FIG. 32E, the output OUT1 of the gain circuit attenuates while oscillating. That is, the voltage attenuates in terms of an envelope curve. The output OUT1 of the gain circuit attenuates from time t3 while oscillating, and thus, the output OUT2 of the integrating circuit gradually increases. The micro-controller MCU determines that a pen exists based on a result of conversion of the output OUT2 of the integrating circuit into a digital signal. At this time, the micro-controller MCU can get the position of the selected coil of the coils CY(0) to CY(p) by setting the switch control signal SWC to the high level, and thus, can determine the position where the pen exists, that is, the position at which the pen touches, and a pen pressure of the pen or others from the value of the digital signal obtained by conversion and the getting coil position.

By repeating the above-described operation, it can be determined whether the pen exists or not, and the pen pressure of the pen or others can be determined. The explanation has been made while exemplifying the coils CY(0) to CY(p), and a similar operation can also be performed to the coils CX(0) to CX(p). Each of the coils CX(0) to CX(p) at this time is formed of, for example, signal lines. In FIG. 15, an example of the coils CX(n) to CX(n+5) formed of the signal lines SL(n−2) to SL(n+7) is shown as a plan view. Also, by performing the magnetic field generation and the magnetic field detection described with reference to FIGS. 31 and 32 for each of the coils CY(0) to CY(p) and the coils CX(0) to CX(p), coordinates of an area which the pen approaches can be extracted.

In the fifth embodiment, the resistor R9 of the gain circuit may be connected to the ground voltage Vs via a switch switch-controlled by the reset signal rst. In this manner, power consumption can be reduced. The resistor R11 is provided to limit the current generated when the clock signal CLK is supplied. Thus, the resistor R11 may not be provided when the resistance of the coil is relatively high.

In a plurality of the embodiments described above, drive electrodes to which a display drive signal is supplied is formed of a plurality of the drive electrodes TL(0) to TL(p) in the display period. In the touch detection, these drive electrodes are used as winding wires to form coils. In addition, during the display period, a coil is formed by using the signal lines SL(0) to SL(P) used for transferring an image signal in the touch detection. Here, as shown in FIG. 9, the signal lines SL(0) to SL(p) are formed of wires formed in the second wiring layer 603 lower than the third wiring layer 605 forming the drive electrodes TL(0) to TL(p). Thus, if the drive electrode is formed of one electrode, an eddy current is generated in the drive electrode by a magnetic field generated by the coil L1 inside the pen in the magnetic field detection period TDT. Therefore, the magnetic field generated by the coil L1 inside the pen is consumed by the generation of the eddy current, and the magnetic field reaching the coil formed of signal lines is considered to be weakened.

On the other hand, if the drive electrode is formed of a plurality of drive electrodes, an area where an eddy current is generated can be narrowed, so that weakening of the magnetic field due to the drive electrode can be reduced. If the drive electrode is formed of the plurality of drive electrodes, the impedance of each drive electrode increases. However, as described in the embodiments, the impedance of the drive electrode (including an auxiliary electrode) caused when a coil is formed can be decreased by connecting the auxiliary electrode to the drive electrode to use the auxiliary electrode also as a wire of the coil. Further in the embodiment, the impedance is decreased by decreasing the number of windings of a coil to shorten the length of the coil. In addition, the generated magnetic field is made stronger by magnetic fields being superimposed in an area where a plurality of coils overlap.

In the plurality of embodiments described above, a single-winding coil has been described as an example of the coil that generates a magnetic field. However, the winding is not limited to such an example. For example, each of a plurality of coils that generate a magnetic field substantially at the same time may be a 1.5-winding or 2 or more-winding coil.

The numbers of signal wires and voltage wires described with reference to FIGS. 11, 23, and 24 are not limited. For example, these signal wires or voltage wires may also serve as other signal wires or voltage wires.

The embodiments have been described an example in which the selection control circuits SR-R, SR-L, SR1-R, SR1-L, the switching circuit DSC, and the selection drive circuit SDC are provided on a TFT glass substrate. However, they may not be provided on a TFT glass substrate. For example, these circuits or some of these circuits may be provided in the flexible cables FB1, FB2 shown in FIG. 7. However, by providing these circuits on a TFT glass substrate, the increase in the number of terminals can be suppressed.

Further, the embodiments have described an example of forming a plurality of coils by using drive electrodes arranged close to each other. However, the formation is not limited to such an example. For example, a plurality of coils may be formed by using a plurality of drive electrodes that are separated from each other. In such a case, if areas of the formed coils overlap, magnetic fields are superimposed in an overlapped area, and thus, a strong magnetic field can be generated.

Examples generating a magnetic field by a coil having a drive electrode or a signal line as a winding wire have been described. Of course, the winding wire of a coil that generates a magnetic field is not limited to the drive electrode or the signal line, and may be a signal wire such as a scanning line.

Examples of generating a strong magnetic field in an area where a plurality of coils overlap by supplying a magnetic-field drive signal to these coils substantially at the same time have been described. Similarly, a plurality of coils can be also used as coils to detect a magnetic field. However, for improving the accuracy of detection, it is more effective to generate a strong magnetic field to increase the amount of charge charged in the pen PN.

In the embodiments, the detection of the touch of the pen by using the electromagnetic induction system has been described. For example, for detecting the touch of a finger, usage of the capacitance system, which is different from the electromagnetic induction system, is known. A touch detection function of the capacitance system may be added to the configuration described in the embodiments. In this case, for example, a detection electrode is arranged so as to be perpendicular to the drive electrode, and an electric field drive signal is supplied to the drive electrode when the touch of a finger is detected. A signal in the detection electrode changes depending on whether a finger touches or not. Therefore, by detecting such a change, the touch of a finger can be detected. In this case, a display drive signal, a magnetic-field drive signal, or an electric field drive signal is supplied to the drive electrode.

In the scope of the idea of the present invention, various modified examples and alteration examples could have been easily thought up by those who skilled in the art, and it would be understood that these various modified examples and alteration examples belong to the scope of the present invention.

For example, the ones obtained by appropriate addition, removal, or design-change of the components to/from/into each of the above-described embodiments by those who skilled in the art or by addition, omitting, or condition-change of the step to/from/into each of the above-described embodiments are also within the scope of the present invention as long as they include the concept of the present invention.

For example, the embodiments have described a case in which the common electrodes TL(0) to TL(p) and the signal lines SL(0) to SL(p) extend in the column direction and are arranged in the row direction. However, the row direction and the column direction change depending on the viewpoint. A case in which the common electrodes TL(0) to TL(p) and the signal lines SL(0) to SL(p) extend in the row direction and are arranged in the column direction by the change of the viewpoint is also included in the scope of the present invention. A term "parallel" used in the present specification means extensions from one end to the other end without intersecting with each other. Thus, even if one line is inclined partially or entirely with respect to the other line, this state is also assumed to be "parallel" in the present specification as long as these lines do not intersect with each other from one end to the other end.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A display apparatus comprising:
    a pixel array having a plurality of pixels arranged in a matrix form;
    a plurality of signal wires arranged in the pixel array;
    a plurality of signal lines arranged in each column of the pixel array to supply an image signal to a plurality of pixels arranged in a corresponding column;
    a plurality of common electrodes arranged in parallel with each other in the pixel array to supply a drive signal to the plurality of pixels in an image display; and
    a first switching circuit arranged along the pixel array,
    wherein the plurality of common electrodes include a first common electrode, a second common electrode adjacently arranged to the first common electrode, a third common electrode, a fourth common electrode adjacently arranged to the third common electrode, and common electrodes arranged between the second common electrode and the third common electrode,
    wherein the first switching circuit connects between the first common electrode and the third common electrode to form a first coil, and connects between the second common electrode and the fourth common electrode to form a second coil when an externally-detecting object is detected, and
    wherein the first coil and the second coil are overlapped in an overlapped area including the common electrodes arranged between the second common electrode and the third common electrode.

2. The display apparatus according to claim 1, wherein each of the plurality of common electrodes includes a first electrode and a second electrode connected to the first electrode and having a smaller resistance value than a resistance value of the first electrode.

3. The display apparatus according to claim 1, further comprising a selection drive circuit arranged along the pixel array,
    wherein the selection drive circuit provides a detection signal and a predetermined voltage to the first common electrode and the third common electrode which form the first coil and provides the detection signal and the predetermined voltage to the second common electrode and the fourth common electrode which form the second coil when the externally-detecting object is detected, and
    wherein a magnetic field generated by the first coil and a magnetic field generated by the second coil are superposed in the overlapped area.

4. The display apparatus according to claim 1,
    wherein each of the plurality of common electrodes is arranged along a row of the pixel array, and
    wherein a total of widths of the common electrodes arranged next to each other and a width of the overlapped area are substantially the same as each other.

5. The display apparatus according to claim 1, wherein detection signals changing in synchronization with each other are supplied to the first coil and the second coil substantially at the same time.

6. The display apparatus according to claim 1,
    wherein the plurality of common electrodes extend in a first direction parallel to a row of the pixel array and being arranged in a second direction crossing the first direction, and
    wherein a width of an outermost common electrode among the plurality of common electrodes is narrower than a width of common electrode other than the outermost common electrode among the plurality of common electrodes.

7. The display apparatus according to claim 1, further comprising:
    a second switching circuit coupled to the plurality of signal lines; and a third switching circuit coupled to the plurality of signal lines, wherein the second switching circuit and the third switching circuit are arranged along the pixel array so that the pixel array is arranged between the second switching circuit and the third switching circuit, wherein the plurality of signal lines include a first signal line, a second signal line adjacently arranged to the first signal line, a third signal line, a fourth signal line adjacently arranged to the third signal line, and signal lines arranged between the second signal line and the third signal line, wherein the second switching circuit connects between a port of the first signal line and a port of the third signal line and connects between a port of the second signal line and port of the fourth signal line, and the third switching circuit connects between the other port of the second signal line and the other port of the third signal line to form a third coil when the externally-detecting object is detected, and wherein the third coil crosses both of the first coil and the second coil.

8. The display apparatus according to claim 1, further comprising a second switching circuit coupled to the plurality of signal lines, wherein the plurality of signal lines include a first signal line, a second signal line, and signal lines arranged between the first signal line and the second signal line, wherein the second switching circuit connects between the first signal line and the second signal line to form a third coil when the externally-detecting object is detected, and wherein the third coil crosses both the first coil and the second coil.

9. The display apparatus according to claim 7, further comprising:

a selection drive circuit arranged along the pixel array; and a detection circuit, wherein the selection drive circuit provides a detection signal and a predetermined voltage to the first common electrode and the third common electrode which form the first coil and provides the detection signal and the predetermined voltage to the second common electrode and the fourth common electrode which form the second coil when the externally-detecting object is detected, and wherein the detection circuit coupled to the third coil and detects the externally-detecting object when the externally-detecting object is detected.

10. A display apparatus comprising:

a pixel array having a plurality of pixels arranged in a matrix form;

a plurality of signal wires arranged in the pixel array;

a plurality of signal lines arranged in each column of the pixel array to supply an image signal to a plurality of pixels arranged in a corresponding column; and a first switching circuit coupled to the plurality of signal lines, wherein the plurality of signal lines include a first signal line, a second signal line, and signal lines arranged between the first signal line and the second signal line, and wherein the first switching circuit connects between a port of the first signal line and a port of the second signal line to form a coil when an externally-detecting object is detected.

11. The display apparatus according to claim 10, further comprising a second switching circuit coupled to the plurality of signal lines, wherein plurality of signal lines further includes a third signal adjacently arranged to the first signal line and a fourth signal line adjacently arranged to the second signal line, and wherein the first switching circuit connects between a port of the third signal line and a port of the fourth signal line and second switching circuit connects between the other port of the second signal line and the other port of the third signal line when an externally-detecting object is detected.

12. A display apparatus comprising:

a pixel array having a plurality of pixels arranged in a matrix form;

a plurality of signal lines arranged in each column of the pixel array to supply an image signal to a plurality of pixels arranged in a corresponding column; and a plurality of common electrodes arranged in parallel with each other in the pixel array to supply a drive signal to the plurality of pixels in an image display, wherein the plurality of common electrodes includes first common electrodes arranged on a center portion of the pixel array and a second common electrode arranged between the center portion of the pixel array and an outermost side of the pixel array, and wherein a width of the second common electrode is made narrower than widths of first common electrodes.

13. A display apparatus according to claim 12, wherein each of the first common electrodes has an equal width, and width of common electrodes arranged between the center portion of the pixel array and the outermost side of the pixel array gradually become narrower toward the outermost side from center portion.

* * * * *